United States Patent
Stark et al.

(10) Patent No.: US 9,546,513 B2
(45) Date of Patent: Jan. 17, 2017

(54) EDGE SEAL ASSEMBLIES FOR HERMETIC INSULATING GLASS UNITS AND VACUUM INSULATING GLASS UNITS

(71) Applicant: EVERSEALED WINDOWS, INC., Evergreen, CO (US)

(72) Inventors: David H. Stark, Evergreen, CO (US); Patrick Michael Honor, Chandler, AZ (US)

(73) Assignee: EverSealed Windows, Inc., Evergreen, CO (US)

( * ) Notice: Subject to any disclaimer, the term of this patent is extended or adjusted under 35 U.S.C. 154(b) by 0 days.

(21) Appl. No.: 14/650,702

(22) PCT Filed: Oct. 18, 2014

(86) PCT No.: PCT/US2014/061280
§ 371 (c)(1),
(2) Date: Jun. 9, 2015

(87) PCT Pub. No.: WO2015/058174
PCT Pub. Date: Apr. 23, 2015

(65) Prior Publication Data
US 2016/0108659 A1    Apr. 21, 2016

Related U.S. Application Data

(60) Provisional application No. 61/893,112, filed on Oct. 18, 2013, provisional application No. 61/958,979, filed on Apr. 29, 2014.

(51) Int. Cl.
*E06B 3/66* (2006.01)
*E04C 2/34* (2006.01)
(Continued)

(52) U.S. Cl.
CPC .............. *E06B 3/6612* (2013.01); *E04C 2/34* (2013.01); *E06B 3/66342* (2013.01);
(Continued)

(58) Field of Classification Search
CPC  E06B 3/6612; E06B 3/66342; E06B 3/67356; E06B 3/6775; E06B 3/66361; E06B 2003/6639; Y02B 80/24; E04C 2/34
See application file for complete search history.

(56) References Cited

U.S. PATENT DOCUMENTS 2,057,452 A    10/1936  Howard
2,122,453 A *  7/1938  Clause ................ E06B 3/66309
                                              126/200
(Continued)

FOREIGN PATENT DOCUMENTS

EP     0240584 A    10/1987
EP     0983974 A1    3/2000
(Continued)

OTHER PUBLICATIONS

PCT: International Search Report and Written Opinion of PCT/2014/061280 (related application), Jan. 6, 2015, 4 pgs.
(Continued)

*Primary Examiner* — Andrew J Triggs
(74) *Attorney, Agent, or Firm* — Howison & Arnott, L.L.P.

(57) ABSTRACT

A method of manufacturing VIGUs and IGUs comprises providing a first lite; providing a second lite spaced apart from the first lite to form a cavity therebetween; and encircling the lites with a one piece band. Spacers of a metal solder alloy or other reflowable material are inserted between the band and the perimeter edges of the lites. The assembly is heated in an evacuated environment, causing the
(Continued)

spacers to melt and hermetically bond to the lites, but not until the cavity has been substantially evacuated.

12 Claims, 24 Drawing Sheets

(51) Int. Cl.
  *E06B 3/673* (2006.01)
  *E06B 3/663* (2006.01)
(52) U.S. Cl.
  CPC ...... *E06B 3/67334* (2013.01); *E06B 3/67356* (2013.01); *E06B 3/66361* (2013.01); *E06B 2003/6639* (2013.01); *Y02B 80/24* (2013.01)

(56) References Cited

U.S. PATENT DOCUMENTS

| | | | |
|---|---|---|---|
| 2,200,694 A | 5/1940 | Eduard et al. | |
| 2,219,573 A | 10/1940 | Fraenckel | |
| 2,274,999 A | 3/1942 | Allen | |
| 2,279,168 A | 5/1942 | Kalischer et al. | |
| 2,284,151 A | 5/1942 | Kingston | |
| 2,369,146 A | 2/1945 | Kingston | |
| 2,480,453 A | 8/1949 | Gerardus et al. | |
| 2,502,855 A | 4/1950 | Kingston | |
| 2,584,354 A | 2/1952 | Kissinger et al. | |
| 2,670,572 A | 3/1954 | Smith | |
| 2,708,774 A * | 5/1955 | Seelen | E06B 3/66347 220/2.1 R |
| 2,753,073 A | 7/1956 | Faulkner | |
| 2,933,423 A | 4/1960 | Brookover et al. | |
| 2,968,125 A | 1/1961 | Montgomery et al. | |
| 3,027,607 A | 4/1962 | Lehr et al. | |
| 3,045,297 A * | 7/1962 | Ljungdahl | C03C 27/08 428/184 |
| 3,345,218 A | 10/1967 | Brookover et al. | |
| 3,389,522 A | 6/1968 | Hordis | |
| 3,394,512 A | 7/1968 | Lehr et al. | |
| 3,519,496 A | 7/1970 | Finn et al. | |
| 3,526,550 A | 9/1970 | Larson et al. | |
| 3,537,944 A | 11/1970 | Grubb et al. | |
| 3,737,308 A | 6/1973 | Iwai et al. | |
| 3,902,883 A | 9/1975 | Bayer | |
| 4,069,630 A | 1/1978 | Chess et al. | |
| 4,149,910 A | 4/1979 | Popplewell | |
| 4,468,423 A | 8/1984 | Hall | |
| 4,705,585 A | 11/1987 | Kelly et al. | |
| 4,798,695 A | 1/1989 | Redel | |
| 5,005,557 A * | 4/1991 | Bachli | C03C 17/09 126/572 |
| 5,009,218 A * | 4/1991 | Bachli | C03C 17/09 126/649 |
| 5,370,913 A | 12/1994 | Lin | |
| 5,443,871 A | 8/1995 | Lafond | |
| 5,491,953 A | 2/1996 | Lafond | |
| 5,525,430 A | 6/1996 | Chahroudi | |
| 5,679,419 A * | 10/1997 | Larsen | E06B 3/66314 428/137 |
| 5,811,926 A | 9/1998 | Novich | |
| 5,834,891 A | 11/1998 | Novich | |
| 6,131,364 A * | 10/2000 | Peterson | E06B 3/66323 52/172 |
| 6,171,703 B1 | 1/2001 | Haluska | |
| 6,351,923 B1* | 3/2002 | Peterson | E06B 3/66314 52/745.16 |
| 6,503,583 B2 | 1/2003 | Nalepka et al. | |
| 6,541,084 B2 | 4/2003 | Wang | |
| 6,558,494 B1 | 5/2003 | Wang | |
| 6,635,321 B2 | 10/2003 | Wang et al. | |
| 6,637,644 B2 | 10/2003 | Bachli | |
| 6,641,689 B1 | 11/2003 | Aggas | |
| 6,692,600 B2 | 2/2004 | Veerasamy | |
| 6,701,749 B2 | 3/2004 | Wang et al. | |
| 6,789,362 B1 | 9/2004 | Hessabi | |
| 6,793,990 B1 | 9/2004 | Sakaguchi | |
| 6,860,075 B2 | 3/2005 | Bachli | |
| 6,924,974 B2 | 8/2005 | Stark | |
| 6,928,776 B2 | 8/2005 | Hornung | |
| 6,946,171 B1 | 9/2005 | Aggas | |
| 6,962,834 B2 | 11/2005 | Stark | |
| 6,966,208 B1 | 11/2005 | Collins | |
| 6,974,518 B2 | 12/2005 | Hornung | |
| 7,045,181 B2 | 5/2006 | Yoshizawa | |
| 7,081,178 B2 | 7/2006 | Collins | |
| 7,100,343 B2 | 9/2006 | France | |
| 7,114,306 B2 | 10/2006 | Minaai | |
| 7,141,130 B2 | 11/2006 | Minaai | |
| 7,238,546 B2 | 7/2007 | Stark | |
| 7,378,798 B2 | 5/2008 | Coumans et al. | |
| 7,517,712 B2 | 4/2009 | Stark | |
| 7,832,177 B2 | 11/2010 | Stark | |
| 7,919,157 B2* | 4/2011 | Cooper | E06B 3/6612 428/34 |
| 7,989,040 B2 | 8/2011 | Stark | |
| 8,266,852 B2 | 9/2012 | Samuels | |
| 8,283,023 B2* | 10/2012 | Mott | E06B 3/6612 277/406 |
| 8,329,267 B2* | 12/2012 | Bettger | E06B 3/66 277/406 |
| 8,512,829 B2* | 8/2013 | Cooper | E06B 3/6612 428/34 |
| 8,789,343 B2* | 7/2014 | Zurn | E06B 3/66 428/34 |
| 9,328,512 B2* | 5/2016 | Francis, IV | E04C 2/54 |
| 2002/0041424 A1 | 4/2002 | Lynam | |
| 2005/0136198 A1 | 6/2005 | Bourlier et al. | |
| 2005/0217319 A1 | 10/2005 | Yoshizawa | |
| 2006/0187608 A1 | 8/2006 | Stark | |
| 2006/0191215 A1 | 8/2006 | Stark | |
| 2009/0019815 A1 | 1/2009 | Ensinger | |
| 2009/0304956 A1 | 12/2009 | Probster et al. | |
| 2009/0324858 A1 | 12/2009 | Jaeger | |
| 2010/0068561 A1 | 3/2010 | Rohwer et al. | |
| 2011/0059275 A1 | 3/2011 | Stark | |
| 2011/0296771 A1 | 12/2011 | Miller et al. | |
| 2011/0296797 A1 | 12/2011 | Stark et al. | |
| 2012/0315409 A1 | 12/2012 | Jones | |
| 2016/0108659 A1* | 4/2016 | Stark | E06B 3/6612 52/786.1 |

FOREIGN PATENT DOCUMENTS

| | | | |
|---|---|---|---|
| EP | 1544180 A1 | 6/2005 | |
| EP | 2847409 A1 | 3/2015 | |
| JP | 1998 10-297944 A | 11/1998 | |
| JP | 1998 10-330134 A | 12/1998 | |
| WO | 2006121954 A | 11/2006 | |
| WO | 2008085325 A2 | 7/2008 | |
| WO | 2010019484 A2 | 2/2010 | |
| WO | 2010083476 A2 | 7/2010 | |
| WO | 2013169504 A | 11/2013 | |

OTHER PUBLICATIONS

"Diffusion Bonding—Ceramics and ceramic/meal joints", TWI Knowledge Summary, 2000. http://www.twi.co.uk/content/ksjaf005.html.

Kazakov, N.F. (ed.); Diffusion Bonding of Materials; 1981; pp. 4-9, 248-257; Pergamon Press; U.S.A.

PCT: International Search Report and Written Opinion of PCT/US2009/053206 (related application); Feb. 17, 2010; 8 pgs.

PCT: International Search Report and Written Opinion of PCT/US2010/021287 (related application); Sep. 3, 2010; 8 pgs.

PCT: International Search Report and Written Opinion of PCT/US2010/021286 (related application); Sep. 16, 2010; 7 pgs.

PCT: International Preliminary Report on Patentability of PCT/US2004/002272 (related application); Mar. 16, 2005; 4 pgs.

PCT: International Preliminary Examination Report of PCT/US2003/007553 (related application); Apr. 19, 2004; 7 pgs.

(56) References Cited

OTHER PUBLICATIONS

PCT: International Preliminary Report on Patentability of PCT/US2005/013237 (related application); Apr. 18, 2007; 9 pgs.
PCT: International Preliminary Report on Patentability of PCT/US2009/053206 (related application); Feb. 24, 2011; 7 pgs.
PCT: International Preliminary Report on Patentability with International Preliminary Examination Report of PCT/US2010/021287 (related application); May 19, 2011; 8 pgs.
PCT: International Search Report and Written Opinion of PCT/US2011/038973 (related application); Mar. 2, 2012; 8 pgs.
PCT: International Preliminary Report on Patentability with International Preliminary Examination Report of PCT/US2006/017595(related application); Aug. 24, 2012; 11 pgs.
PCT: International Search Report and Written Opinion of PCT/US2012/036693 (related application); Jul. 26, 2012; 7 pgs.
PCT: International Preliminary Report on Patentability Chapter I of PCT/US2011/038973 (related application); Dec. 13, 2012; 5 pgs.
Arata et al. Pressure and Field Assisted Bonding of Glass to Aluminum; Transactions of JWRI is published by Welding Research Institute of Osaka University; vol. 13; No. 1; 1984; pp. 35-40.
Carpenter Specialty Alloys: Controlled-Expansion Alloys (Catalog/Brochure); Dec. 1999; pp. 1-24 (esp. 5-8); Carpenter Technology Corporation (Publ.); Wyomissing, PA USA.
Cerjak, H. (ed.); Mathematical Modelling of Weld Phenomena 5; Diffusion Bonding of Glass to Metal in an Electrostatic Field; M. Morsy et al.; pp. 945-959; London IOM Communications, 2001.
Doron Teomim, Avner Badihi, Gil Zilber; "An innovative approach to wafer-level MEMS packaging"; Solid State Technology (Magazine); Jan. 2002; Penwell (Publ.); Nashua, NH USA.
Dunkerton; TWI Knowledge Summary Diffusion Bonding; Copyright 2001; TWI World Centre for Materials Joinging Technology Website; www.twi.co.uk; United Kingdom; 4 pages.
George S. Brady, et al., Materials Handbook, 12th Edition; 1986; pp. 28-29; McGraw-Hill Book Company; New York.
JPL Technology Reporting Office; "Hermetic Wafer Bonding by Use of Microwave Heating"; NASA Tech Brief, vol. 25, No. 5, from JPL New Technology Report NPO-20608 (NASA Contract No. NAS-7-918); May 1, 2001; Jet Propulsion Laboratory, California Institute of Technology (Publ.); Pasedena, CA, USA; including therein: NTR Inventors Report by Henry W Jackson, John D Mai, Martin B Barmatz, Nasser K Budraa, William T Pike; NASA Case No. 0205 20608; Mar. 1997(?) (Best Available Copy); including therein: (same authors) "Low Pressure and Low Temperature Hermetic Wafer Bonding Using Microwave Heating"; Jet Propulsion Laboratory, Califorina Institute of Technology; Pasedena, CA, USA (Best Available Copy).
Kazakov et al.; Equipment for Diffusion Welding of Rectangular Glass Plates to Kovar; Svarochnoe Proizvodstvo; Jun. 1977; p. 50; (In Russian, English translation provided).
Nicholas, M.G. & Lee, R. J.; Joining Dissimilar Materials, Metals and Materials, The Journal of the Institute of Metals, vol. 5, No. 6, Jun. 1989; UK.
NTR Inventors Report by Henry W Jackson, John D Mai, Martin B Barmatz, Nasser K Budraa, William T Pike; NASA Case No. 0205 20608; Mar. 1997(?) (Best Available Copy); Including therein: (same authors) "Low Pressure and Low Temperature Hermetic Wafer Bonding Using Microwave Heating"; Jet Propulsion Laboratory, California Institute of Technology; Pasedena, CA, USA (Best Available Copy).
Ostyn, K. & Vinckier, A.; Joining of Different Materials Through Interfaces; Interfaces in Materials, Proceedings of the Colloquium; pp. 153-173; Brussels, Dec. 1988.
PCT: International Search Report of PCT/US03/07553 (related application); International Publication No. WO 03/083938 A1; Jun. 16, 2003; 2 pgs.
PCT: International Search Report of PCT/US04/02272 (related application); International Publication No. WO 2004/068189; Jan. 27, 2004; 1 pg.
R.C. Dykhuizen et al.; Gas Dynamic Principles of Cold Spray; Journal of Thermal Spray Technology; vol. 7(2); pp. 205-212; Jun. 1998.
Sadovsky et al.; Precision Welding of Glass to Kovar Without Melting; Svarochnoe Proizvodstvo; Feb. 1973; pp. 22; (In Russian, English translation provided).
PCT: Written Opinion of the International Searching Authority of PCT/US04/02272 (related application); International Publication No. WO 2004/068189; Mar. 16, 2005; 3 pgs.
PCT: International Search Report of PCT/US05/13237 (related application); International Publication No. WO 2005/118291 A3; Oct. 24, 2006; 1 pg.
PCT: Written Opinion of the International Searching Authority of PCT/US05/13237 (related application); International Publication No. WO 2005/118291; Oct. 24, 2006; 5 pgs.
PCT: International Search Report of PCT/US06/17595 (related application); International Publication No. WO 2006/121954; Aug. 20, 2008; 3 pgs.
PCT: Written Opinion of the International Searching Authority of PCT/US06/17595 (related application); International Publication No. WO 2006/121954; Aug. 20, 2008; 10 pgs.
PCT: International Search Report of PCT/US08/76278 (related application); Jan. 16, 2009; 4 pgs.
PCT: Written Opinion of the International Searching Authority of PCT/US08/76278 (related application); Jan. 16, 2009; 5 pgs.
PCT: International Preliminary Report on Patentability of PCT/US2008/076278 (related application); Mar. 25, 2010.
JPL Technology Reporting Office; "Hermetic Wafer Bonding by Use of Microwave Heating"; NASA Tech Brief, vol. 25, No. 5, from JPL New Technology Report NPO-20608 (NASA Contract No. NAS-7-918); May 1, 2001; Jet Propulsion Laboratory, California Institute of Technology (Publ.); Pasedena, CA, USA; including therein: NTR Inventors Report by Henry W Jackson, John D Mai, Martin B Barmatz, Nasser K Budraa, William T Pike; NASA Case No. 0205 20608; Mar. 1997(?) (Best Available Copy); including therein: (same authors) "Low Pressure and Low Temperature Hermetic Wafer Bonding Using Microwave Heating"; Jet Propulsion Laboratory, California Institute of Technology; Pasedena, CA, USA (Best Available Copy).

* cited by examiner

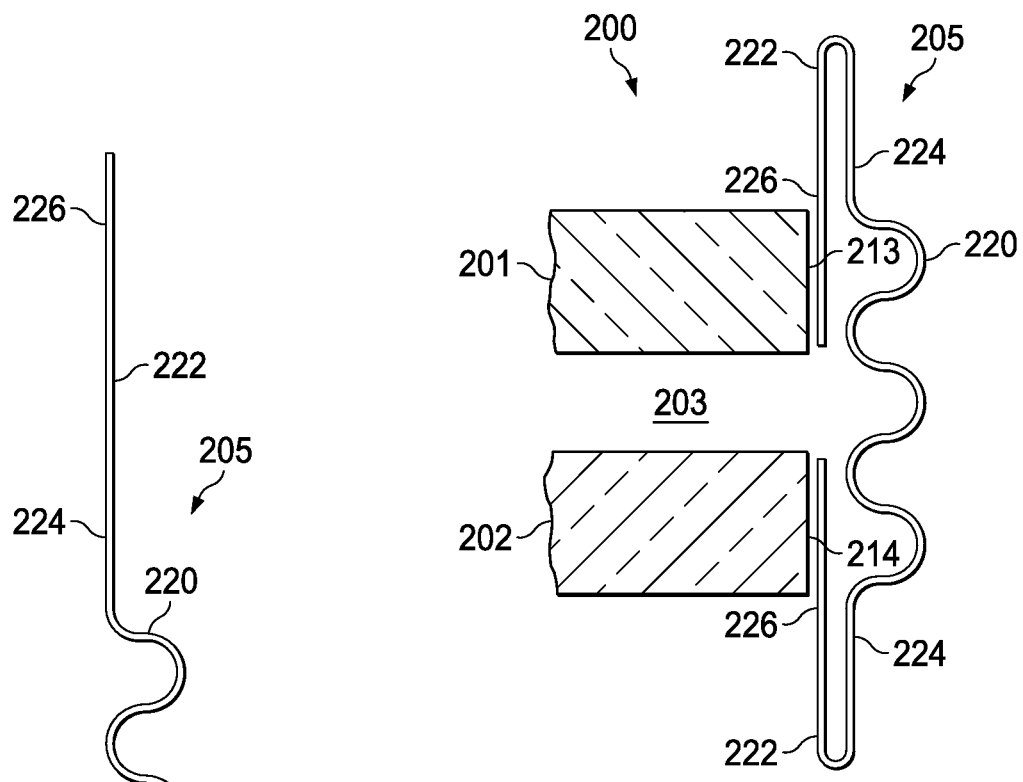
FIG. 2b
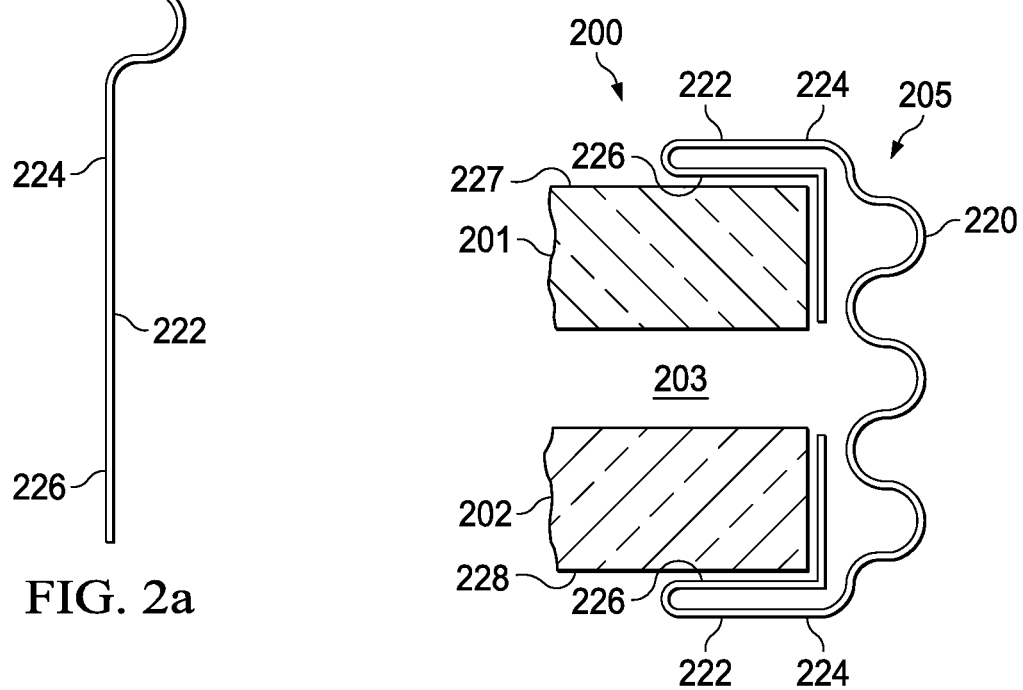
FIG. 2a
FIG. 2c

EDGE SEAL ASSEMBLIES FOR HERMETIC INSULATING GLASS UNITS AND VACUUM INSULATING GLASS UNITS

CROSS-REFERENCE TO RELATED APPLICATIONS

This application is a U.S. National Phase application submitted under 35 U.S.C. §371 of Patent Cooperation Treaty application serial no. PCT/US2014/061280, filed Oct. 18, 2014, published as international application WO 2015/058174, and entitled EDGE SEAL ASSEMBLIES FOR HERMETIC INSULATING GLASS UNITS AND VACUUM INSULATING GLASS UNITS. PCT/US2014/061280 claims benefit of and/or priority to U.S. Provisional Application 61/893,112, filed Oct. 18, 2013, entitled SOLDERING A METAL BAND TO THE PERIMETERS OF GLASS LITES FOR ASSEMBLING HERMETIC INSULATING GLASS UNITS AND VACUUM INSULATING GLASS. PCT/US2014/061280 also claims benefit of and/or priority to U.S. Provisional Application No. 61/985,979, filed Apr. 29, 2014, entitled EDGE SEAL ASSEMBLIES FOR HERMETIC INSULATING GLASS UNITS AND VACUUM INSULATING GLASS AND METHODS OF ASSEMBLING SAME. PCT/US2014/061280, WO 2015/058174 and U.S. applications 61/893,112 and 61/985,979 are incorporated by reference in their entirety.

TECHNICAL FIELD

The following disclosure relates to multi-pane insulating glass units ("IGUs" or "IGs") and vacuum insulating glass units ("VIGUs" or "VIGs") for use in fenestration applications (e.g. windows and doors for buildings), windows for transportation vehicles (e.g., buses, trucks, automobiles, planes, trains, ships), solar collector panels; supermarket refrigeration display systems, beverage vending machine glass units and any other application where an IGU or VIGU might be used. In particular, it relates to edge seal assemblies for producing hermetic seals on the edges of IGUs and VIGUs and methods of making same.

BACKGROUND

Insulating glass units (also known as insulating glazing units or "IGUs" or "IGs") and vacuum insulating glass units (also known as vacuum insulating glazing units or "VIGUs" or "VIGs") are known. They comprise two or more parallel but spaced-apart sheets, or panes, of glass attached and/or sealed to one another around their respective peripheries. The gap between each pair of sheets or panes of glass (also known as "lites") defines a cavity. In IGUs, the cavity is filled with air or other gasses such as argon, krypton or xenon, whereas in VIGUs, the gap is "filled" with or contains a reduced-pressure atmosphere or a vacuum. Spacers (also known as "stand-offs" or "suspenders") are typically disposed within the gap of IGUs and VIGUs to maintain the gap. In the case of VIGUs, spacers are particularly necessary in order to support the sheets of glass against the pressure of the outside air, which otherwise might distort or damage the glass, or cause the two panes of glass to come in contact with each other so as to produce a thermal "short circuit" (i.e., a thermally conductive path directly through the panes of glass).

Using vacuum to increase the insulating performance of window glazing components is not a new concept, and in fact many innovative approaches have been taught in the literature over the last 75 years. It is, however, readily observed by skilled practitioners of the art that the majority of the prior work relates to low-to medium-vacuum levels, i.e., vacuum levels within the range from about 760 torr (1 atmosphere of pressure at sea level) to about $10^{-3}$ torr. Note, for purposes of this application, a "higher" level of vacuum is understood to correspond to a lower absolute pressure, e.g., a vacuum level of $10^{-4}$ torr is a higher vacuum than $10^{-3}$ torr. In a few cases the literature makes reference to the measured vacuum levels in glazing components, but in many cases the maintainable vacuum level must be interpreted from careful evaluation of the materials exposed to the vacuum enclosure, the methods used to create the vacuum seal and the methods used to produce the vacuum condition in the enclosed space.

While the literature describing vacuum insulating window glazing components may not rigorously define the vacuum levels, literature from other industries, such as the electronics industry, defines different vacuum levels and the types of materials and processing methods required to achieve and maintain those specified vacuum levels. The common distinction between medium- and high-vacuum devices is a vacuum level of $10^{-3}$ torr. In other words, the range of high-vacuum levels begins at about $10^{-3}$ torr and goes higher, i.e., in the direction toward and/or past $10^{-4}$ torr. In the case of vacuum insulating glass units ("VIGUs" or "VIGs") for windows, doors and other components, where it is desirable for the VIGs to retain a prescribed minimum vacuum level for an extended operating lifetime (e.g., 25 years), a vacuum containment system capable of initially maintaining a higher level of vacuum (e.g., $10^{-4}$ torr to $10^{-5}$ torr), may be necessary.

One purpose of high vacuum insulating glass units ("HVIGUs") is to provide lower levels of conductive heat losses between temperature-controlled spaces and non-temperature-controlled spaces, or between different temperature-controlled spaces, that are separated by this glazing unit (i.e., compared to VIGUs with low or medium-vacuum levels). In such cases, providing this desired lower level of conductive heat transfer over a long period of time is desirable. Since the ambient conditions in the uncontrolled space, most commonly the external atmospheric environment, produce a variety of stresses including thermal, pressure and mechanical vibration, and since, to a lesser extent, this also happens in the conditioned space, various embodiments of the HVIGU will be more or less capable of surviving the applied stresses while maintaining the desired minimum vacuum level. Thus, the design lifetime, i.e., the period of time that the HVIGU will maintain its desired level of performance, is one of the performance features of the HVIGU.

VIGUs and HVIGUs have multiple applications in addition to their use as the glass unit (component) of windows for residential and non-residential buildings. Examples of other (non-fenestration) uses include glass windows for refrigerated supermarket display cases (supermarket refrigerators and freezers); thermally-insulating covers for active and/or passive solar collectors; windows for transportation vehicles including spacecraft, aircraft, automobiles, trains, buses and watercraft (boats, ships and submarines); and many other applications.

As previously described, IGUs, VIGUs and HVIGUs are typically constructed using at least two spaced-apart sheets or panes of glass, each of some prescribed thickness. The gap between two adjacent glass sheets or panes defines a cavity. In IGUs, the cavity is filled with air or other gasses such as argon, krypton or xenon, whereas in VIGUs and HVIGUs, the gap is "filled" with a reduced pressure atmosphere or a vacuum. Spacers (also known as "stand-offs" or "pillars") are typically disposed within the gap of IGUs, VIGUs and HVIGUs to maintain the gap. In the case of VIGUs and HVIGUs, spacers are particularly necessary in order to support the sheets against the pressure of the outside air, which otherwise might distort or damage the glass, or cause the two panes of glass to come in contact with each other so as to produce a thermal "short circuit."

These glass panes are then sealed, typically along the edges, using some arrangement of sealing elements which are intended to isolate the evacuated volume from the surrounding atmospheric pressure. Since the primary objective of the VIGU or HVIGU is to provide a low thermally-conductive barrier between environmental spaces, each of which may have a higher or lower temperature with respect to the other, it is obvious to skilled practitioners of the art that the two panes of glass may reach temperature levels which vary distinctly from each other. In fact, for a given space-to-space temperature differential, the pane-to-pane temperature differential will typically increase as a function of reduced thermal conductivity of the VIGU or HVIGU. As a result of the temperature differential between the panes of glass, the panes may expand and contract differentially. This may also introduce differential movement of the spacers relative to one or both panes of glass.

For reference purposes, in a dual pane IGU, VIGU or HVIGU, the outdoor-facing or outside-facing glass pane of an IGU/VIGU/HVIGU is typically referred to as glass lite #1, and the indoor-facing or inside-facing glass pane is typically referred to as glass lite #2. There are typically four glass surfaces of interest, denoted (in order from outside to inside) as surfaces 1, 2, 3 and 4. Surfaces 1 and 2 are, respectively, the outdoor facing and indoor facing surfaces of glass lite #1, and surfaces 3 and 4 are, respectively, the outdoor facing and indoor facing surfaces of glass lite #2. Thus, surfaces 2 and 3 are typically disposed on opposite sides of the cavity of the IGU/VIGU/HVIGU.

Similarly, in a triple pane IGU, VIGU or HVIGU, the outdoor-facing or outside-facing glass pane of an IGU/VIGU/HVIGU is typically referred to as glass lite #1, the middle glass pane is referred to as glass lite #2 and the indoor-facing or inside-facing glass pane is typically referred to as glass lite #3. There are typically six glass surfaces of interest, denoted (in order from outside to inside) as surfaces 1, 2, 3, 4, 5 and 6. Surfaces 1 and 2 are, respectively, the outdoor facing and indoor facing surfaces of glass lite #1, surfaces 3 and 4 are, respectively, the outdoor facing and indoor facing surfaces of glass lite #2 and surfaces 5 and 6 are, respectively, the outdoor facing and indoor facing surfaces of glass lite #3. Thus, surfaces 1 and 6 are typically disposed on opposite outer surfaces of the overall IGU/VIGU/HVIGU, surfaces 2 and 3 are typically disposed facing one another on opposite sides of the outer cavity between lites #1 and #2 and surfaces 4 and 5 are typically disposed facing one another on opposite sides of the inner cavity between lites #2 and #3 of the IGU/VIGU/HVIGU.

Vacuum insulated glass units (VIGUs/HVIGUs) are of interest for window applications because of their extremely high insulating properties, with center-of-glass insulating or thermal resistance R values as high as R-13 or more, expressed in US units of British Thermal Units as $ft^{2.\circ}$ F.·hr/Btu. (conductive U-Values or U-Factors of 0.07 or lower, expressed in US units of BTU/($h\cdot^\circ$ F.·$ft^2$)).

The conversion between SI and US units of R-value is 1 $h\cdot ft^{2.\circ}$ F./Btu=0.176110 $K\cdot m^2/W$, or 1 $K\cdot m^2/W$=5.678263 $h\cdot ft^{2.\circ}$ F./Btu.

Creating the reduced pressure between two or more lites surrounded by a metal band hermetically bonded to the perimeter of the two lites in a two-lite VIGU or HVIGU or to three or more lites of a VIGU or HVIGU with three or more glass lites can be very difficult. Evacuation of the VIGU/HVIGU's cavity or cavities often requires evacuation times of eight hours or more when a small vacuum septum fabricated into one or more of the VIGU/HVIGU's lites is used as the evacuation port. When vacuum septums fabricated into one or more lites are used, they are usually covered and protected from damage after the evacuation process by attaching with an adhesive or epoxy a cover over the then hermetically-sealed septum. The cover is typically a stainless-steel disk.

The use of a gettering material (also know as "getter material" or "getters") is well known to those skilled in the art of hermetic packaging. Getters are designed and made of materials to have an affinity to one or more non-noble gases to have the gas or gases stick or be absorbed by the getter upon impact with the getter rather than continue to remain moving in the package's atmosphere. In some cases the atmosphere inside the package may be a partial pressure atmosphere, e.g. a vacuum.

SUMMARY AND DESCRIPTION

In one aspect thereof, IGUs, VIGUs and methods of making them are described using posts of solder to hold parts of a hermetic metal or metal alloy band away from the perimeter of two or more glass lites comprising an IGU while the IGU is in a desired fill-gas atmosphere (e.g. argon, krypton or xenon) to allow the cavity between adjacent pairs of glass lites to become filled with fill-gas prior to soldering. During the heating of the assembly to liquefy the solder that was already applied (solder pre-tinned or pre-tinned) onto the inner surface of the metal band and onto the outer or perimeter surfaces of the IGU's two or more lites, the solder posts melt at approximately the same time as the pre-tin solder on the glass lites and the metal band. As the solder posts melt (transition from a solid state to a liquid state, the post's solder combines with the molten solder on the metal band and with the molten solder on the perimeter of the glass lites. This melting of the posts of solder allows the solder that was pre-tinned on the inside of the metal band and the solder that was pre-tinned on the glass lites to come into contact, creating a continuous on contiguous solder bond between the metal band and the perimeter of the glass lites. Because the assembly is in a fill-gas atmosphere and the single or multiple cavities of the IGU are also filled with the same gas, this gas is contained within the cavity or cavities of the IGU when the solder between the metal band and the perimeter of the lites is allowed to cool without physical disturbance to a temperature at which the solder is then in solid state or condition.

In another embodiment, when the coefficient of thermal expansion ("CTE") of the metal band is higher than the CTE of the glass lites, chamfering (or beveling) the edge of the cavity-facing portion each glass lite a sufficient amount (distance) from its cavity-facing surface to enable the solder bond between the metal band and the glass lites' perimeters to always be over the entire non-chamfered surface of the perimeter edges of the lites puts the non-chamfered glass perimeters in compression and leaves no extreme perimeter glass surface in tension after execution of the soldering process as further described herein.

In still another embodiment, when the CTE of the metal band is higher than the CTE of the glass lites, chamfering (or beveling) both the edges of the cavity-facing portion each glass lite a sufficient amount (distance) from its cavity-facing surface to enable the solder bond between the metal band the glass lites' perimeters to always be over the entire surface of the non-chamfered perimeter edges of the lites puts the glass perimeters in compression and leaves no perimeter glass surface in tension after execution of the soldering process as further described herein. This is because the metal band's inner circumference is fabricated to be slightly smaller than the circumference of both glass lites; and the metal band is stretched in the metal band's elastic deformation region around the glass lites. When the band is allowed to contract around the glass lites, the band is then applying compressive forces against the perimeter (circumference) of the glass lites.

In yet another embodiment, chamfering (or beveling) both edges of each glass lites' perimeters results in a balanced construction for each of the glass lites. In other words, the compressive forces applied by the band onto the glass lites are symmetrical about a center-line drawn through the mid-point between the lites' two surface areas (not perimeter surfaces).

In another aspect thereof, VIGUs and methods for making them are described using posts of solder to hold parts of a hermetic metal or metal alloy band away from the perimeter of two or more glass lites comprising a VIGU or HVIGU (hereafter collectively called "VIGU") while the VIGU is in a low pressure atmosphere (i.e. a vacuum where the atmospheric pressure is close to or below $10^{-3}$ torr) to allow the cavity between adjacent pairs of glass lites to become evacuated prior to soldering. During the heating of the assembly to liquefy the solder that was already applied (pre-tinned) onto the inner surface of the metal band and onto the outer or perimeter surfaces of the VIG's two lites, the solder posts melt at approximately the same time as the pre-tin solder on the glass lites and on the metal band. As the solder posts melt (transition from a solid state to a liquid state), the post's solder combines with the molten solder on the metal band and with the molten solder on the perimeter of the glass lites. This melting of the posts of solder allows the solder that was pre-tinned on the metal band and the solder that was pre-tinned on the glass lites to come into contact, creating a continuous on contiguous solder bond between the metal band and the perimeter of the glass lites. Because the assembly is in a low-pressure (vacuum) atmosphere and the cavity of the VIG is also now exposed to the same low pressure, this level of low pressure or vacuum is soon contained within the cavity of the VIG before the solder between the metal band and the perimeter of the lites is allowed to cool, without physical disturbance to the cooling solder, to a temperature at which the solder is then in a solid state or condition.

In another embodiment, when the CTE of the metal band is higher than the CTE of the glass lites, chamfering (or beveling) the edge of the cavity-facing portion each glass lite a sufficient amount (distance) from its cavity-facing surface to enable the solder bond between the metal band the glass lites' perimeters to always be over the entire surface of the non-chamfered perimeter edges of the lites puts the glass perimeters in compression and leaves no perimeter glass surface in tension after execution of the soldering process as further described herein.

In yet another embodiment, when the CTE of the metal band is higher than the CTE of the glass lites, chamfering (or beveling) both edges of the cavity-facing portion of each glass lite a sufficient amount (distance) from its cavity-facing surface to enable the solder bond between the metal band and the glass lites' perimeters to always be over the entire surface of the non-chamfered perimeter edges of the lites, puts the glass non-chamfered perimeters in compression and leaves no perimeter glass surface in tension after execution of the soldering process as further described herein.

In still another embodiment, chamfering (or beveling) both edges of each glass lites' perimeters results in a balanced construction for each of the glass lites. In other words, the glass is symmetrical in shape as well as compression and tension forces about a center-line drawn through the mid-point between the lites' two surface areas (not perimeter surfaces).

In yet another embodiment, a VIGU comprises a first lite, a second lite spaced apart from the first lite to form a cavity therebetween, and an edge seal assembly attached around the periphery of the two lites to form a hermetic seal between the cavity and an external environment. The edge seal assembly includes a first hermetic bonding portion hermetically bonded to the first lite, a second hermetic bonding portion hermetically bonded to the second lite, and a compliant portion connected between the first and second hermetic bonding portions. The compliant portion of the edge seal includes a plurality of corrugations arranged in a plurality of courses, with the first course disposed adjacent to the first and second bonding portions, and with each subsequent course disposed adjacent to previous course, but successively further from the bonding portions.

In another aspect, a gettering material is placed inside one or more portions of the VIGU's hermetic perimeter band assembly where the getter will be in the path leading to the cavity of the VIGU defined by a pair of lites and the hermetic perimeter band surrounding the two lites.

In one embodiment, the getter material is prefabricated prior to placement inside the band assembly during the roll-forming of the band assembly.

In another embodiment, the getter material is deposited onto the band material prior to roll-forming the band assembly.

In yet another aspect, a vacuum insulating glass unit ("VIGU") comprises a first lite, a second lite spaced apart from the first lite to form a cavity therebetween, and a one piece hermetic band encircling the two lites and hermetically bonded to the edges of the lites to hermetically seal the cavity from the environment. The cavity has a reduced-pressure atmosphere relative to the environment. The hermetic band, when viewed in cross section, includes a first bonding region at a first end of the band, the first bond region hermetically bonded to the periphery of the first lite, a second bonding region at a second end of the band, the second bond region hermetically bonded to the periphery of the second lite, and a center region extending continuously between the first bonding region and the second bonding region and including a first section of three-dimensional corrugations disposed in a line substantially parallel to the peripheral edges of the lites.

In one embodiment, the center region of the VIGU further comprises a first flat section connected at a first end to the first section of three-dimensional corrugations and having a second end and a second flat section connected at a first end to the second end of the first flat section. Both the first and second flat sections are disposed substantially parallel to the peripheral edges of the lites.

In another embodiment, the center region further comprises a first lateral section disposed between the first bonding region and the first section of three-dimensional corrugations and structurally bonded to the outside surface of the first lite and a second lateral section disposed between the second bonding region and the first section of three-dimensional corrugations that is structurally bonded to the outside surface of the second lite.

In still another embodiment, the center region further comprises at least a second section of three-dimensional corrugations disposed in a line substantially parallel to the peripheral edges of the lites and at least a third flat section connected between the first and second sections of three dimensional corrugations.

In yet another embodiment, the VIGU further comprises a gettering material disposed on a portion of the band in communication with the cavity.

In still another aspect, an insulating glass unit ("IGU") comprises a first lite, a second lite spaced apart from the first lite to form a cavity therebetween, and a one piece hermetic band encircling the two lites and hermetically bonded to the edges of the lites to hermetically seal the cavity from the environment. The cavity has a modified-composition atmosphere relative to the environment. The hermetic band, when viewed in cross section, includes a first bonding region at a first end of the band, the first bond region hermetically bonded to the periphery of the first lite, a second bonding region at a second end of the band, the second bond region hermetically bonded to the periphery of the second lite, and a center region extending continuously between the first bonding region and the second bonding region and including a first section of three-dimensional corrugations disposed in a line substantially parallel to the peripheral edges of the lites.

In another embodiment, the center region of the IGU further comprises a first flat section connected at a first end to the first section of three-dimensional corrugations and having a second end and a second flat section connected at a first end to the second end of the first flat section. Both the first and second flat sections are disposed substantially parallel to the peripheral edges of the lites.

In yet another embodiment, the center region further comprises a first lateral section disposed between the first bonding region and the first section of three-dimensional corrugations and structurally bonded to the outside surface of the first lite and a second lateral section disposed between the second bonding region and the first section of three-dimensional corrugations that is structurally bonded to the outside surface of the second lite.

In a further embodiment, the center region further comprises at least a second section of three-dimensional corrugations disposed in a line substantially parallel to the peripheral edges of the lites and at least a third flat section connected between the first and second sections of three dimensional corrugations.

In another embodiment, the IGU further comprises a gettering material disposed on a portion of the band in communication with the cavity.

BRIEF DESCRIPTION OF THE DRAWINGS

For a more complete understanding, reference is now made to the following description taken in conjunction with the accompanying Drawings in which:

FIG. 1b shows a cross-sectional view of the PRIOR ART VIGU from FIG. 1a;

FIG. 2a shows a side view of a one-piece edge seal for use in a VIGU in accordance with one embodiment;

FIG. 2b shows a partial cross-sectional view of a VIGU assembly including the one-piece edge seal of FIG. 2a during one stage of manufacture;

FIG. 2c shows the VIGU of FIG. 2b at a later stage of manufacture;

FIG. 6b is a close-up view of the post/spacers and passage(s) of FIG. 6a;

DETAILED DESCRIPTION

For the purposes of this application, although in appropriate usage vacuum insulating glazing units capable of maintaining vacuum levels of $10^{-3}$ torr or higher are termed as "high-vacuum insulating glazing units" or as "high-vacuum insulating glass units", (each an HVIGU or, in the plural, HVIGUs), this application will refer to both vacuum insulating glazing units and high-vacuum insulating glass units as VIGs or VIGUs.

Further, for purposes of this application, the term "hermetic" as applied to a material or a seal shall mean (unless otherwise specifically denoted) that, when used to form a sealed cavity and subjected to a pressure differential of approximately one atmosphere (i.e., in air), the material or seal has a permeability or "leak rate" that is sufficiently low such that the internal pressure within the sealed cavity changes by less than 1 mtorr (i.e., $1\times10^{-3}$ torr) over a period of at least ten years, and preferably over a period of 30-40 years. For example, if the initial pressure within the sealed cavity is $1\times10^{-4}$ torr, the materials and/or seals forming the cavity would be considered hermetic for ten years if the pressure within the sealed cavity after ten years is still less than $1.1\times10^{-3}$ torr. In another example, if the initial pressure within the sealed cavity is $5\times10^{-5}$ torr, the materials and/or seals forming the cavity would be considered hermetic for thirty years if the pressure within the sealed cavity after thirty years is less than $1.05\times10^{-3}$ torr. Alternatively, a seal may be considered "hermetic" if it has a helium leak rate less than or equal to $1\times10^{-13}$ atm.·cc/sec.

Figure 1A:
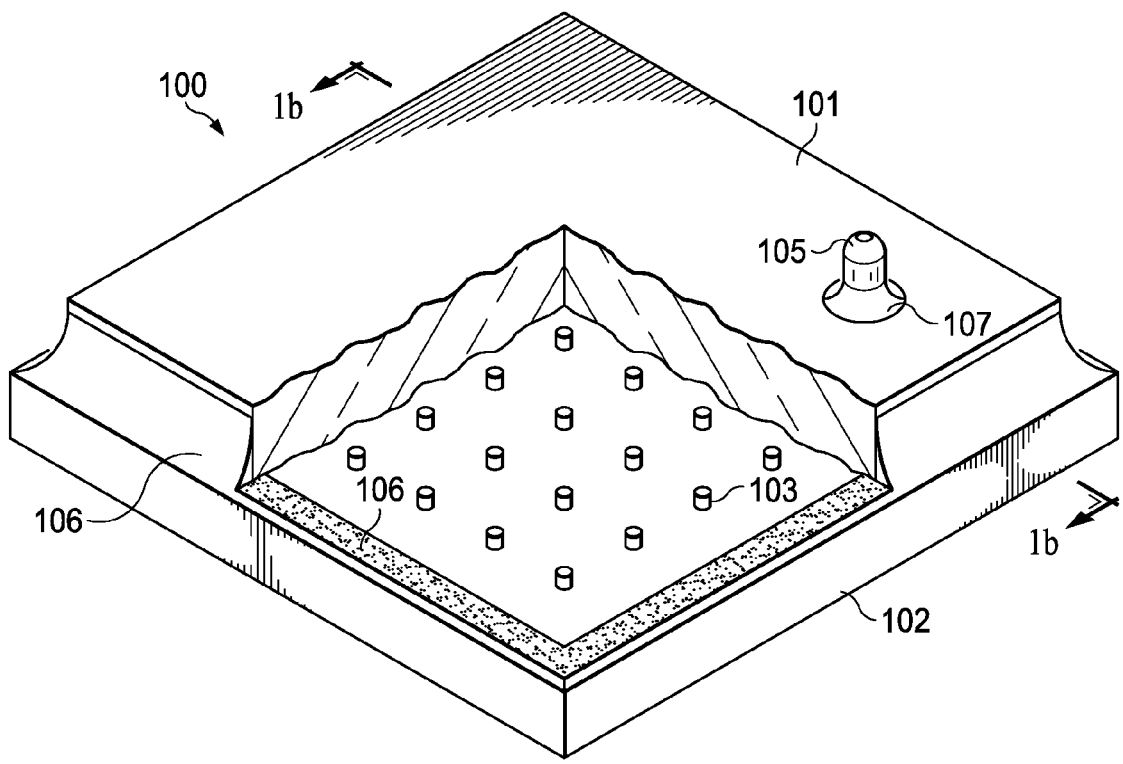
FIG. 1a shows a perspective view, with portions broken away, of a dual-pane VIGU in accordance with the PRIOR ART.
Figure 1B:
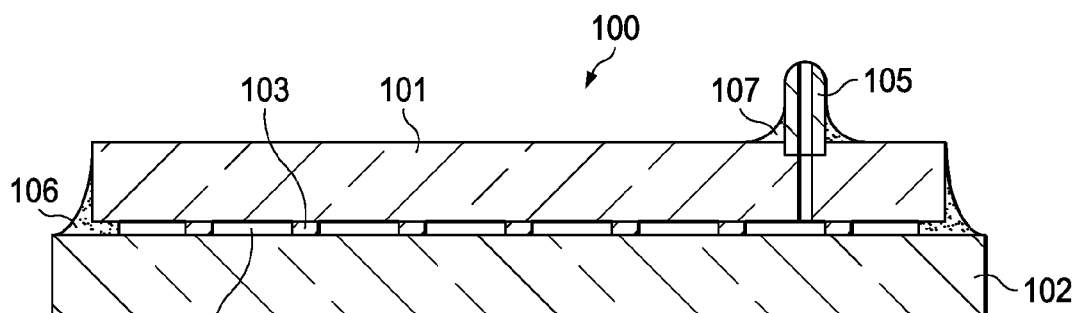

Referring now to FIGS. 1a and 1b, there is shown a perspective cut-away view (FIG. 1a) and a side cross-sectional view (FIG. 1b) of a dual-pane VIGU in accordance with the PRIOR ART. The VIGU 100 comprises a first lite 101 and a second lite 102 spaced apart by a plurality of support pillars 103 to define a cavity 104 therebetween. An edge seal 106 formed of solder glass (reflowed glass frit) is provided around the periphery of the lites 101 and 102 to isolate the cavity 104. A pump-out tube 105 is provided on one of the lites for evacuating the cavity 104 after the assembly of the VIGU. The pump-out tube 105 may also have a solder glass (reflowed glass frit) edge seal 107. This type of VIGU (similar to the "SPACIA" brand by NSG) is considered to have a "rigid edge seal" due to the low or non-flexibility of the solder-glass seal system.

Figure 2D:
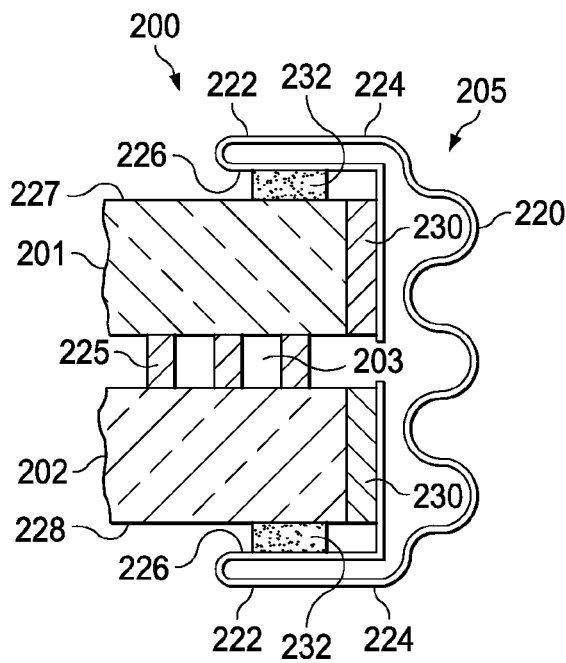
FIG. 2d shows another view of the VIGU of FIGS. 2b and 2c illustrating the location of the stand-offs, solder and adhesive.

Referring now to FIGS. 2a, 2b, 2c and 2d, there is illustrated a VIGU/IGU 200 having a one-piece edge seal in accordance with one embodiment. Referring in particular to FIG. 2a, there is illustrated a cross-sectional view of a one-piece edge seal 205 comprising a central compliant portion 220 disposed between two lateral portions 222. The edge seal 205 may be formed from a hermetic material, preferably a foil or thin sheet of metal or metal alloy that can be soldered and/or welded. Preferably, the material of the edge seal 205 is spoolable, i.e., it may be stored in a rolled-up state on a spool (or reel) until needed for assembly.

The compliant portion 220 of the edge seal 205 may have a surface formed in a three-dimensional pattern. Each lateral portion 222 includes a proximal section 224 disposed adjacent to the central compliant portion 220 and a distal section 226 disposed on the opposite side of the proximal section from the compliant portion.

Referring now to FIG. 2b, the one-piece edge seal 205 is positioned so that the compliant portion 220 lies adjacent to the perimeters of a first lite 201 and second lite 202, which are spaced apart to define an insulating cavity 203 disposed therebetween (which will later be evacuated). In particular, the compliant portion 220 is aligned with edges 213 and 214, respectively, of the lites 201 and 202. The lites 201 and 202 are formed from a hermetic transparent material, preferably glass. A plurality of stand-off members 225 (FIG. 2d) may be positioned in the cavity 203 between the lites 201 and 202 to maintain separation of the lites. For purposes of illustration, the stand-off members 225 (FIG. 2d) are not shown in FIGS. 2b and 2c. The stand-off members may be affixed to one or both of the lites 201, 202 or held in place by other means, e.g., suspended on fibers or filaments or held in position by friction between the lites. The stand-off members 225 may be formed of glass, ceramic, metal or other materials having high compression strength and little or no out-gassing.

Referring still to FIG. 2b, each lateral portion 222 of the edge seal 205 is first folded between the proximal section 224 and the distal section 226 to bring at least a first part of the distal section directly adjacent to the edges 213 and 214 of the lites 201 and 202, i.e., interposed between the edges 213, 214 and the compliant portion 220. As further described herein, each first part of the distal section 226 of the edge seal 205 is then bonded to the respective adjacent edge 213, 214 of the lites 201, 202 to form a hermetic bond 230 (FIG. 2d). The hermetic bond 230 must be capable of blocking the passage of gasses into the cavity 203 to maintain the required hermeticity, but it is not required to withstand any significant structural loads arising from the compliant portion 220 of the edge seal 205. Preferably, the hermetic bond 230 (FIG. 2d) extends across the entire perimeter surface 213, 214 of the lites. In some embodiments, the hermetic bond 230 comprises a solder. In preferred embodiments, the solder is a metallic solder, however, in other embodiments the solder may be a solder glass or other hermetic bonding material.

Referring now to FIG. 2c, after hermetically bonding the first part of each distal section 226 to the edges 213, 214, the lateral portion 222 is folded a second time such that the remaining parts of the distal section lie against the respective faces 227, 228 of lites 201, 202 and the proximal portions 224 lie substantially parallel to the faces. As further described herein, each remaining part of the distal section 226 of the edge seal 205 is then bonded to the respective adjacent face 227, 228 to form a structural bond 232 (FIG. 2d). The structural bond 232, unlike the hermetic bond 230, need not be capable of blocking the passage of gasses into the cavity 203. Instead, the structural bond 232 must withstand the structural loads arising from the compliant portion 220 and prevent the transmission of any significant structural loads to the hermetic bond 230. Accordingly, in this embodiment the structural bond 232 is always interposed along the edge seal 205 between the compliant portion 220 and the hermetic bond 230 (i.e., when considering the edge seal 205 as extending continuously from one distal end to the opposite distal end). In some embodiments, the structural bond 232 may comprise one or more of a thermoset or a thermoplastic. In preferred embodiments, the structural bond 232 may comprise one or more of acrylic, epoxy, urethane, polyester, polyimide, phenolic, polyamide, cyanoacrylate, polyacrylate, and polyvinyl acetate.

Referring now to FIG. 2d, the VIGU 200 is shown, including the lites 201, 202, edge seal 205 and stand-off members 225 (for purposes of illustration, only an end portion of the complete VIGU is shown). The insulating cavity 203 is evacuated to a vacuum, typically though not always through an evacuation port (not shown), following forming the hermetic bonds 230 and the structural bonds 232. In one embodiment of the VIGU 200, the hermetic materials, including the hermetic bond 230, are hermetic for at least ten years. In another embodiment, the hermetic materials, including the hermetic bond 230, are hermetic for at least thirty years. In yet another embodiment, the hermetic materials, including the hermetic bond 230, are hermetic for at least forty years. In a preferred embodiment, the insulating cavity 203 is evacuated to a vacuum within the range of $1\times10^{-6}$ torr to $1\times10^{-3}$ torr. Alternatively, an insulating glazing unit (IGU) (not shown) may be constructed in a substantially identical fashion, except the materials and seals need not be hermetic and the atmosphere within the insulating cavity is a partial vacuum and/or filed with air, an insulating gas (e.g., argon) or gas mixture. As described above, the evacuation or partial evacuation of the insulating cavity 203 of VIGUs, or in the case of IGUs, the filling of the insulating cavity with insulating gases, may be achieved at the time of sealing the insulating cavity by sealing it while the VIGU/IGU 200 is in, respectively, a vacuum chamber, a partial vacuum chamber or a gas-filled chamber. Alternatively, the evacuation and/or filling of the insulating cavity 203 may be achieved after the insulating cavity has been sealed via an evacuation tube or evacuation port.

Figure 2E:
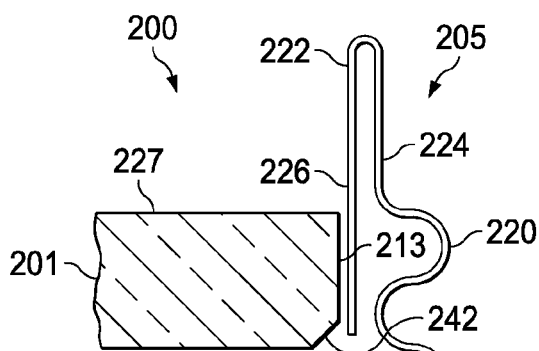
FIG. 2e shows a partial cross-sectional view of a VIGU assembly including the one-piece edge seal with chamfers of the cavity-facing perimeters of the two lites in accordance with another embodiment during one stage of manufacture.
Figure 2F:
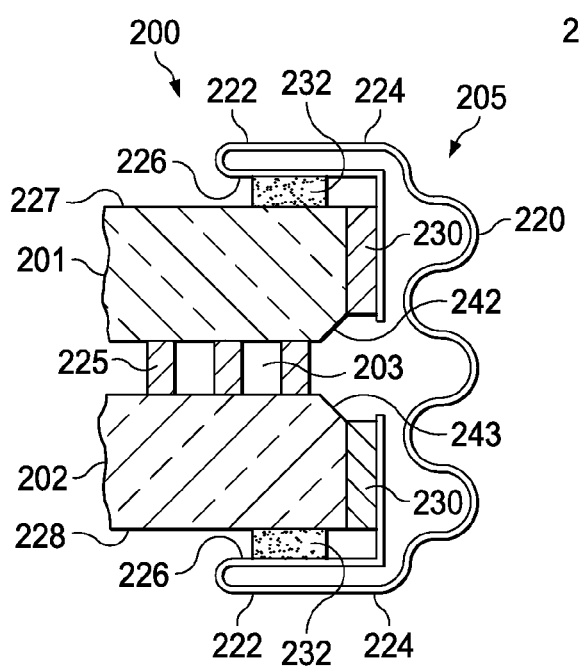
FIG. 2f shows another view of the VIGU of FIGS. 2b and 2c to illustrate the location of the stand-offs, solder and adhesive and chamfers of the cavity-facing perimeters of the two lites.

Referring now to FIGS. 2e and 2f, another embodiment is illustrated. FIG. 2e is similar to FIG. 2b and FIG. 2f is similar to FIG. 2d, with differences as described herein. In the embodiment of FIGS. 2e and 2f, the glass lites 201 and 202 are shown with chamfered or beveled edges, namely, chamfer 242 on the perimeter of lite 201 and chamfer 243 on the perimeter of lite 202. The chamfers 242 and 243 are on the cavity 203 side of the IGU/VIGU 200. In some instances, the metal band 205 surrounding and eventually soldered to the perimeters of the two lites 201 and 202 may have a higher coefficient of thermal expansion ("CTE" or "TCE") than that of the glass lites. After the solder reflow operation in an evacuated space is performed and the assembly 200 is cooling from the peak soldering temperature back to ambient, if the metal band has a higher CTE than the glass, it will contract at a greater rate than the glass. This greater contraction of the band relative to the perimeter area's contraction of the glass lites will cause the band to be in tension and thereby create a compression bond, meaning the band's natural state at ambient (room) temperature is to have a smaller circumference than the circumference of the glass lites, resulting in the band creating compressive forces on the glass lites around their perimeter surfaces. Adjacent to the compressive forces in the glass are tensile forces. The chamfers 242 and 243 shown in FIG. 2e ensure that the metal band extends past the two lites' perimeter surfaces 213 and 214 so all of 213 and 214 are in compression after the solder bonds, metal band and two lites are allowed to cool down to ambient or room temperature. It will be appreciated that the term "perimeter surface" in this case refers to the plane of the furthermost edge of the lites; the beveled or chamfered portions of the lites are not part of the perimeter surface.

Figure 2G:
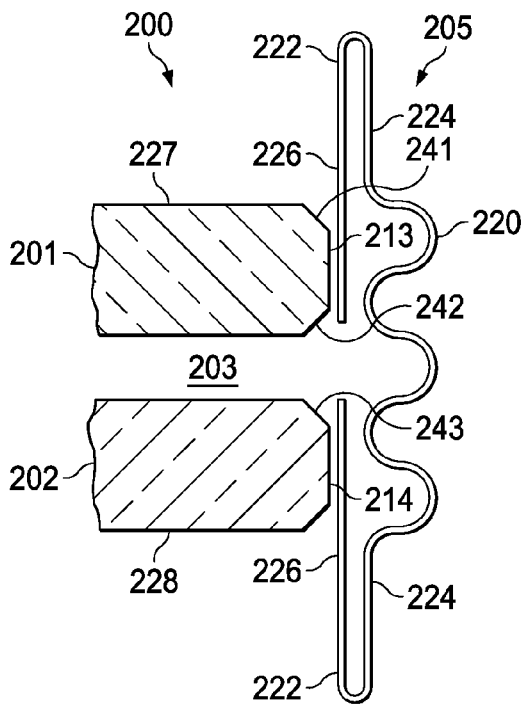
FIG. 2g shows a partial cross-sectional view of a VIGU assembly including the one-piece edge seal with chamfers on the cavity-facing perimeters of the two lites as well as chamfers on the non-cavity-facing perimeters of the two lites in accordance with yet another embodiment during one stage of manufacture.
Figure 2H:
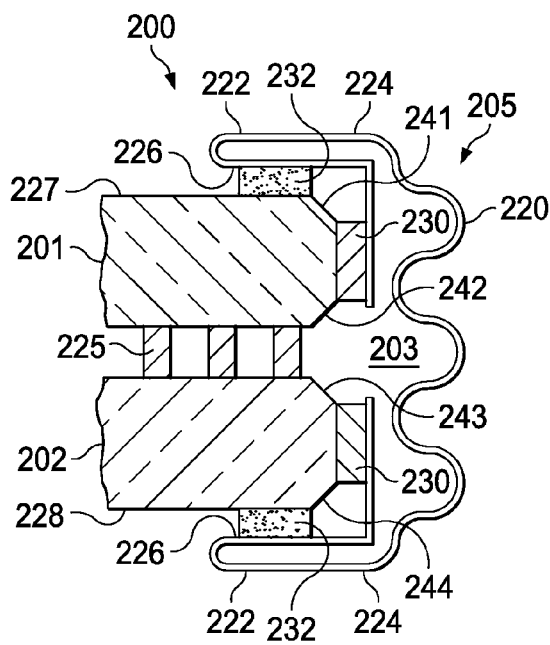
FIG. 2h shows another view of the VIGU of FIG. 2g to illustrate the location of the stand-offs, solder and adhesive and chamfers of the cavity-facing perimeters of the two lites.

Referring now to FIGS. 2g and 2h, another embodiment is shown. Referring first to FIG. 2g, lite 201's perimeter surface 213 is chamfered on both ends, creating surfaces 241 and 242. Likewise, both sides of lite 202's perimeter surface 214 are chamfered, creating surfaces 243 and 244. In some instances, the metal band 205 surrounding and eventually soldered to the perimeters of the two lites 201 and 202 may have a higher coefficient of thermal expansion ("CTE" or "TCE") than that of the glass lites. Referring now also to FIG. 2h, after the solder reflow operation in an evacuated space is performed and the assembly 200 is cooling from the peak soldering temperature back to ambient, if the metal band has a higher CTE than the glass, it will contract at a greater rate than the glass. This greater contraction of the band relative to the perimeter area's contraction of the glass lites will create tension in the band and a compression bond, meaning the band's natural state at ambient (room) temperature is to have a smaller circumference than the circumference of the glass lites, resulting in the band creating compressive forces on the glass lites around their perimeter surfaces. Adjacent to the compressive forces in the glass are tensile forces. The chamfers 241, 242, 243 and 244 shown in FIG. 2g ensure that the metal band extends past the two lites' perimeter surfaces 213 and 214 so all of 213 and 214 are in compression after the solder bonds, metal band and two lites are allowed to cool down to ambient or room temperature.

Figure 2I:
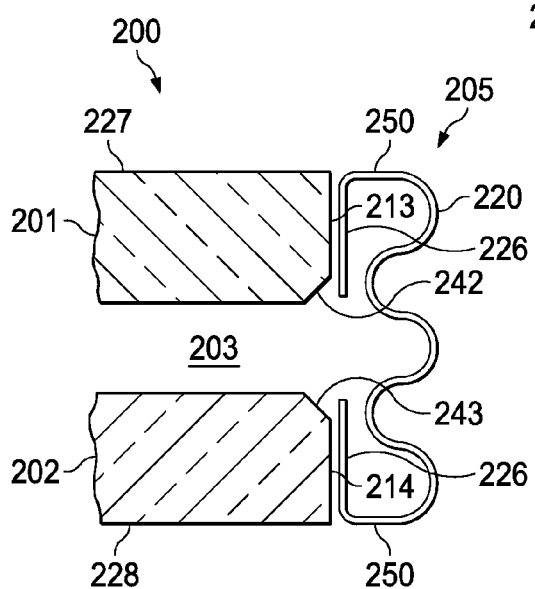
FIG. 2i shows a partial cross-sectional view of a VIGU assembly including the one-piece edge seal and the cavity-facing chamfers of the lites' perimeters in accordance with a further embodiment during one stage of manufacture.
Figure 2J:
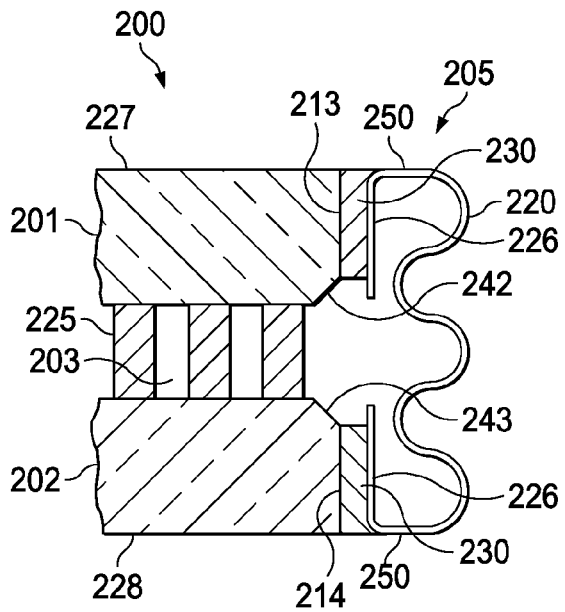
FIG. 2j shows another view of the VIGU of FIG. 2i to illustrate the location of the stand-offs, solder and adhesive.

Referring now to FIGS. 2i and 2j, yet another embodiment is illustrated. FIG. 2i is similar to FIG. 2e, and FIG. 2j is similar to FIG. 2f, with differences as described herein. Referring first to FIG. 2i, in the embodiment of FIGS. 2i and 2j, the configuration of the metal band 205 forming the one-piece edge seal is modified such that the seal does not extend past the exterior surfaces 227, 228 (i.e., surfaces 1 and 4) of the glass lites 201 and 202. In particular, the lateral portions 222 (as shown in FIG. 2e) of the band 205 are reduced in length (i.e., compared to that shown in FIG. 2e) and folded such that a bend 250 is formed substantially in line with the exterior surfaces 227, 228. While the bend 250 is shown as rounded in FIGS. 2i and 2j, it will be appreciated that in different embodiments, the bend 250 may be either rounded, angled or quite flat, as long as hermetic integrity is maintained. The distal sections 226 of the band 205 are still positioned proximate to the perimeter edges 213, 214 of the lites on the outer sides of the bends 250, and the compliant section 220 is still provided in a central portion of the band between the bends 250.

Referring now also to FIG. 2j, the metal band 205 surrounding the lites 201, 202 is eventually soldered to the perimeters 213, 214 of the two lites. The solder bond 230 will preferably extend across the entire perimeter edge 213, 214 of the lites (although not on the chamfers 242, 243). The cavity 203 is evacuated (for a VIGU) or filled (for an IGU), either by performing the solder operation in an appropriate atmosphere, or by the use of a pump-out/filling tube. The chamfers 242 and 243 ensure that the metal band 205 extends past the two lites' perimeter surfaces 213 and 214 so all of surfaces 213 and 214 are in compression after the solder bonds, metal band and two lites are allowed to cool down to ambient or room temperature.

Figure 2K:
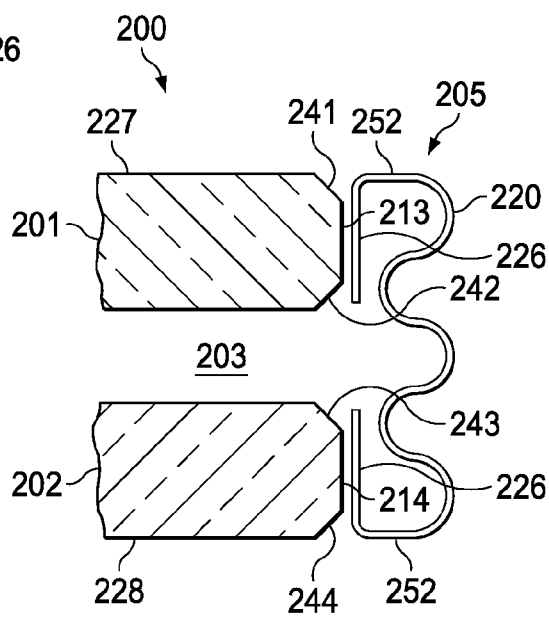
FIG. 2k shows a partial cross-sectional view of a VIGU assembly including the one-piece edge seal and the cavity-facing chamfers of the lites' perimeters in accordance with another embodiment during one stage of manufacture.
Figure 2L:
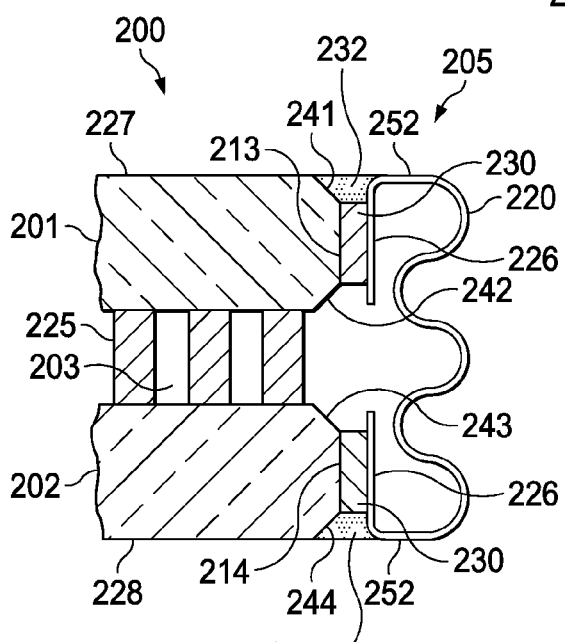
FIG. 2L shows another view of the VIGU of FIG. 2k to illustrate the location of the stand-offs, solder and adhesive, the cavity-facing chamfers of the lites' perimeters and the chamfers of the outside edges of the lites.

Referring now to FIGS. 2k and 2L, a still further embodiment is shown. FIG. 2k is similar to FIG. 2g, and FIG. 2L is similar to FIG. 2h, with differences as described herein. Referring first to FIG. 2k, the configuration of the metal band 205 forming the one-piece edge seal is modified such that the seal does not extend past the exterior surfaces 227, 228 of the glass lites 201 and 202, similar to that shown in the embodiment of FIGS. 2i and 2j just described. The lateral portions 222 (as shown in FIG. 2e) of the band 205 are reduced in length (i.e., compared to that shown in FIG. 2g) and folded such that a bend 252 is formed substantially in line with the exterior surfaces 227, 228. While the bend 252 is shown as rounded in FIGS. 2k and 2L, it will be appreciated that in different embodiments, the bend 252 may be either rounded, angled or quite flat, as long as hermetic integrity is maintained. The distal sections 226 of the band 205 are positioned proximate to the perimeter edges 213, 214 of the lites on the outer sides of the bends 252, and a compliant section 220 is provided in a central portion of the band between the bends 252. As in the embodiment of FIG. 2g, the embodiment of FIGS. 2k and 2L includes a lite 201 with a perimeter surface 213 that is chamfered on both ends, creating surfaces 241 and 242. Likewise, both sides of lite 202's perimeter surface 214 are chamfered, creating surfaces 243 and 244.

Referring now also to FIG. 2L, the metal band 205 surrounding the lites 201, 202 is eventually soldered to the perimeters 213, 214 of the two lites. The solder bond 230 will preferably extend across the entire perimeter edge 213, 214 of the lites (although not on the chamfers 241, 242, 243 and 244). The cavity 203 is evacuated (for a VIGU) or filled (for an IGU), either by performing the solder operation in an appropriate atmosphere, or by the use of a pump-out/filling tube or port. The chamfers 241, 242, 243 and 244 ensure that the metal band 205 extends past the two lites' perimeter surfaces 213 and 214 so all of surfaces 213 and 214 are in compression after the solder bonds, metal band and two lites are allowed to cool down to ambient or room temperature.

Due to the dual-chamfer configuration of the embodiment of FIGS. 2k and 2L, a structural bond 232 (FIG. 2L) can be provided between the band 205 and the lites 201, 202 at the locations of the exterior chamfers 241, 244 that does not extend past the plane of the exterior lite surfaces 227, 228 (i.e., surfaces 1 and 4). As previously explained, the structural bond 232 may protect the hermetic seal 230 from mechanical loads including, but not limited to, loads produced by the differential thermal expansion and/or contraction of lites 201 and 202. In preferred embodiments, the structural bond 232 may comprise one or more of acrylic, epoxy, urethane, polyester, polyimide, phenolic, polyamide, cyanoacrylate, polyacrylate, and polyvinyl acetate.

Figure 3:
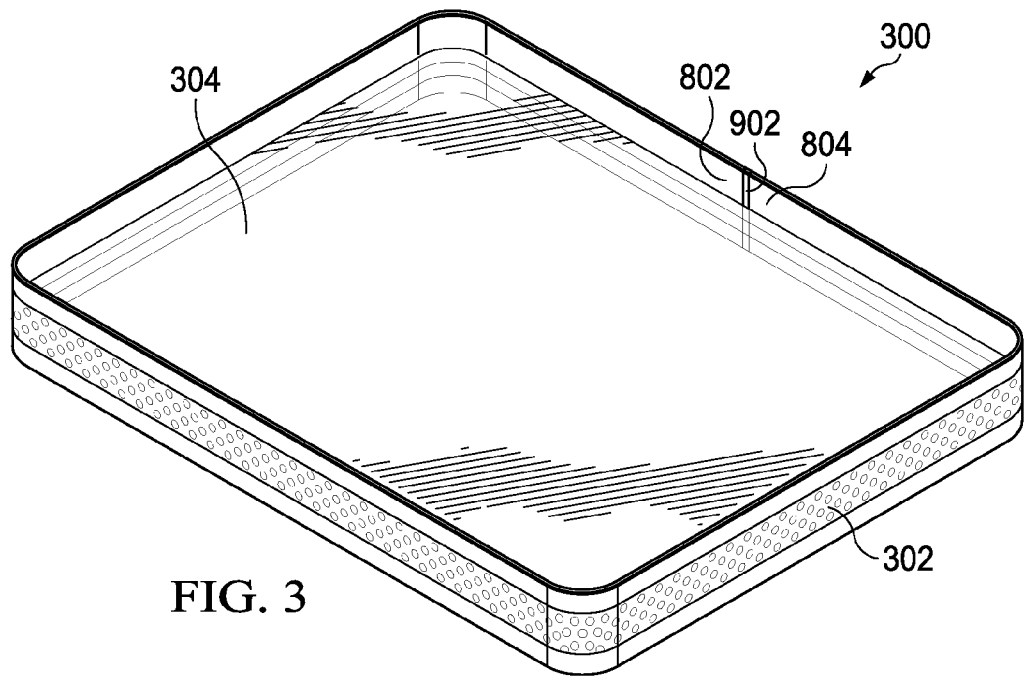
FIG. 3 shows an assembled IGU or VIGU according to another embodiment prior to the process of soldering the metal band to the glass lites.

Referring now to FIG. 3, there is illustrated an assembled IGU or VIGU 300 prior to the process of soldering the metal band 302 and glass lites 304 together in a fill-gas atmosphere in the case of and IGU and a low-pressure (vacuum) atmosphere in the case of a VIGU. It will be appreciated that the lower glass lite 304 is not clearly visible in FIG. 3 because it is positioned directly beneath the upper glass lite 304.

Figure 4:
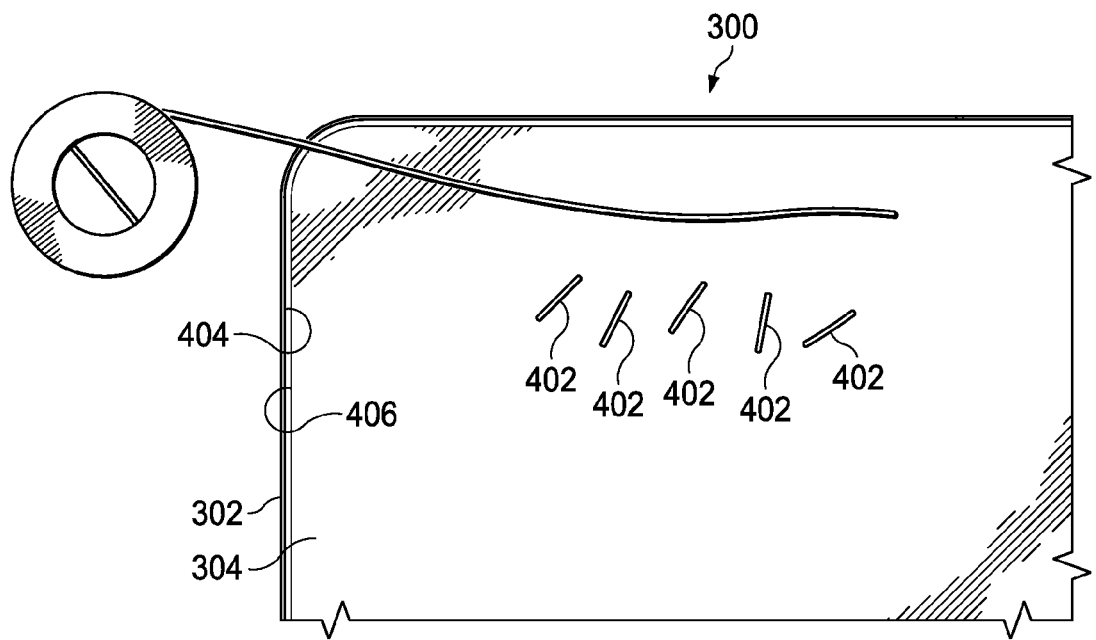
FIG. 4 is a close-up view of the IGU or VIGU of FIG. 3 showing the metal alloy solder posts/spacers used to maintain separation between the inside surface of a metal band and the outer surface of glass lites.

Referring now to FIG. 4, there is illustrated the use of reflowable posts 402 of a metal alloy solder that may be used to maintain separation between the inside solder pre-tinned surfaces 404 of a metal band 302 and the solder pre-tinned outer (i.e. perimeter) surfaces 406 of glass lites 304 while this assembly is heated in an appropriate atmosphere. The posts 402 provide a gap between the metal band 302 and the glass lites 304 such that the cavity 203 between the glass panes can be rapidly evacuated when the entire assembly is placed in an evacuated atmosphere, (i.e., for a VIGU) or rapidly filled with an insulating gas when the assembly is placed in a suitable insulating gas atmosphere (i.e., for an IGU). An IGU 300 may be heated to melt (i.e., "reflow") the solder posts 402 concurrently with the melting of the solder pre-tin on the metal band's interior-facing surface 404 and/or with the melting of the solder pre-tin on the glass lites' outer perimeter 406 while in a fill-gas atmosphere of the desired barometric pressure for the intended end-use altitude's average barometric pressure. A VIGU 300 may be heated to melt/reflow the solder posts 402 concurrently with melting of the solder pre-tin on the metal band's interior-facing surfaces 404 and/or with melting the glass lites' perimeters 406 while in a vacuum chamber with the level of vacuum at or higher than the intended end-use cavity pressure of the VIGU. Higher levels of vacuum correlate to (results in) lower levels of pressure. Thus, when posts 402 made from a reflowable material are used, it is not necessary to remove the posts from the IGU/VIGU assembly after filling/evacuating the cavity between the lites; instead, the posts 402 melt/reflow during the heating of the assembly that hermetically joins the band 302 to the glass panes 304, and become incorporated into the assembly.

Figure 5:
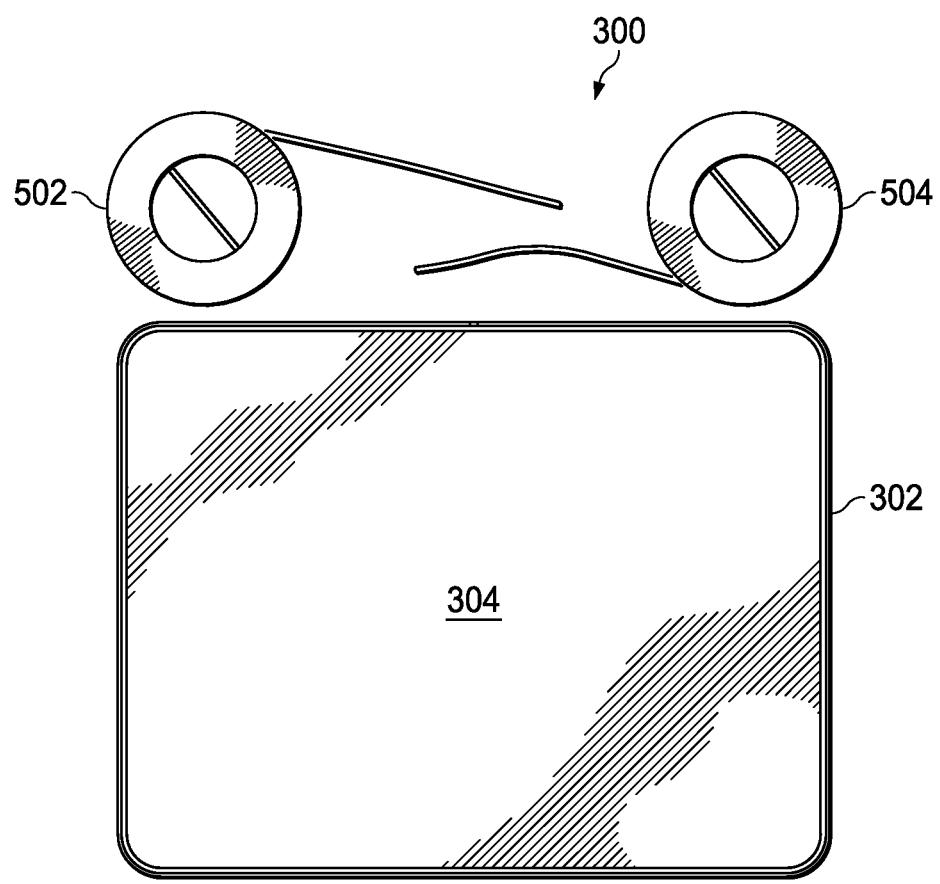
FIG. 5 illustrates that the metal alloy solder used to pre-tin the metal band, including embodiments where the formulation of solder used to pre-tin the glass may be different from the formulation of solder used to pre-tin the inside of the metal band.

Referring now to FIG. 5, there is illustrated that the metal alloy solder 502 used to pre-tin the metal band 302 may be of a different composition than the solder 504 used to pre-tin the perimeter of the glass lites 304. The solder used for the separation posts 402 (FIG. 4) during the soldering of the metal band 302 to the perimeter of the lites 304 while the assembly is in a gas atmosphere or in a vacuum can be either of the two solders (the solder 504 for the glass or the solder 502 for the metal) or may be of a different composition than either of the two solders used for pre-tinning the glass and the metal band. In either case, the solder used as the separation posts 402 should have a melting (liquid) and re-solidification temperature close to the average melting (liquid or liquidus) and re-solidification temperatures of the solder 504 used to pre-tin the perimeter of the glass and the solder 502 used to pre-tin the interior surface(s) of the metal band.

Figure 6A:
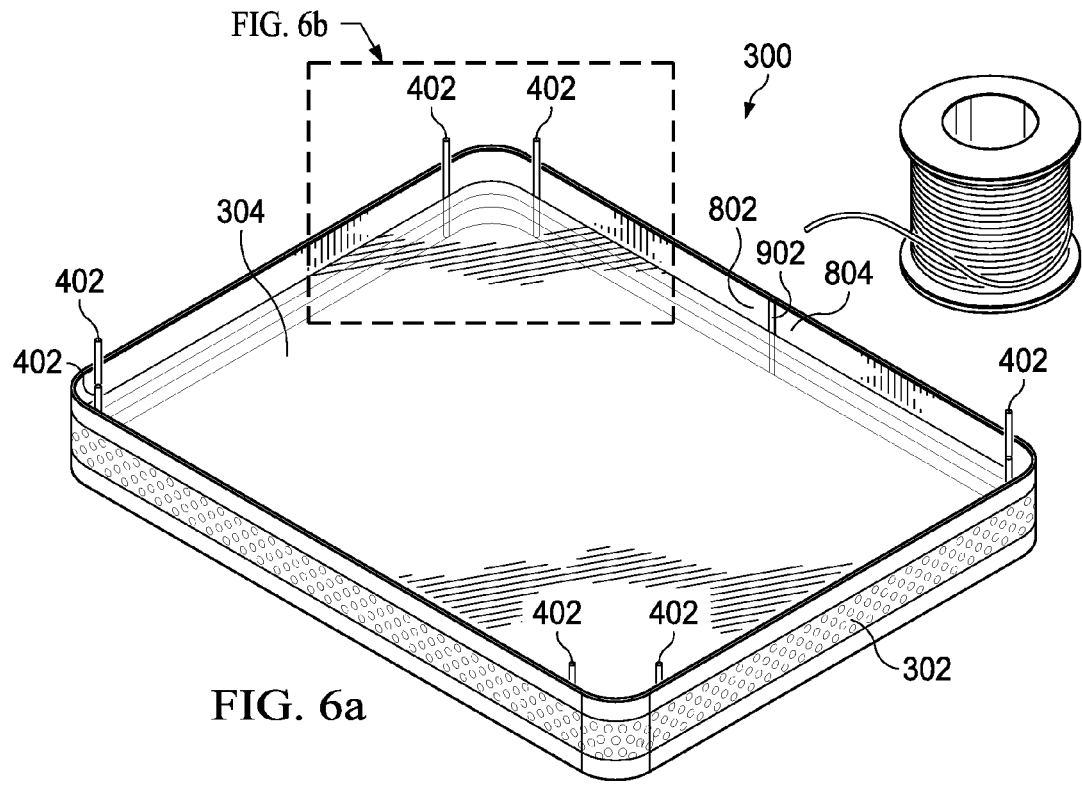
FIG. 6a is another view of the IGU or VIGU of FIG. 3 illustrating how the posts/spacers create fluid passage(s) past (i.e., in between) the flexible band to the cavity between the two lites.

Referring now to FIG. 6a, there are illustrated posts 402 of metal alloy solder creating an air space or gap or physical separation between the two lites 304 of the VIGU/IGU 300 and the flexible metal band 302 of the VIGU/IGU. In this illustration of a rectangular IGU or VIGU 300, there are two posts 402 on each of the four sides of the IGU or VIGU, each post being close to the tangent of each rounded corner of the assembly. One, two or more posts 402 can be used on each straight section (i.e., "length" or "portion") of the perimeter between the metal band 302 and the glass section 304 of the assembly, as long as a sufficient distance of the band is held by the solder posts away from the perimeter of the glass lites 304 to allow a rapid flooding of a fill-gas into the cavity or cavities of an IGU, or rapid evacuation of air and other gases from the cavity of a VIGU.

In preferred embodiments of dual pane IGUs or VIGUs 300, the posts 402 of solder are the same length, or alternatively close in length, to the thickness of the IGU/VIGU measured from outside to inside, i.e., the distance between the outermost glass surfaces (i.e., surfaces 1 and 4) of the dual pane IGU/VIGU. Similarly, in preferred embodiments of triple-pane IGUs or VIGUs 300, the posts 402 are the same length, or alternatively close in length, to the thickness of the IGU/VIGU measured from outside to inside, i.e., the distance between the outermost glass surfaces (i.e., surfaces 1 and 6). It should be noted that although a rectangular IGU or VIGU 300 is shown, solder posts 402 could be used on a non-rectangular shaped IGU or VIGU to hold a metal band 302 away from the perimeter of the IGU's or VIG's glass lites 304 during the heating portion of the soldering process. Non-rectangular shapes include but are not limited to triangles, pentagons, hexagons, etc., as well as circles, semi-circles and quarter-circles.

Figure 6B:
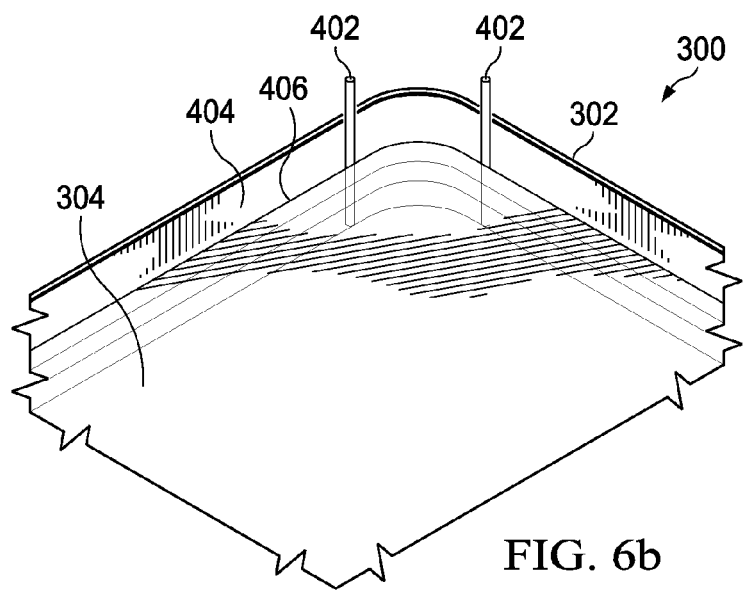

Referring now to FIG. 6b the solder posts (columns) 402 adjacent to one of the corners of the pair of lites 304 and the flexible metal band 302 are illustrated in close-up. Note that in this figure, the solder posts 402 are not used in the radiused (rounded) corner regions, but instead, adjacent to the rounded corner regions, i.e., close to, or at the tangent point to the radius.

Figure 7:
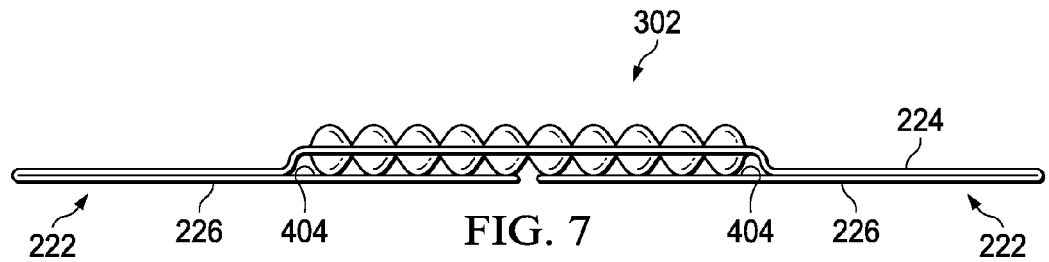
FIG. 7 is an end view of a flexible metal band, with smooth surfaces on its bottom side suitable for soldering to the perimeter of a pair of glass lites.
Figure 8:
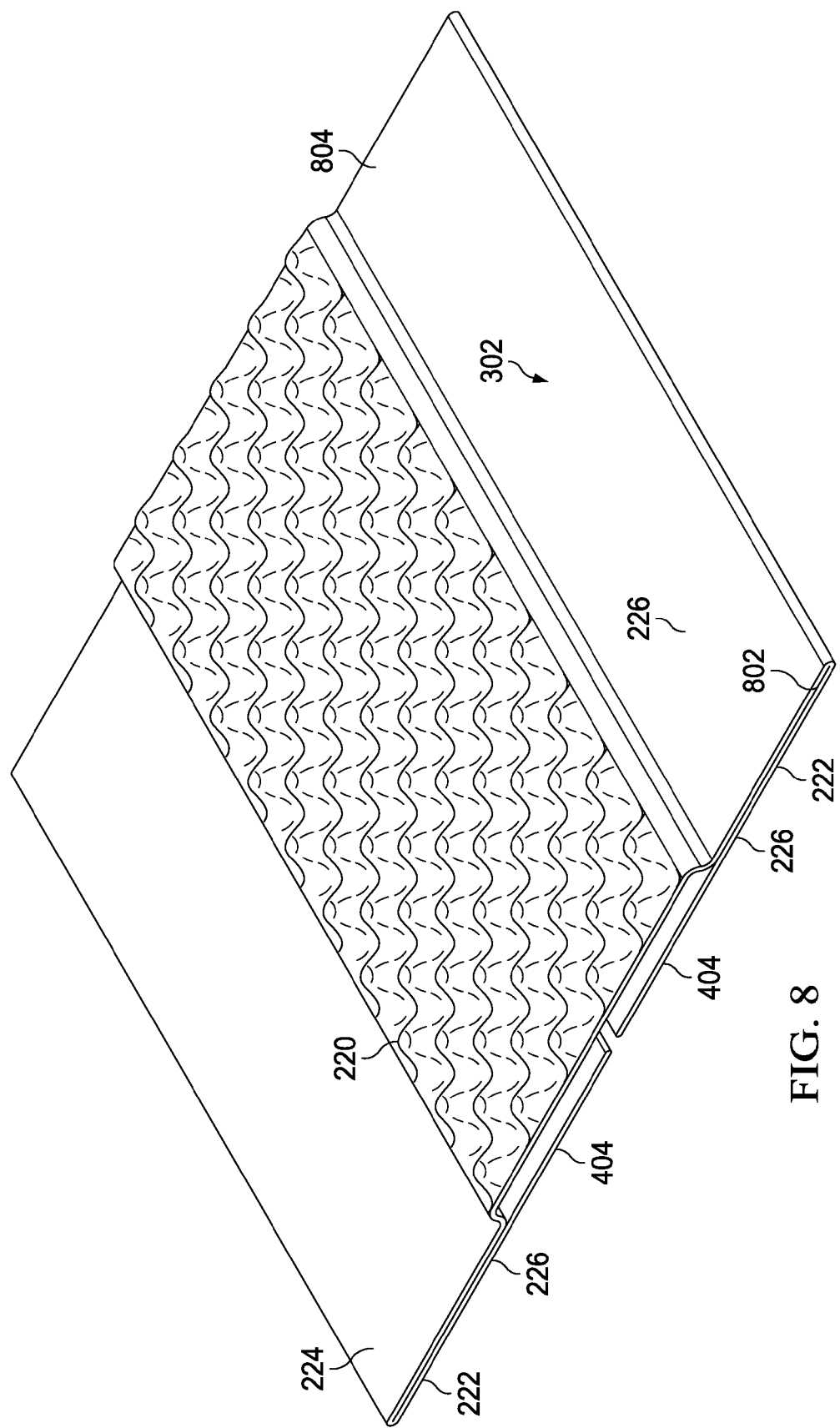
FIG. 8 is perspective view of the band of FIG. 7.

Referring now to FIGS. 7 and 8, there are illustrated, respectively, an enlarged end view and an enlarged perspective view of the flexible metal band 302 of FIGS. 3-6b. It will be appreciated that the length of the band 320 is reduced in FIG. 8 for purposes of illustration. In the illustrated embodiment, the flexible metal band 302 has a cross-sectional configuration similar to that illustrated and described in connection with FIGS. 2b-2h, including a compliant portion 220 having a three dimensional corrugated pattern and lateral portions 222 extending on each side of the compliant portion. The lateral portions 222 include proximal portions 224 disposed adjacent to the compliant portion 220 and distal portions 226 disposed on the opposite side of the proximal portion from the compliant portion. Each distal portion 226 has been folded back against the underside of the respective proximal portion 224 and portions of the underside of the compliant portion 220 so as to provide a relatively smooth inner surface 404 on the bottom side of the metal band 302 for subsequent pre-tinning (in most cases) and soldering to the perimeter edges 406 of the glass lites 304. In other words, the metal band 302 is folded into the configuration shown in FIGS. 7 and 8 prior to being fitted over (i.e., around the periphery of) the glass lites 304 forming the IGU/VIGU/HVIGU assembly 300. Preferably, the ends 802, 804 of the metal band 302 are also hermetically joined together before being fitted to the glass lites 304. In some embodiments, the ends 802, 804 are butt-welded together to form a hermetic joint that will withstand subsequent heating to soldering temperature and/or getter activation temperature without failing.

It will be readily appreciated that, in other embodiments (not illustrated), the flexible metal band 302 may have a cross-sectional configuration similar to those illustrated in connection with FIG. 2i-2L, 10, 11, 12, 13 or 14 prior to being fitted over the glass lites 304 of other IGU/VIGU/HVIGU assemblies.

In some alternative embodiments, one or more non-reflowable posts 402' (not shown), i.e., posts made from non-reflowable materials, may be used instead of using heat-reflowed solder posts 402 to hold the metal band 302 away from most of the perimeter of the two or more lites 304 during the bonding process where the desired atmosphere (a specific fill-gas for IGUs or a vacuum for VIGUs) is introduced into the cavity 203 between the pair or pairs of lites. Non-reflowable posts 402' may be used to maintain separation of straight and/or curved sections of the metal band 302 away from the perimeter of the lites 304 when the use of non-reflowed posts is desirable. These instances include, but are not limited to, when the heat-reflowed material that bonds the metal band 302 to the perimeter of the lites 304 is not easily compatible with existing materials that could be used for heat-reflowed posts 402. When such an incompatibility situation exists, the non-reflowable posts 402' may be formed of a material that will not contaminate the cavity 203 of the IGU or VIGU 300 and/or the surface of the band 302 and/or the surface of the lites 304 to-be-bonded surfaces with undesirable solids and/or gases during the introduction of the desired atmosphere between the one or more pairs of lites of the IGU or VIGU 300. Certain solids and/or gases might be undesirable for one or more reasons, include that the solid or out-gassing material of the posts negatively impacts the solder process in one or more places or that the out-gassing of the posts might contaminate the atmosphere within the cavity 203 between adjacent pairs of lites. Or it may be that a material that can be heat-reflowed and compatible with the heat-reflowed bonding material(s) does not exist or would be too expensive to fabricate. In some embodiments, non-reflowable posts 402' may be formed from metal materials, glass materials or ceramic materials having melting/decomposition temperatures above the temperature required for soldering the metal band 302 to the perimeter of the glass panes 304.

When non heat-reflowed posts 402' are used, they may be placed between the metal band 302 and perimeter portions 406 of the pairs of lites 304 in a similar fashion to that previously described for the (reflowable) solder posts 402. However, whereas it is desirable in many instances that the posts 402 composed of solder have a length approximately similar to the combined width of the solder-pretinned area on the metal band 302, the non-reflowed posts 402' may have a length sufficiently long as to extend past the width of the solder-pretinned area on the metal band so as to allow a mechanical system inside the reflow chamber to grab onto and pull these posts out of the space between the metal band and the perimeter of the two lites after the IGU/VIGU cavity 203 is filled/evacuated (as the case may be). In other words, the non-reflowable posts 402' are removed from between the metal band 302 and glass panes 304 after the cavity 203 of the IGU/VIGU 300 is filled/evacuated. The removal of the non-reflowable posts 402' may take place before or during heating of the assembly to form the hermetic seal between the metal band 302 and the perimeter of the glass lites 304.

Figure 9:
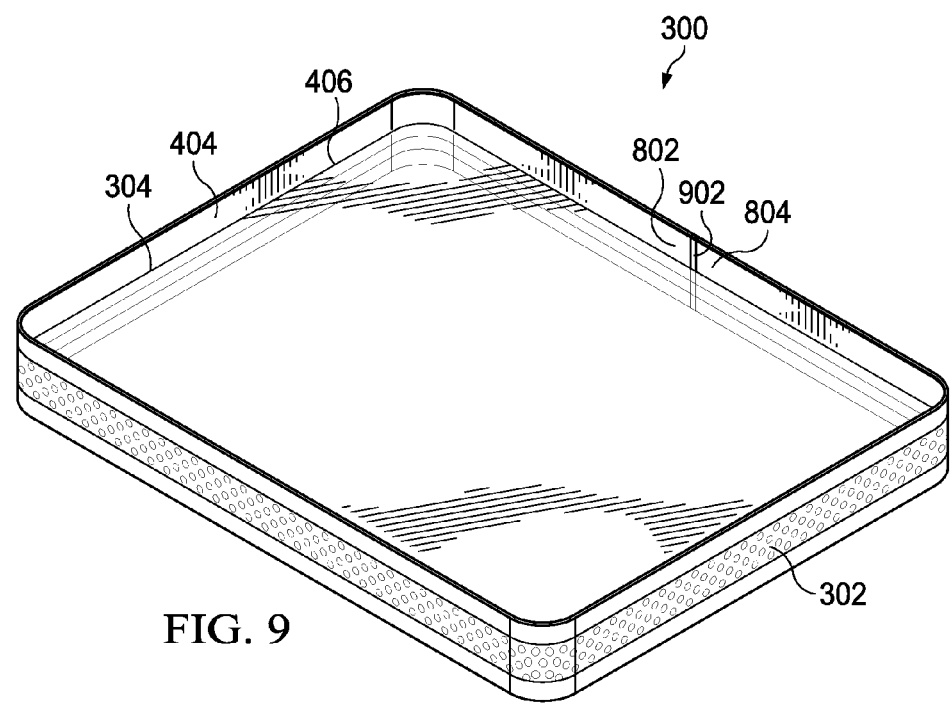
FIG. 9 shows an IGU or VIGU after the process of soldering the metal band to the two lites.

Referring now to FIG. 9, there is illustrated an IGU or VIGU 300 after the process of soldering the metal band 302 to the two lites 304 at an elevated temperature in an appropriate atmosphere. The IGU or VIGU 300 may include a flexible metal band 302 with the interior flange portions 404 of the band hermetically joined to the outer periphery portions 406 of the glass lites 304, and with the ends 802 and 804 hermetically joined by a butt weld 902. The posts 402 or 402' are no longer present in the form shown in FIGS. 6a and 6b because they have either melted (reflowed) to form part of the hermetic seal (if formed from a reflowable material such as solder) or been withdrawn from the assembly (if formed from a non-reflowable material).

Referring now generally to the FIGS. 1-9, the prevalent evacuation method used today to create a vacuum (very low pressure) in the cavity of a VIGU is to remove gases in the cavity though a vacuum septum (also known as a tube, port or portal) or another very small-area opening into the cavity and seal the septum or other opening shut after the desired low pressure level is achieved (see, e.g., tube 105 in FIG. 1). There are several problems with using a small-area opening. First, after mechanical flow, which is similar to sucking or drawing air and other gases from the VIGU cavity, gas removal becomes what is known as molecular flow. In molecular flow, atoms and molecules in the VIG's sealed cavity have to find the evacuation opening by random occurrence from the movement and bouncing of the atoms and molecules between the interior surfaces of the VIG's cavity. Second, for mostly cosmetic reasons, VIGU producers want to keep vacuum septums small in diameter. This cosmetic concern is counter-productive to rapid evacuation. And because most vacuum septums are constructed of a glass tube assembly fabricated onto or into a hole in one of the two lites, this septum must be hermetically sealed by some method (e.g. melting it shut with heat if it is a glass septum or crimping it shut if it is a metal septum). Then the VIGU producer usually adheres a metal disk over the septum by means of an adhesive or epoxy bonding process to protect the septum from physical damage. Thus, VIGU producers are using a small internal-diameter vacuum septum which has a small area opening for the randomly-moving atoms and molecules to find this escape path from the VIG's cavity. Depending on the depth and area of the VIG's cavity, the evacuation time required to reach $10^{-3}$ torr or lower internal pressure can require from two or three hours for a small IGU to one-half, one or several days for a large VIGU with a small-area septum.

The time required to evacuate the cavity of a VIGU to $10^{-3}$ torr or lower internal pressure can be achieved extremely rapidly if most or all of the perimeter area of the cavity between the two lites (hereafter referred to as the "boundary") could be exposed to the vacuum or low-atmospheric pressure which is desired for the VIGU's cavity after evacuation.

Apparatus constructed in accordance with the current disclosure expose a significant amount of the boundary to the desired level of vacuum prior to sealing the boundary by a hermetic sealing system. The sealing system may be one of a glass or ceramic frit or a metal band or metal sealing system.

After the desired level of vacuum is obtained in the cavity 203, the boundary in its entirety is hermetically sealed shut by use of either a glass or ceramic frit or a metal solder, which is melted while the VIGU 200, 300 remains in vacuum to create the hermetic seal; or by attaching (bonding) hermetically a hermetic metal band 205, 302 to the boundary of the VIGU while the VIGU remains in the vacuum chamber. Either material, the frit by itself or a metal band 205, 302 bonded to the perimeter of the lites 201, 202, 304 of the VIGU using a solder not limited to a glass or ceramic frit or a metal alloy solder, requires that the VIGU assembly 200, 300 be heated to or above the melting temperature of the solder material and that the solder be allowed to cool to its solidification temperature while the VIGU remains in the vacuum atmosphere.

In a preferred embodiment, the seal is a continuous metal band 205, 302 (refer to, e.g., FIG. 2b and FIG. 3) and the bonding material is a solder. The solder may be the frit material in powder, granular or paste form, or it may be a metal alloy.

To use a metal band 205, 302 around the periphery of two or more glass lites 201, 202, 304, the perimeter edges 213, 214, 406 of the glass lites are preferably pre-tinned with the selected hermetic sealing/bonding material. Likewise, the interior 226, 404 of the metal band 205, 302 which later will be soldered to the perimeter surfaces of the two or more glass lites 201, 202, 304 is preferably pre-tinned. Alternatively, only one of the surfaces of the glass lites 201, 202, 304 or metal band 205, 302 may be pre-tinned. Prior to exposing the VIGU 200, 300 to an appropriate level of vacuum, most likely in a single vacuum chamber or in a chamber of a multi-chamber vacuum system, the metal band 205, 302, which was initially sized to have an inner circumference a small amount less than the outer circumference of the glass lites 201, 202, 304, may be stretched to enable and then perform its placement around the perimeter of the two or more glass lites used to construct the VIGU (see also, e.g., FIGS. 2b and 3). The band 205, 302 may be made (i.e., fabricated or manufactured) from/using an elastic material, such as a stainless steel foil. The band 205, 302 may be stretched to a point or degree of increased circumference wherein it still is in its elastic state, avoiding over-stretching to where the band's material transitions to a plastic state. Then while still in a stretched or enlarged inner circumference state (obviously the outer circumference is also enlarged in length), the band 205, 302 is placed around the glass lites 201, 202, 304 of the VIGU 200, 300. A similar process may be used to assembly IGUs, wherein the assembly is exposed to a desired gas atmosphere (e.g., an insulating gas atmosphere such as argon) rather than a vacuum atmosphere after placement of the prepared metal band 205, 302 around the prepared glass lites 201, 202, 304.

As best seen in FIGS. 4, 6a and 6b, posts 402 of solder or posts 402' of non-reflowable material may be placed between the stretched metal band 302 and the perimeter of the lites 304 to produce a gap for ready evacuation of the cavity of the VIGU 300, i.e., when placed in an evacuated atmosphere. The posts 402, 402 may be flexible, semi-rigid or rigid at room temperature. Refer to FIG. 4. The solder posts may be similar in composition, melting temperature (liquid or liquidus temperature) and re-solidification temperature to that of solder or solders used to pre-tin the interior surfaces of the metal band that will be soldered to the perimeter surfaces of the two or more glass lites, and the perimeters of the glass lites themselves.

The posts 402 of solder or posts 402' of non-reflowable material in their flexible, semi-rigid or rigid state separate the metal band 302 from the periphery or perimeter 406 of the glass lites 304 (see, e.g., FIGS. 5, 6*a* and 6*b*). With the separation of the band 302 from the glass lites 304, a significant amount of the boundary area is not yet sealed, but rather, is exposed to the atmosphere surrounding the VIGU assembly 300.

Next, the VIGU assembly 300 with the solder posts 402 or non-reflowable posts 402' separating some or the entire metal band 302 from the perimeter surfaces 406 of the glass lites 304 is transferred by manual, semi-automated or automated means into a vacuum chamber. A desired level of vacuum is created in the vacuum chamber. When the desired level of vacuum is attained in the chamber and in the cavity 203 or cavities between adjacent pairs of lites 304 (inside the boundary region or area), or during the evacuation (i.e., pressure reduction) of the vacuum chamber and the cavity of the VIGU, a heat source inside of, or part of the chamber's wall or walls heats up the VIGU assembly to a pre-determined temperature above the liquid or liquidus temperature of all the solders used for both pre-tinning the inside surface of the metal band 302, the perimeter 406 of the glass lites 304 and/or the posts 402 of solder. The heat source may produce radiant energy to heat the glass lites 304 and the metal band 302. Radiant heat sources include but are not limited to resistive heating elements and infrared heat sources of appropriate wavelengths. The temperatures of the perimeters of the two lites 304 and their pre-applied solders are controlled to reach or exceed the melting temperature of all employed solders only after the VIGU's cavity 203 is at the desired post-assembly vacuum level.

After the solders have liquefied, including the solder posts 402 (if present), and after any non-reflowable posts 402' are withdrawn from the assembly, the band 302 which was held apart from some or all of the boundary, being elastic (and under tension), will contract so that a liquid solder is in contact between 100% of the perimeter or periphery 406 of the glass lites 304 and the interior surface 404 of the metal band 302. If necessary, tooling or other mechanical means may be employed to ensure that a liquid solder is in contact between 100% of the perimeter or periphery 406 of the glass lites 304 and the band 302 by applying pressure to one or more places along the outside of the metal band with this pressure applied in the direction of, or towards the perimeter of, the VIGU's lites.

Once the appropriate time is allowed at the appropriate temperature of the glass and metal for the solder to form a continuous or contiguous seal between the glass lites 304 and the desired inside surfaces of the metal band 302, the VIGU assembly 300 is allowed or forced to cool while still in a vacuum chamber (i.e., either in the same vacuum chamber where heated or in a separate, but connected vacuum chamber such as one would find in an in-line vacuum system with or without vacuum air-locks) to a temperature below which the solders are all now in a solid state. Once the solders are all solidified, the VIGU 300 may be removed from the vacuum chamber. The VIGU 300 now has a vacuum in its cavity 203 at and inside its boundary (see, e.g., FIG. 9).

In another embodiment, the cavity-facing edges of the glass lites at their perimeters are beveled or chamfered (see, e.g., FIGS. 2*e* and 2*f*). These chamfers or bevels 242, 243 ensure that the metal band 205 extends past the two lites' perimeter surfaces 213, 214 so all of the perimeter surfaces are in compression after the solder bonds, metal band and two lites 201, 202 are allowed to cool down to ambient or room temperature.

In yet another embodiment, shown in FIGS. 2*g* and 2*h*, lite 201's perimeter surface 213 is chamfered on both ends, creating surfaces 241 and 242.

Likewise, both sides of lite 202's perimeter surface 214 are chamfered, creating surfaces 243 and 244. In some instances, the metal band 205 surrounding and eventually soldered to the perimeters of the two lites 201 and 202 may have a higher coefficient of thermal expansion ("CTE" or "TCE") than that of the glass lites. After the solder reflow operation in an evacuated space is performed and the assembly 200 is cooling from the peak soldering temperature back to ambient, if the metal band 205 has a higher CTE than the glass (i.e., 201, 202), it will contract at a greater rate than the glass. This greater contraction of the band 205 relative to the perimeter area's contraction of the glass lites 201, 202 will create a compression bond, meaning the band's natural state at ambient (room) temperature is to have a smaller circumference than the circumference of the glass lites, resulting in the band creating compressive forces on the glass lites around their perimeter surfaces. Adjacent to the compressive forces in the glass lite's perimeter areas are tensile forces. The chamfers 242 and 243 shown in FIG. 2*e* ensure that the metal band extends past the two lites' perimeter surfaces 213 and 214 so all of 213 and 214 are in compression after the solder bonds, metal band and two lites are allowed to cool down to ambient or room temperature.

The embodiment of FIGS. 2*e* and 2*f* is substantially is similar to the embodiment of FIGS. 2*b* and 2*d*, except in the embodiment of FIGS. 2*e* and 2*f*, the glass lites 201 and 202 have chamfered or beveled edges, namely, chamfer 242 on lite 201 and chamfer 243 on lite 202. The chamfers 242 and 243 are on the cavity 203 side of the IGU/VIGU 200. In some instances, the metal band 220 surrounding and eventually soldered to the perimeters of the two lites 201 and 202 may have a higher coefficient of thermal expansion ("CTE" or "TCE") than that of the glass lites. After the solder reflow operation in an evacuated space is performed, and the assembly 200 is cooling from the peak soldering temperature back to ambient, if the metal band 205 has a higher CTE than the glass, it will contract at a greater rate than the glass. This greater contraction of the band relative to the perimeter area's contraction of the glass lites 201, 202 will create a compression bond, meaning the band's natural state at ambient (room) temperature is to have a smaller circumference than the circumference of the glass lites, resulting in the band creating compressive forces on the glass lites in and around their perimeter surfaces. Adjacent to the compressive forces in the glass are tensile forces. The chamfers 242 and 243 shown in FIG. 2*e* ensure that the metal band extends past the two lites' perimeter surfaces 213 and 214 so all of 213 and 214 are in compression after the solder bonds, metal band and two lites are allowed to cool down to ambient or room temperature.

Avoiding the need for a VIGU 300 to employ one or more conventional vacuum septums by the method of using a metal band 302 surrounding the boundary of the lites 304 and using solder posts 402 or non-reflowable posts 402' to expose a significant portion or all of the boundary to the vacuum inside a vacuum chamber allows the cavity 203 of the VIGU to be evacuated in a small fraction of time that would be required if one or more vacuum septums were the only escape path for gases in the VIGU's cavity or cavities for the evacuation of the cavity or cavities. The process thus described may be relatively simple and inexpensive compared to conventional processes. Evacuating VIGUs by means of conventional vacuum septums requires a vacuum pump system capable of achieving the desired level of vacuum inside the VIGU's cavity. Due to the long cycle time required for the molecular flow portion of the evacuation of a VIGU through one or more conventional vacuum septums, producing such VIGUs in even small volumes would require a vacuum pump system of significant capacity and/or multiple VIGUs to have their conventional vacuum septums attached simultaneously by vacuum turbine to the vacuum pump system and/or to have multiple VIGUs with conventional vacuum septums inside a high-vacuum chamber for long pump-out cycle times. Using the described method of employing a metal band 302 and solder posts 402 or non-reflowable posts 402' during the evacuation process still requires a vacuum pump system. However, the evacuation chamber system can be designed and constructed to be an automated in-line system with near solid-state vacuum levels in consecutive chambers by proper employment of air-locks (vacuum locks). Also, in-line vacuum systems are known wherein these in-line vacuum systems have no air locks (vacuum locks). Whether the vacuum system for the VIGU using a metal band 302 and solder posts 402 or non-reflowable posts 402' during the final soldering system employs air-locks or not is a matter of system design. In either case, the use of a metal band 302 and posts 402 and/or 402' described in this application greatly reduces the evacuation cycle time and number of VIGUs in a queue during the evacuation process in production environments.

Figure 10:
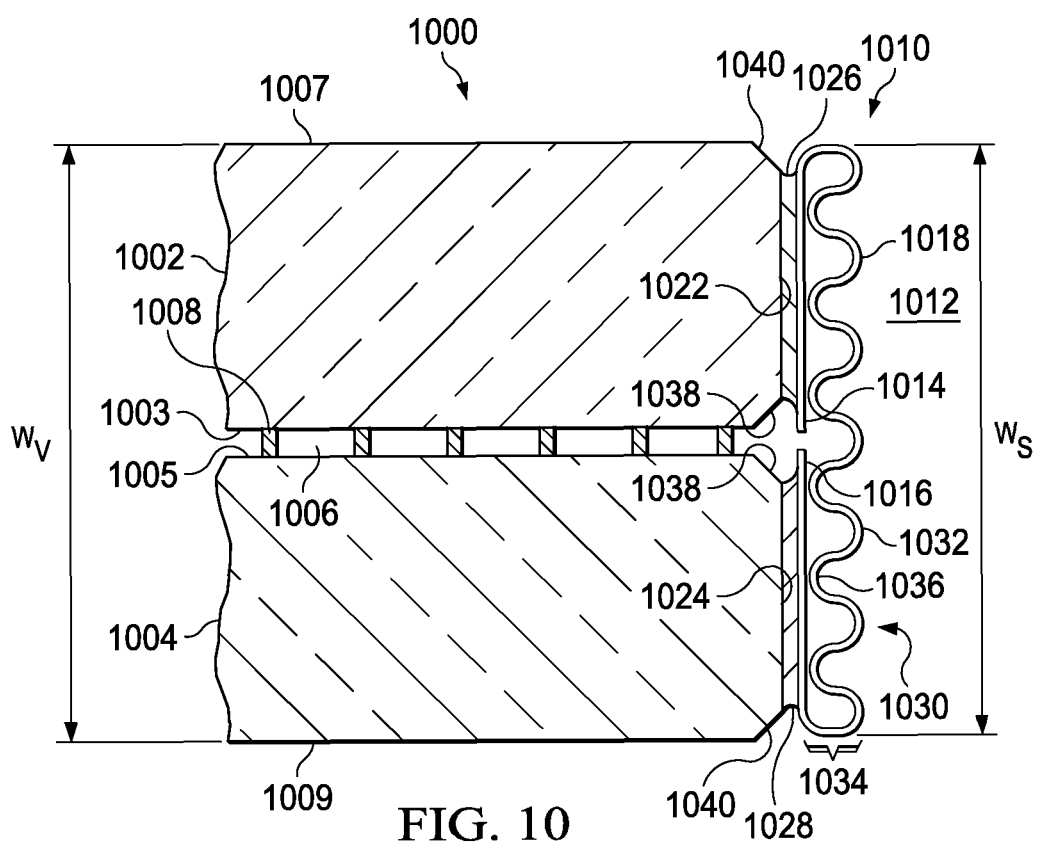
FIG. 10 is a partial cross-sectional view of an IGU or VIGU assembly including a one-piece hermetic edge seal in accordance with another embodiment.

Referring now to FIG. 10, an IGU or VIGU having a flexible edge seal assembly in accordance with another aspect is shown. For ease of description, this aspect will be described in terms of a VIGU, however, it will be understood that the description will apply equally well to an IGU. VIGU 1000 includes a first lite 1002 and second lite 1004, which are spaced apart to define an insulating cavity 1006 (which will later be evacuated) disposed between respective inward facing surfaces 1003 and 1005 of first and second lites. The lites 1002, 1004 may be formed of a transparent hermetic material including, but not limited to, glasses such as soda lime glass or borosilicate glass or glass ceramic. A plurality of stand-off members 1008 may be positioned in the cavity 1006 between the lites 1002, 1004 to maintain separation of the lites. The stand-off members 1008 may be affixed to one or both of the inward facing surfaces 1003, 1005 of the lites 1002, 1004 or held in place by other means, e.g., suspended on or around fibers or filaments or held in position by friction between the lites. The stand-off members 1008 may be formed of glass, ceramic, metal or other materials having high compression strength and little or no out-gassing.

The VIGU 1000 further comprises an edge seal assembly 1010 attached to the two lites 1002, 1004 (i.e., around the entire periphery of the lites) as described herein so as to form a hermetic seal between the cavity 1006 and the external environment (denoted by reference number 1012), i.e., the atmosphere adjacent to the VIGU, but external to the cavity 1006. In the embodiment illustrated in FIG. 10, the edge seal assembly 1010 includes a first hermetic bonding portion 1014, a second hermetic bonding portion 1016 and a compliant portion 1018 disposed therebetween. The first hermetic bonding portion 1014 is hermetically bonded to the first lite 1002, and the second hermetic bonding portion 1016 is hermetically bonded to the second lite 1004. In the illustrated embodiment, the first and second bonding portions 1014, 1016 are bonded to respective edges 1022, 1024 of the lites by hermetic bonds 1026, 1028. The hermetic bond between the lites 1002, 1004 and the bonding portions 1014, 1016 of the edge seal may be formed from solder. In some embodiments, the solder of the hermetic bonds 1026, 1028 may be a metallic solder, whereas in other embodiments, the solder may be a solder glass (also known as "glass frit") or other materials. The solder of the hermetic bonds 1026, 1028 may be applied by localized heating at the hermetic joint area, by overall heating of the entire assembly (e.g., reflowing), or with the addition of ultrasonic energy to the bond area during bonding (e.g., ultrasonic soldering).

The compliant portion 1018 of the edge seal 1010 may include a three dimensional pattern 1030. The three dimensional pattern 1030 may deform primarily by bending (rather than by stretching) during relative movement between the lites 1002, 1004. In some embodiments, the three dimensional pattern 1030 is compliant in three dimensions to allow relative movement and/or differential thermal expansion between the lites 1002, 1004 in all three directions. In the embodiment illustrated in FIG. 10, the three-dimensional pattern 1030, when viewed in cross section, includes a plurality of corrugations 1032 arranged in a single course (i.e., layer) 1034 disposed directly adjacent to the first and second bonding portions 1014, 1016. The corrugations 1032 may have inner extrema 1036 that bear against the first and second bonding portions 1014, 1016, thereby supporting the compliant portion 1018. In some embodiments of the edge seal 1010, the corrugations 1032 may run continuously across the surface of the compliant portion 1018 such that all cross-sectional views are identical. In other embodiments of the edge seal 1010, the corrugations 1032 may be disposed in a staggered configuration such that adjacent areas of the compliant portion 1018 have complimentary cross-sections. In still other embodiments of the edge seal 1010, the three-dimensional pattern 1030 may be configured as a dimpled surface (see, e.g., FIGS. 6a, 7, 8 and 9) such that the corrugations 1032 propagate in multiple directions across the compliant portion 1018.

Referring still to FIG. 10, in the illustrated embodiment, the edges 1022, 1024 of the lites 1002, 1004 have both inner chamfers 1038 and outer chamfers 1040. Other embodiments may have only inner chamfers 1038 or only outer chamfers 1040. Still other embodiments may have no chamfers. In the illustrated embodiment, the bonding portions 1014, 1016 of the edge seal 1010 are bonded, via hermetic bonds 1026, 1028, across the entire perimeter edge 1022, 1024 of the lites, but not on the chamfers 1038, 1040. The chamfers 1038, 1040 ensure that the bonding portions 1014, 1016 of the edge seal assembly 1010 may extend at least along the entire width of the perimeter surfaces 1022, 1024 of the lites 1002, 1004 so that all of edge surfaces are in compression after the solder bonds 1026, 1028, edge seal 1010 and lites 1002, 1004 are allowed to cool down to ambient or room temperature following soldering used for hermetic bonding.

In some embodiments, the edge seal 1010 may be formed from a single piece of metal, e.g., a metallic foil, upon which the three dimensional pattern 1030 of the compliant portion 1018 is formed prior to bonding. In other embodiments, the edge seal 1010 may be formed from multiple components joined together (e.g., by soldering or welding) before or after the edge seal is bonded to the lites 1002, 1004. In various embodiments, the three dimensional pattern 1030 may be formed by stamping, rolling or other metal-forming methods. In some embodiments, the material of the edge seal 1010 is spoolable, i.e., it may be stored in a rolled-up state on a spool (or reel) until needed for assembly. The material of the edge seal 1010 may be soldered and/or welded to form a continuous seal around the VIGU 1000.

Figure 11:
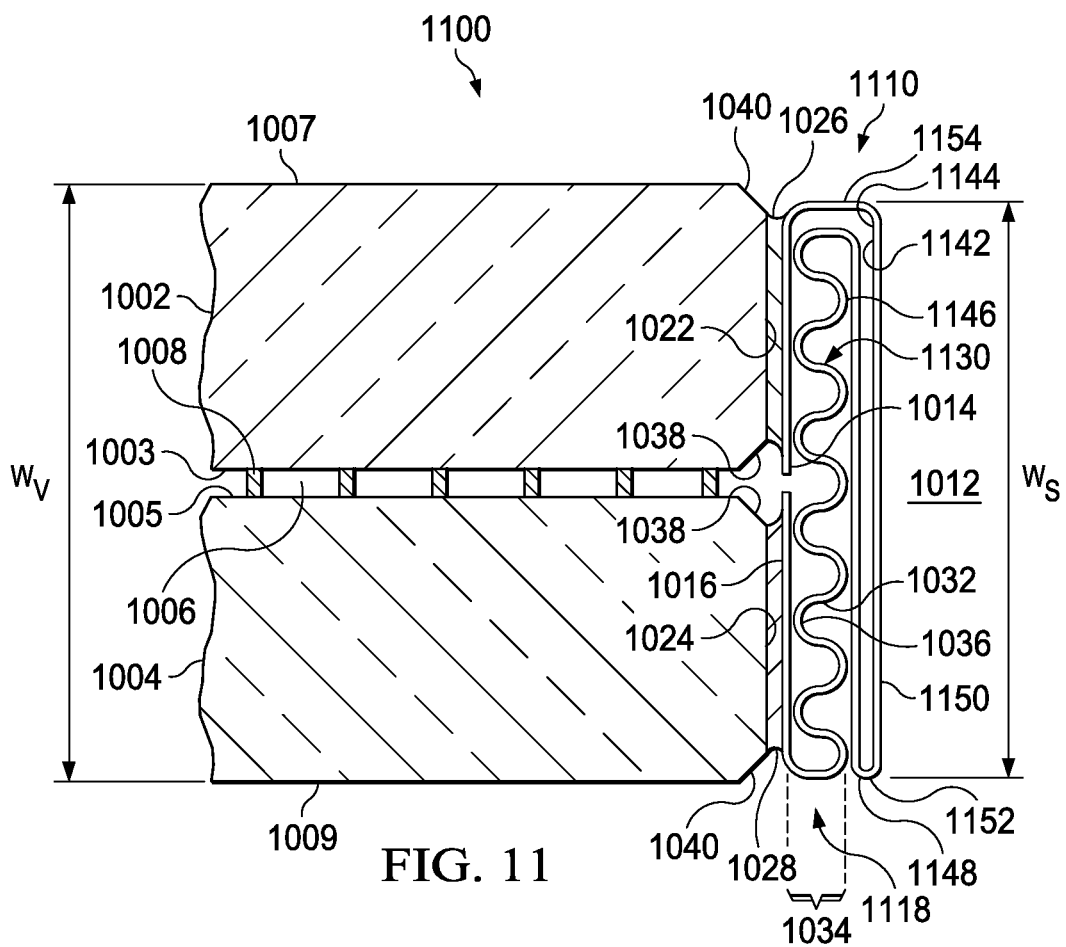
FIG. 11 is a partial cross-sectional view of an IGU or VIGU assembly including a one-piece hermetic edge seal having a relatively flat outer periphery in accordance with another embodiment.

Referring now to FIG. 11, an IGU or VIGU having a flexible edge seal assembly in accordance with yet another aspect is shown. Again, for ease of description, this aspect will be described in terms of a VIGU, however, it will be understood that the description will apply equally well to an IGU. Except as otherwise noted, VIGU 1100 is substantially identical to the VIGU 1000 of FIG. 10; thus VIGU 1100 includes first and second lites 1002, 1004, which are spaced apart to define an insulating cavity 1006 disposed between respective inward facing surfaces 1003 and 1005. A plurality of stand-off members 1008 may be positioned in the cavity 1006 between the lites 1002, 1004 to maintain separation of the lites.

The VIGU 1100 further comprises an edge seal assembly 1110 attached to the two lites 1002, 1004 (i.e., around the entire periphery of the lites) to form a hermetic seal between the cavity 1006 and the external environment 1012. The edge seal assembly 1110 of the VIGU 1100 has a different configuration than the edge seal 1010 of the VIGU 1000. As seen in FIG. 11, the edge seal assembly 1110 includes a first hermetic bonding portion 1014, a second hermetic bonding portion 1016 and a compliant portion 1118 disposed therebetween. The first hermetic bonding portion 1014 is hermetically bonded to the first lite 1002, and the second hermetic bonding portion 1016 is hermetically bonded to the second lite 1004. This is similar to the VIGU 1000. The first and second bonding portions 1014, 1016 are bonded to respective edges 1022, 1024 of the lites by hermetic bonds 1026, 1028, and the hermetic bonds may be formed from solder. This is also similar to the VIGU 1000.

The compliant portion 1118 of the edge seal 1110 of the VIGU 1100 may include a three dimensional pattern 1130. As with the compliant portion 1018 of edge seal 1010, the three dimensional pattern 1130 may deform primarily by bending (rather than by stretching) during relative movement between the lites 1002, 1004. In the embodiment illustrated in FIG. 11, the three-dimensional pattern 1130, when viewed in cross section, includes a plurality of corrugations or dimples 1032 arranged in a single layer or course 1034 disposed directly adjacent to the first and second bonding portions 1014, 1016. The corrugations 1032 may have inner extrema 1036 that bear against the first and second bonding portions 1014, 1016, thereby supporting the compliant portion 1118. As with the edge seal 1010, the corrugations 1032 of the edge seal 1110 may run continuously across the surface of the compliant portion 1118 such that all cross-sectional views are identical. In other embodiments of the edge seal 1110, the corrugations 1032 may be disposed in a staggered configuration, and in still other embodiments the three-dimensional pattern 1030 may be configured as a dimpled surface as previously described.

The edge seal 1110 further comprises a first relatively flat portion 1142 extending from a first end 1144 connected to one end of the course 1034 of corrugations 1032, and bearing across outer extrema 1146 of the corrugations to a second end 1148. The edge seal 1110 further comprises a second relatively flat portion 1150 extending from a first end 1152 connected to the second end 1148 of the first flat portion 1142 to a second end 1154 that is disposed adjacent to the first end 1144 of the first flat portion. In other words, the first flat portion 1142 lines across the "tops" (i.e., outer extrema 1146) of the corrugations 1032, and the second flat portion 1150 is folded back to lie across the first flat portion. In this way, the corrugations 1032 are physically or mechanically protected by a pair of flat portions 1142, 1150, while still maintaining a flexible hermetic seal between the cavity 1006 and the environment 1012.

Referring still to FIG. 11, in the illustrated embodiment, the edges 1022, 1024 of the lites 1002, 1004 have both inner chamfers 1038 and outer chamfers 1040. Other embodiments may have only inner chamfers 1038 or only outer chamfers 1040. Still other embodiments may have no chamfers.

Figure 12:
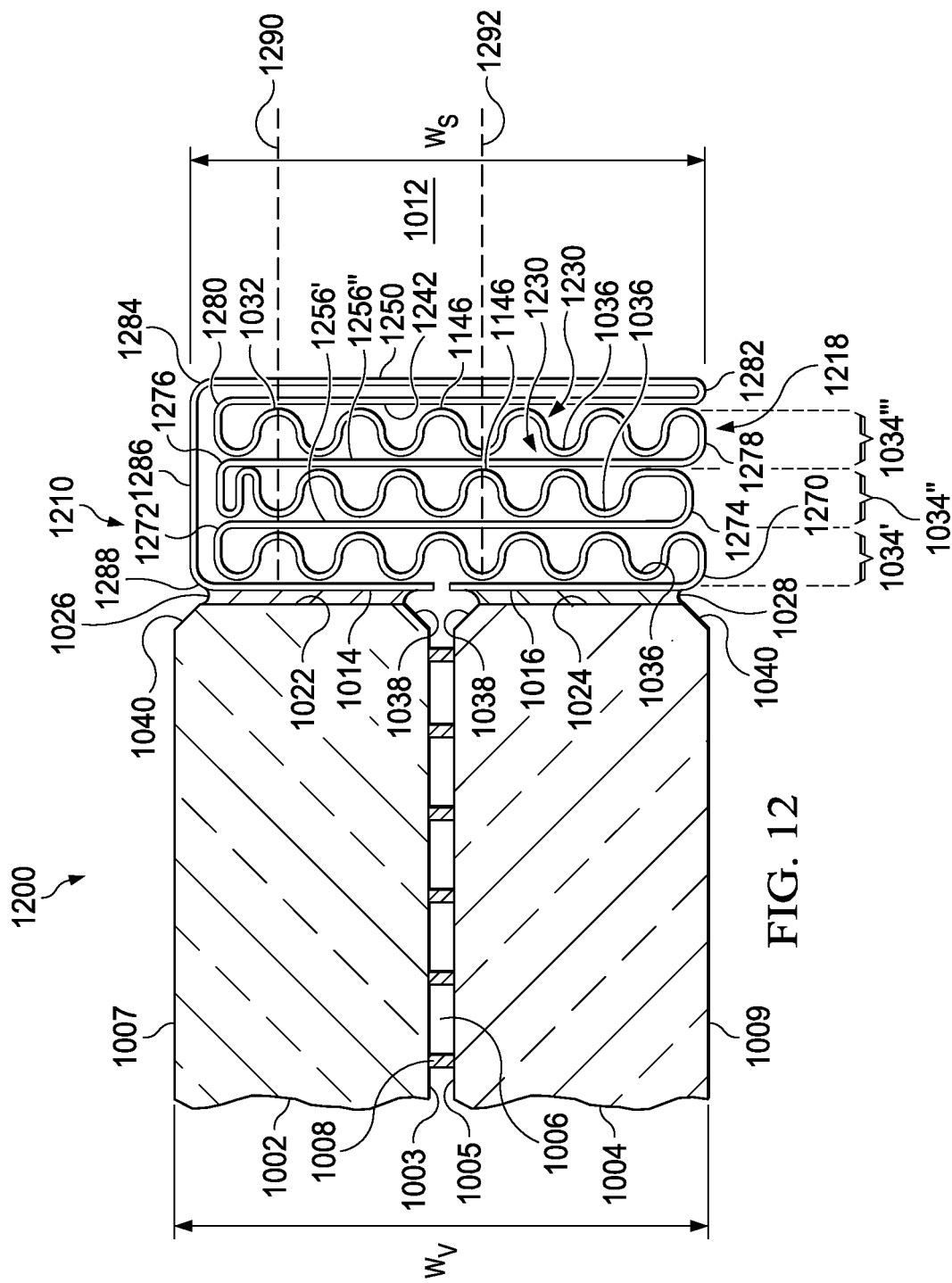
FIG. 12 is a partial cross-sectional view of an IGU or VIGU assembly including a one-piece, multi-layered hermetic edge seal in accordance with another embodiment.

Referring now to FIG. 12, an IGU or VIGU having a flexible edge seal assembly in accordance with yet another aspect is shown. Again, for ease of description, this aspect will be described in terms of a VIGU, however, it will be understood that the description will apply equally well to an IGU. Except as otherwise noted, VIGU 1200 is substantially identical to the VIGUs 1000 and 1100 of FIGS. 10 and 11. The VIGU 1200 includes first and second lites 1002, 1004, which are spaced apart to define an insulating cavity 1006 disposed between respective inward facing surfaces 1003 and 1005. A plurality of stand-off members 1008 may be positioned in the cavity 1006 between the lites 1002, 1004 to maintain separation of the lites.

The VIGU 1200 further comprises an edge seal assembly 1210 attached to the two lites 1002, 1004 (i.e., around the entire periphery of the lites) to form a hermetic seal between the cavity 1006 and the external environment 1012. The edge seal assembly 1210 of the VIGU 1200 has a different configuration than the edge seals 1010 and 1110 of the VIGUs 1000 and 1100. The edge seal assembly 1210 includes a first hermetic bonding portion 1014, a second hermetic bonding portion 1016 and a compliant portion 1218 disposed therebetween. The first hermetic bonding portion 1014 is hermetically bonded to the first lite 1002, and the second hermetic bonding portion 1016 is hermetically bonded to the second lite 1004. This is similar to the VIGUs 1000 and 1100. The first and second bonding portions 1014, 1016 are bonded to respective edges 1022, 1024 of the lites by hermetic bonds 1026, 1028, and the hermetic bonds may be formed from solder. This is also similar to the VIGUs 1000 and 1100.

Referring still to FIG. 12, the compliant portion 1218 of the edge seal 1210 of the VIGU 1200 may include a three dimensional pattern 1230. As with the compliant portion 1018 of edge seal 1010 (FIG. 10) and the compliant portion 1118 of edge seal 1110 (FIG. 11), the three dimensional pattern 1230 may deform primarily by bending rather than by stretching during relative movement between the lites 1002, 1004. In the VIGU 1200, the three-dimensional pattern 1230 includes a plurality of corrugations or dimples 1032 arranged in a plurality of layers or courses 1034', 1034" and 1034''' (collectively, "1034"), with the first course 1034' disposed directly adjacent to the first and second bonding portions 1014, 1016, and with each subsequent course disposed adjacent to the previous course, but successively further from the bonding portions. The three-dimensional patterns 1230 on each course 1034 may be identical or may have different sizes, numbers and/or shapes of corrugations 1032 or dimples. Interposed between each pair of courses 1034 of corrugations or dimples 1032 is a separator portion 1256' and 1256" (collectively, "1256"). In some embodiments, the separator portions 1256 may be relatively flat. In other embodiments, the separator portions 1256 may have a three-dimensional pattern, where such pattern is selected to promote movement of the adjacent corrugated layers 1034. For example, the three-dimensional pattern of the separator portions 1256 may be selected with corrugations of a different shape, frequency and/or magnitude from the corrugations 1032 of the courses 1034 so that the corrugations of the adjacent structure slide as freely as possible. It will be understood that the constituent features of the edge seal 1210 are connected together in a continuous manner between the first bonding portion 1014 to the second bonding portion 1016 to provide a hermetic seal between the cavity 1006 and the exterior environment 1012.

In some embodiments, one or more surfaces 1230 and/or 1256 and/or 1242 may be coated with a friction-reducing material, or a friction-reducing material may be placed during roll forming inside one or more adjacent surfaces of the three-dimensional pattern 1230. Such friction-reducing materials allow the various components of the edge seal 1210 to more readily move relative to one another during thermally- or mechanically-induced movement of the edge seal.

In the embodiment illustrated in FIG. 12, the three-dimensional pattern 1230, when viewed in cross section, includes a plurality of corrugations or dimples 1032 arranged in a plurality of courses 1034, with the first course 1034' disposed directly adjacent to the first and second bonding portions 1014, 1016, and with subsequent courses 1034" and 1034' disposed successively further from the bonding portions. In the illustrated embodiment, the second bonding portion 1016 is connected to one end (1270) of the first course 1034' of corrugations 1032. The inner extrema 1036 of the corrugations 1032 in the first course 1034' bear against the first and second bonding portions 1014, 1016, and the outer extrema 1146 bear against a first separator portion 1256', which is connected to the opposite end (1272) of the first course of corrugations. The first separator portion 1256' runs back across the corrugations of the first course 1034' and connects to one end (1274) of the second course 1034". The inner extrema 1036 of the corrugations 1032 in the second course 1034" bear against the first separator portion 1256' and, and the outer extrema 1146 bear against a second separator portion 1256", which is connected to the opposite end (1276) of the second course of corrugations. The second separator portion 1256" runs back across the corrugations of the second course 1034" and connects to one end (1278) of the third course 1034'. The inner extrema 1036 of the corrugations 1032 in the third course 1034' bear against the second separator portion 1256" and the outer extrema 1146 bear against a first relatively flat portion 1242, which is connected to the opposite end (1280) of the third course 1034'. The first relatively flat portion 1242 runs back across the corrugations of the third course 1034' and connects to one end (1282) of a second relatively flat portion 1250. The second relatively flat portion 1250 runs back across the first relatively flat portion 1242 in a fashion similar to flat portions 1142 and 1150 in VIGU 1100 (FIG. 11). The second relatively flat portion 1250 is connected at a second end (1284) to a return portion 1286, which runs across the ends of the courses 1034', 1034" and 1034' until it connects at an outer end (1288) to the first bonding portion 1014. In this manner, a flexible seal is provided including multiple layers or courses 1034 of dimples or corrugations 1032.

It will be appreciated that positioning the separator portions 1256 between the courses 1034 of corrugations or dimples 1032 allows the corrugations to move back and forth (e.g., sliding across the surface of the separator portion) without the corrugations of one course projecting into the corrugations of an adjacent course. This prevents the corrugations 1032 from one course 1034 from rubbing or "catching" in the corrugation of an adjacent course when the lites 1002, 1004 move relative to one another because of mechanical loads or thermal expansion. In some embodiments, the separator portions 1256 may be relatively flat. In other embodiments, the separator portions 1256 may have a three-dimensional pattern, where such pattern is selected to promote movement of the adjacent corrugated layers 1034. For example, the three-dimensional pattern of the separator portions 1256 may be selected with corrugations of a different shape, frequency and/or magnitude from the corrugations 1032 of the courses 1034 so that the corrugations of the adjacent structure slide as freely as possible.

Referring still to FIG. 12, in the illustrated embodiment, the outer extrema 1146 of each course 1034 are aligned with the inner extrema 1036 of the adjacent course, and the inner extrema of each course are aligned with the outer extrema of the adjacent course, along a line running substantially perpendicular to the edges 1022, 1024 of the lites. For example, one inner extremum 1036 and two outer extrema 1146 are aligned along line 1290 running substantially perpendicular to the edge 1022. Similarly, two inner extrema 1036 and one outer extremum 1146 are aligned along line 1292 running substantially perpendicular to the edge 1024. In other embodiments, the inner and/or outer extrema 1036, 1146 may not be aligned with the extrema in other courses. In still other embodiments, relative placement of the extrema 1036, 1146 in each course may be essentially random. Thus, alignment of the extrema, while desirable in some cases, is not essential.

As with the edge seals 1010 and 1110 of FIGS. 10 and 11, the corrugations 1032 of the edge seal 1210 may run continuously across the surface of the compliant portion 1218 such that all cross-sectional views are identical. In other embodiments of the edge seal 1210, the corrugations 1032 may be disposed in a staggered configuration, and in still other embodiments the three-dimensional pattern 1230 may be configured as a dimpled surface as previously described.

Referring still to FIG. 12, in the illustrated embodiment, the edges 1022, 1024 of the lites 1002, 1004 have both inner chamfers 1038 and outer chamfers 1040. Other embodiments may have only inner chamfers 1038 or only outer chamfers 1040. Still other embodiments may have no chamfers.

In some applications, it is desirable to have edge seals that do not protrude above (or below) the exterior surfaces of the glass lites 1002, 1004. Referring still to FIG. 12, and now also again to FIGS. 10 and 11, it will be noted that some embodiments of the edge seals 1010, 1110 and 1210 in accordance with the aspects described herein may have an overall width (denoted $W_S$ in FIGS. 10, 11 and 12) that is less than or equal to the overall width of the lites of the VIGU (denoted $W_V$ in FIGS. 10, 11 and 12), where both $W_S$ and $W_V$ are measured in a direction perpendicular to the viewing surfaces of the lites 1002, 1004. Note that in this case, the width $W_V$ of the VIGU is considered to be the width between the exterior-facing surfaces 1007, 1009 of the lites 1002, 1004. In other embodiments, however, the width $W_S$ of the edge seal may be greater than the width $W_V$ of the lites of the VIGU.

Figure 13:
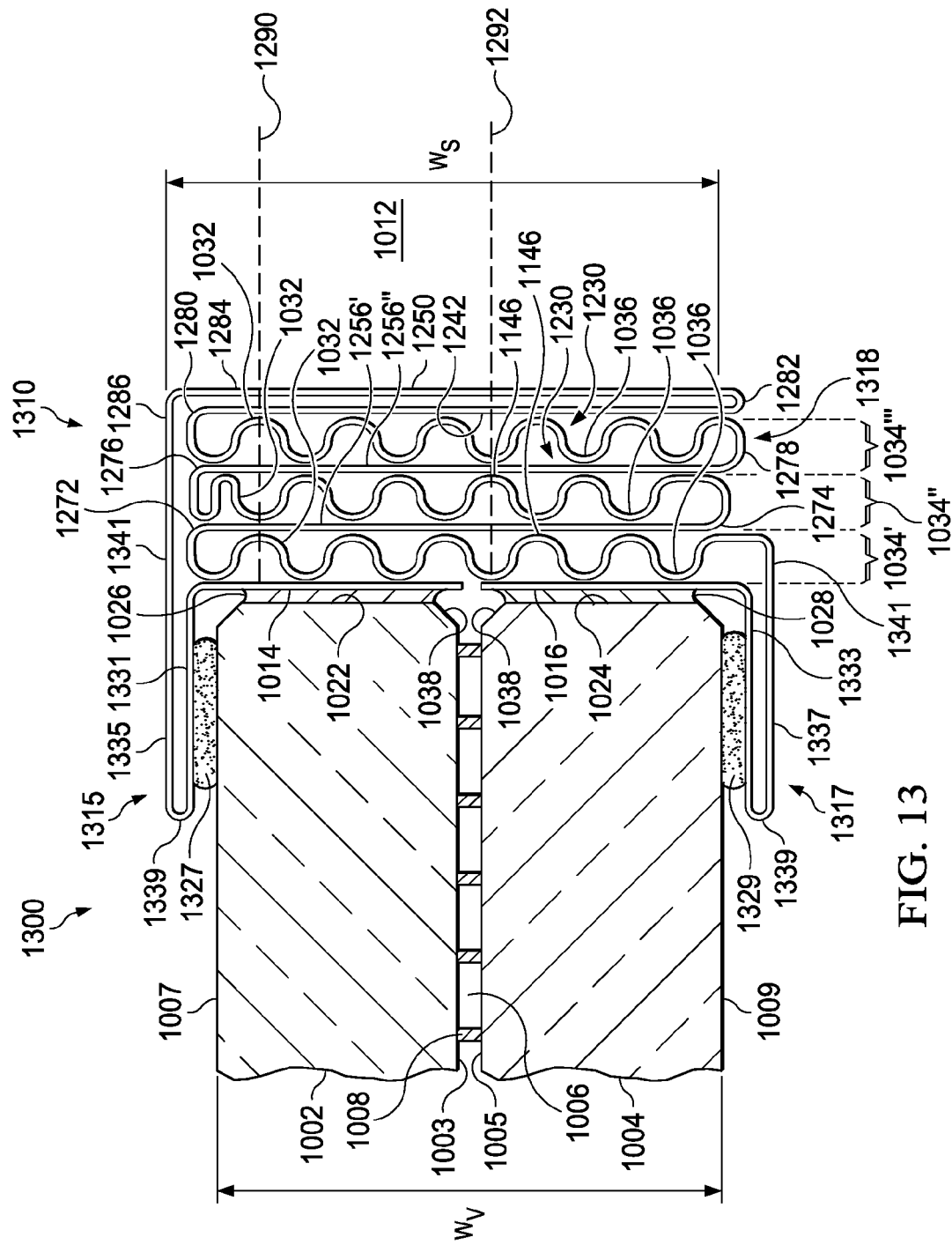
FIG. 13 is a partial cross-sectional view of an IGU or VIGU assembly including a one-piece edge seal with hermetic and structural bonds in accordance with another embodiment.

Referring now to FIG. 13, an IGU or VIGU having a flexible edge seal assembly in accordance with a further aspect is shown. Again, for ease of description, this aspect will be described in terms of a VIGU, however, it will be understood that the description will apply equally well to an IGU. Except as otherwise noted, VIGU 1300 is substantially identical to the VIGU 1200 previously described. The VIGU 1300 includes first and second lites 1002, 1004, which are spaced apart to define an insulating cavity 1006 disposed between respective inward facing surfaces 1003 and 1005. A plurality of stand-off members 1008 may be positioned in the cavity 1006 between the lites 1002, 1004 to maintain separation of the lites.

The VIGU 1300 further comprises an edge seal assembly 1310 attached to the two lites 1002, 1004 (i.e., around the entire periphery of the lites) to form a hermetic seal between the cavity 1006 and the external environment 1012. The edge seal assembly 1310 of the VIGU 1300 includes a first hermetic bonding portion 1014, a second hermetic bonding portion 1016 and a compliant portion 1318 disposed therebetween. The first hermetic bonding portion 1014 is hermetically bonded to the first lite 1002, and the second hermetic bonding portion 1016 is hermetically bonded to the second lite 1004. This is similar to the VIGU 1200 of FIG. 12. The first and second bonding portions 1014, 1016 are bonded to respective edges 1022, 1024 of the lites by hermetic bonds 1026, 1028, and the hermetic bonds may be formed from a hermetic material including, but not limited to, solder. This is also similar to the VIGU 1200.

As shown in FIG. 13, the edge seal assembly 1310 of the VIGU 1300 includes structural or mechanical bonding portions 1315 and 1317 that are respectively disposed between the hermetic bonding portions 1014, 1016 and the compliant portion 1318 as a continuous part of the edge seal. The structural bonding portions 1315, 1317 are mechanically bonded, but not necessarily hermetically bonded, to the lites 1002, 1004 using mechanical bonds 1327 and 1329. Since the mechanical bonds 1327, 1329 do not need to be hermetic, these bonds may be formed from non-hermetic materials including, but not limited to thermoset plastics or thermoplastics. In preferred embodiments, the mechanical bonds 1327, 1329 between the lites 1002, 1004 and the structural boding portions 1315, 1317 of the edge seal 1310 may comprise one or more of acrylic, epoxy, urethane, polyester, polyimide, phenolic, polyamide, cyanoacrylate, polyacrylate, and polyvinyl acetate.

In the illustrated embodiment, the mechanical bonds 1327, 1329 are formed, respectively, on the outward facing surfaces 1007, 1009 of the lites 1002, 1004, and the structural bonding portions 1315, 1317 are also disposed adjacent to the outward facing surfaces. Thus, in this embodiment the edge seal 1310 may have an overall width $W_S$ that is greater than the overall width $W_V$ of the VIGU 1300. In other embodiments of the VIGU 1300 (not shown), the structural bonding portions 1315, 1317 and the associated mechanical bonds 1327, 1329 may be disposed either partially or completely against the edges 1022, 1024 of the lites (e.g., as shown in connection with FIG. 21). In some of these other embodiments, the width $W_S$ of the edge seal 1310 may be greater than the width $W_V$ of the VIGU.

Still referring to FIG. 13, in the illustrated embodiment, the structural bonding portions 1315, 1317 include respective first sections 1331, 1333, which are connected to the hermetic bonding portions 1014, 1016, and respective second sections 1335, 1337, which are connected at a first end (1339) to the first section and at a second end (1341) to the compliant portion 1318. The compliant portion 1318 of the edge seal 1310 may be substantially identical to the compliant portion 1218 that was described in connection with FIG. 12. In the illustrated embodiment, the compliant portion 1318 includes a three-dimensional pattern 1230 including plurality of corrugations or dimples 1032 arranged in a plurality of layers or courses 1034, with the first course 1034' disposed directly adjacent to the first and second bonding portions 1014, 1016, and with each subsequent course disposed adjacent to previous course, but successively further from the bonding portions. Interposed between each pair of courses 1034 of corrugations or dimples 1032 is a separator portion 1256, and first and second relatively flat portions 1242 and 1250 run back and forth across the corrugations of the outermost course 1034 to complete the flexible seal.

In the illustrated embodiment of VIGU 1300, the edges 1022, 1024 of the lites 1002, 1004 have only inner chamfers 1038. Other embodiments may have both inner chamfers 1038 and outer chamfers 1040 (FIG. 12), or only outer chamfers. Still other embodiments may have no chamfers.

Figure 14:
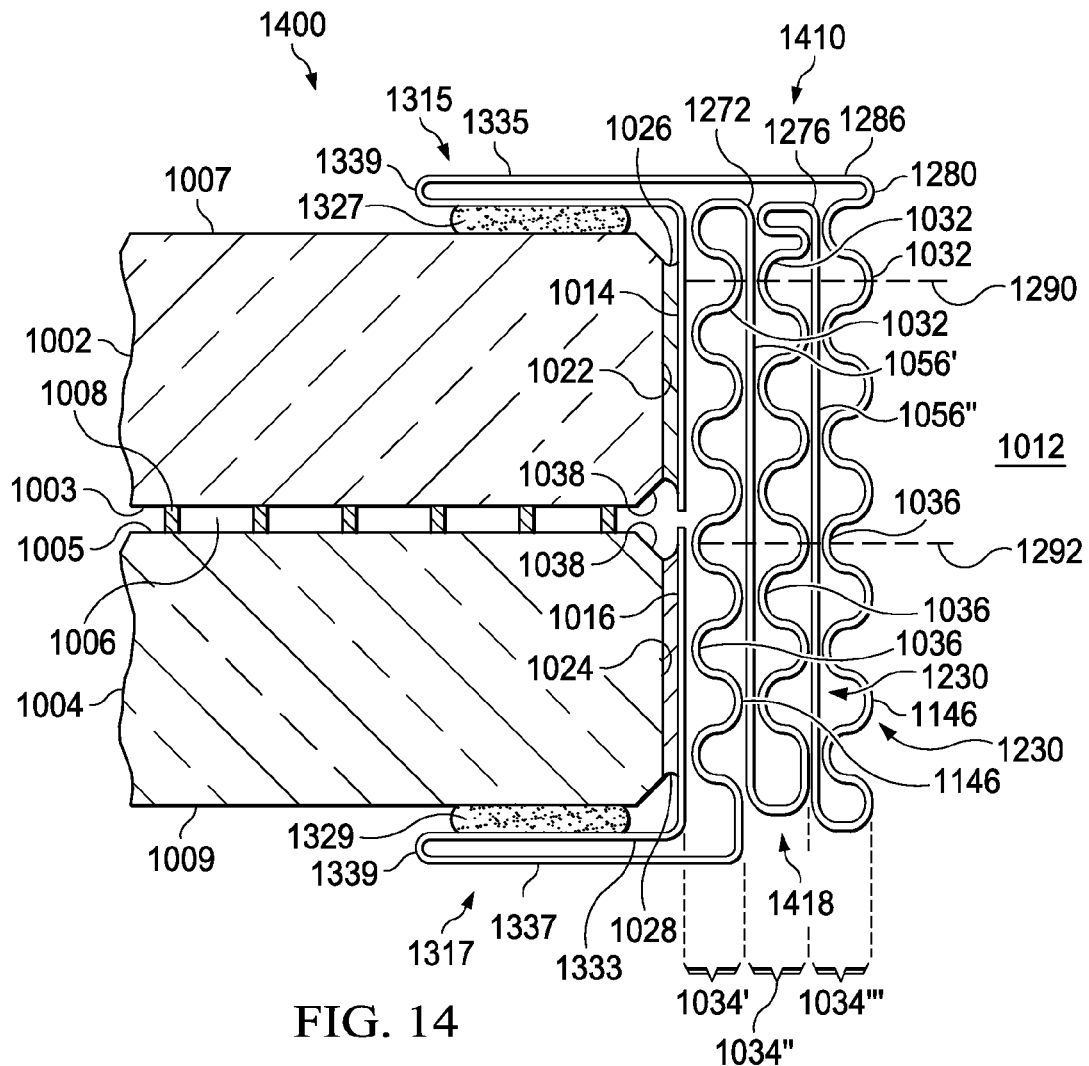
FIG. 14 is a partial cross-sectional view of an IGU or VIGU assembly including a one-piece edge seal with hermetic and structural bonds with a corrugated or dimpled periphery in accordance with another embodiment.

Referring now to FIG. 14, an IGU or VIGU having a flexible edge seal assembly in accordance with a yet another aspect is shown. For ease of description, this aspect will be described in terms of a VIGU, however, it will be understood that the description will apply equally well to an IGU. Except as otherwise noted, VIGU 1400 is substantially identical to the VIGU 1300 previously described. The VIGU 1400 includes first and second lites 1002, 1004, which are spaced apart to define an insulating cavity 1006 disposed between respective inward facing surfaces 1003 and 1005. A plurality of stand-off members 1008 may be positioned in the cavity 1006 between the lites 1002, 1004 to maintain separation of the lites.

The VIGU 1400 further comprises an edge seal assembly 1410 attached to the two lites 1002, 1004 to form a hermetic seal between the cavity 1006 and the external environment 1012. The edge seal assembly 1410 of the VIGU 1400 includes a first hermetic bonding portion 1014, a second hermetic bonding portion 1016, respective structural bonding portions 1315, 1317 attached to each hermetic bonding portion, and a compliant portion 1418 connected therebetween. The first hermetic bonding portion 1014 is hermetically bonded to the first lite 1002 and the second hermetic bonding portion 1016 is hermetically bonded to the second lite 1004, and the first structural bonding portion 1315 is mechanically bonded to the first lite and the second structural bonding portion 1317 is mechanically bonded to the first lite. This is similar to the VIGU 1300.

The edge seal 1410 of the VIGU 1400 is substantially similar to the edge seal 1310 of the VIGU 1300, except the structure of the compliant portion 1418 is modified (i.e., as compared to compliant portion 1318) by connecting the second end (1280) of the outermost course 1034' of corrugations 1032 (i.e., part of the three dimensional pattern 1230) directly to the return section 1286, rather than to relatively flat portions 1242 and 1250 (FIG. 13), which may not be present. This provides a VIGU 1400 with a simplified hermetic edge seal 1410 if the relatively flat portions (e.g., 1242, 1250) are not present.

As previously mentioned, the general use of a gettering material (also known as "getter material" or "getters") is known in the art of hermetic packaging. Getters are made of materials having an affinity to one or more non-noble gases such that molecules or atoms of the target gas or gases stick to/are absorbed by the getter upon impact. When a getter material is placed within a sealed cavity of a package, target gas or gases coming in contact with the getter are immobilized rather than continuing to move in the package's atmosphere. In some cases the atmosphere inside the package may be a partial pressure atmosphere, e.g. a vacuum.

In additional aspects of the invention, a gettering material is placed inside one or more portions of the VIGU's hermetic perimeter band assembly where the getter will be in the path leading to the cavity of the VIGU defined by a pair of lites and the hermetic perimeter band surrounding the two lites. In some embodiments, the getter material may be prefabricated prior to placement inside the band assembly during the roll-forming of the band assembly. In other embodiments, the getter material may be deposited onto the band material prior to roll-forming the band assembly.

It will be appreciated that optimum performance of the getter material will be achieved when the maximum amount of the getter's surfaces are exposed to the VIG's cavity; i.e., the getter material placed inside the band and the band design where the getter is used are both designed to allow as much surface area of the getter to be in the path of getterable atoms and molecules that will eventually move by mechanical and molecular flow from the vacuum cavity to the activated getter material.

Some getters are manufactured and shipped in a state that, when removed from the manufacturer's packaging, begin to absorb and/or capture the type of atoms and molecules the getter material was designed for. Other getter materials require activation to begin gettering, typically by heating the getter material. Because heating the getter material causes it to begin gettering, this activation process should be done either inside the hermetically sealed package or if outside the package, in a vacuum or an atmosphere which the getter material will not absorb, including noble gases.

There are several methods to heat-activate getter materials. These include but are not limited to applying heat by conduction, convection, radiation including appropriate wavelengths of energy, induction currents and electrical currents.

One preferred getter material for the applications described herein is St 707™ brand getter material produced by SAES® Getters, either in strip form or applied to the metal band material prior to the band material being roll-formed to create the corrugated flexible band structure. SAES® sometimes refers to the strip form of their St 707™ brand getter material as St 172, which, as a component, is a porous, sintered getter. The composition of the SAES® Getter St 707™ brand gettering material is approximately 70% zirconium, 24.6% vanadium and 5.4% iron. This alloy is fully activated at temperatures ranging from 400° C. to 500° C., but its amount or percentage activation is time/temperature dependent. I.e., the higher the activation temperature, the faster (higher) a given percentage of activation is achieved. Activation temperatures above 500° C. will result in faster (shorter or quicker) activation times than temperatures below 500° C. SAES® St 707™ gettering material must be activated in a vacuum of $10^{-3}$ torr or better (lower pressure/higher vacuum) or in an inert atmosphere.

Figure 15:
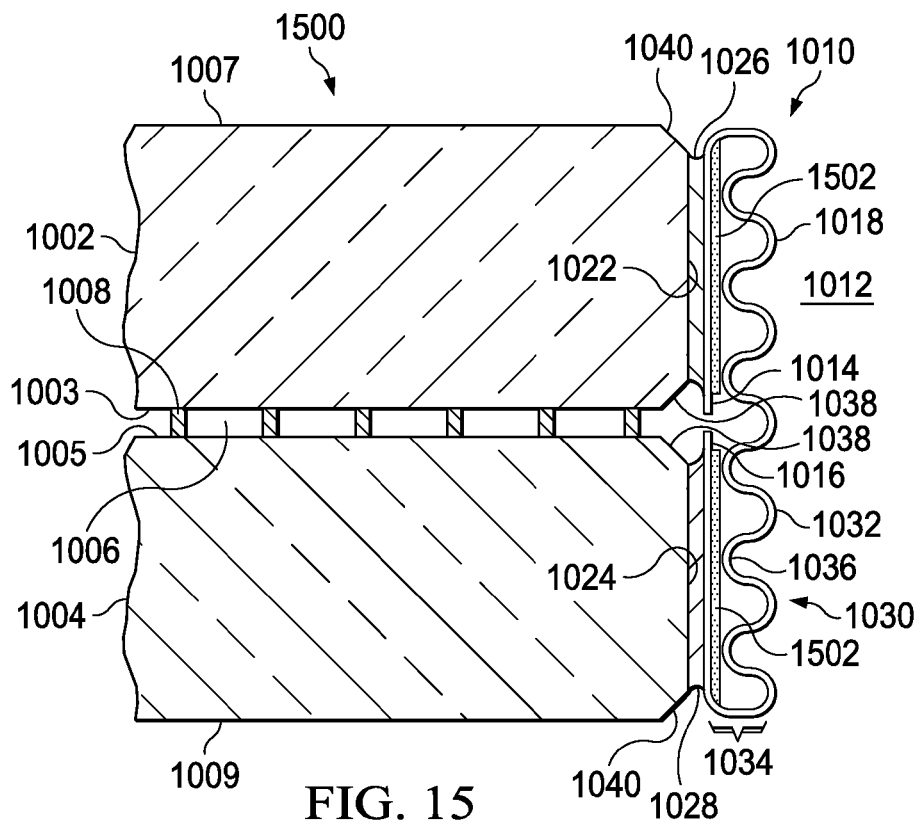
FIG. 15 is a partial cross-sectional view of an IGU or VIGU assembly including a one-piece, multi-layered hermetic edge seal with gettering material in accordance with another embodiment.

Referring now to FIG. 15, an IGU or VIGU having a flexible edge seal assembly in accordance with another aspect is shown. For ease of description, this aspect will be described in terms of a VIGU, however, it will be understood that the description will apply equally well to an IGU. VIGU 1500 is substantially similar to VIGU 1000 described in connection with FIG. 10, however, VIGU 1500 further comprises a getter material 1502 used within the roll-formed metal band 1010 inside the region 1034. The getter material 1502 may be disposed along all or part of non-formed sections 1014, 1016. In some embodiments, the getter material 1502 may be in a strip form inserted into the edge seal band during roll-forming, whereas in other embodiments, the getter material may be applied to the band's material prior to roll forming.

Figure 16:
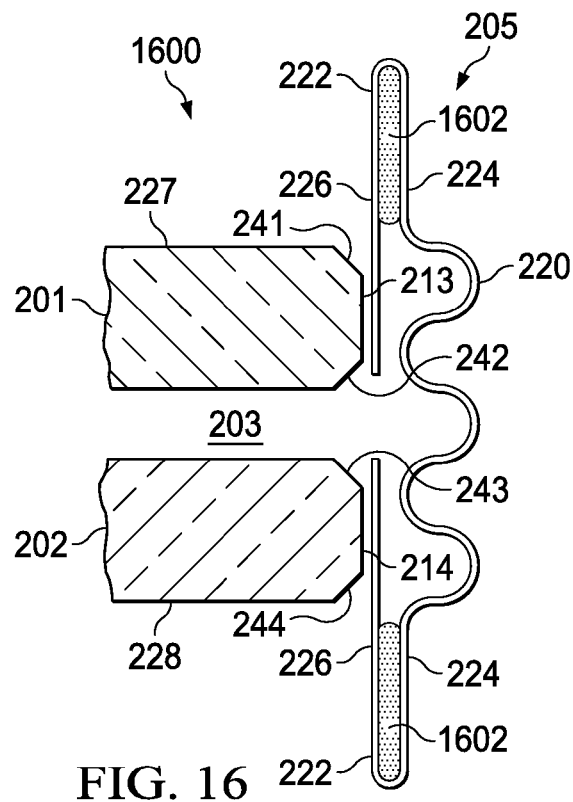
FIG. 16 is a partial cross-sectional view of an IGU or VIGU assembly including a one-piece, hermetic edge seal with gettering material in accordance with another embodiment.

Referring now to FIG. 16, an IGU or VIGU having a flexible edge seal assembly in accordance with another aspect is shown. Again, this aspect will be described in terms of a VIGU, but it may also be an IGU. VIGU 1600 is substantially similar to VIGU 200 described in connection with FIGS. 2g and 2h, however, VIGU 1600 further comprises a getter material 1602 disposed within the roll-formed metal band 205 inside the lateral portion 222 between the flat (i.e., non-formed) distal portions 226 and proximal portion 224 on each side of the corrugated or dimpled formed section 220. In some embodiments, the getter material 1602 may be in a strip form inserted into the edge seal band during roll-forming, whereas in other embodiments, the getter material may be applied to the band's material prior to roll forming.

Figure 17:
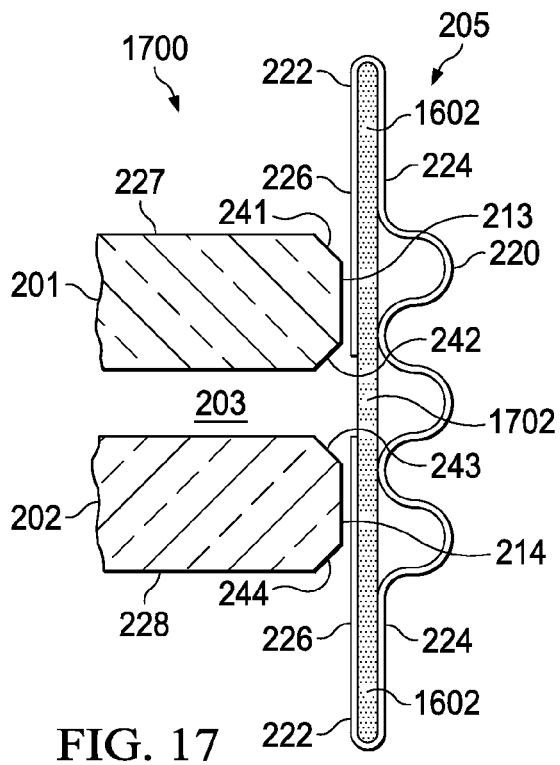
FIG. 17 is a partial cross-sectional view of an IGU or VIGU assembly including a one-piece, hermetic edge seal with gettering material in accordance with another embodiment.

Referring now to FIG. 17, an IGU or VIGU having a flexible edge seal assembly in accordance with another aspect is shown. Again, this aspect will be described in terms of a VIGU, but it may also be an IGU. VIGU 1700 is substantially similar to VIGU 1600 described in connection with FIG. 16, however, in the VIGU 1700 the getter material 1702 extends substantially continuously across the space between the lateral portions 222; including the region adjacent to the corrugated portion 220 and across the gap between the cavity-facing ends 226. In contrast, the getter materials 1602 of VIGU 1600 do not extend past the cavity-facing ends of 226. In some embodiments, the getter material 1702 may be in a strip form inserted into the edge seal band during roll-forming, whereas in other embodiments, the getter material may be applied to the band's material prior to roll forming.

Figure 18:
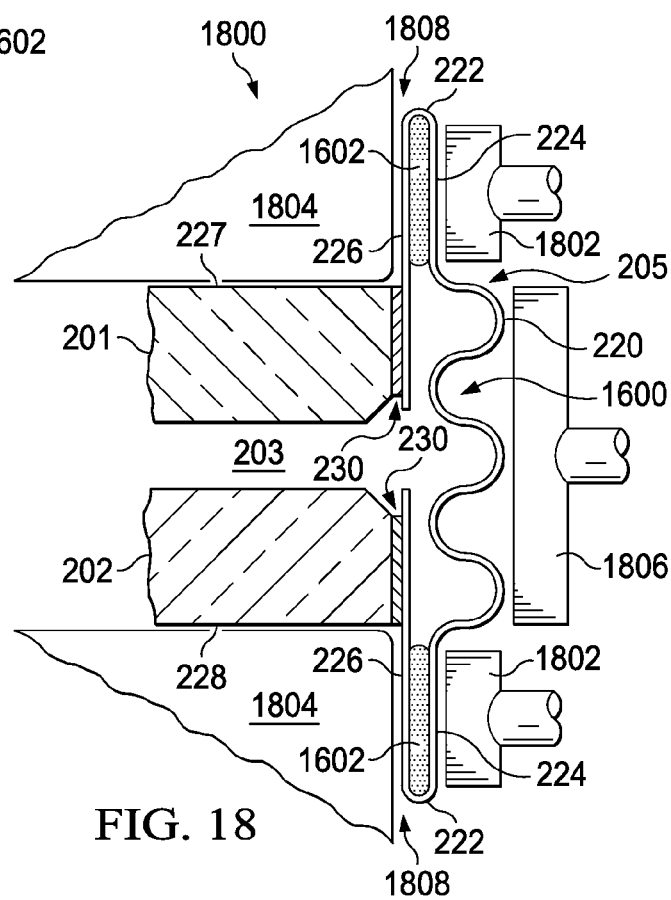
FIG. 18 shows the IGU or VIGU of FIG. 16 along with tooling for the getter activation process in accordance with another embodiment.

Referring now to FIG. 18, there is illustrated one method of heat-activating the getter material 1602 inside the VIGU 1600 of FIG. 16, along with associated fixture apparatus. As previously described, the getter material 1602 is disposed within the lateral portion 222 of the band 205 on either side of the VIGU cavity 203. The process illustrated by FIG. 18 may be performed after the solder 230 has been reflowed. The fixture apparatus includes one or more heat sources 1802, which are applied to the exterior portions 224 of the band 205 on either side of the corrugated part 220 (i.e., in the region where the getter material 1602 is disposed) to heat-activate the getter materials 1602 inside the cavity of the metal band. Getter activation heat sources 1802 may include, but are not limited to, conduction heater devices, convection heater devices, electrical current (i.e., resistive) heater devices and electrical/magnetic induction heater devices.

Referring still to FIG. 18, in some embodiments, the getter activation temperature furnished by the heat sources 1802 exceeds the melting/reflow temperature of the solder 230, however, it is desirable that the solder not melt or reflow during getter activation. Accordingly, one or more cold plates 1804 may be concurrently placed in contact with the two exterior-facing surfaces 227, 228 of the lites 201, 202 to remove heat from the two glass surfaces 227, 228 and the reflowed solder 230 during the heat-activation of the getter materials 1602. This cooling prevents the reflowed solder 230 from partially or completely re-liquifying. The cold plates 1804 may be metal heat radiators, cooled internally by an appropriate circulating medium including, but not limited to, air, liquid nitrogen ($LN_2$), carbon dioxide ($CO_2$) or other liquid or gas. The cold plates 1804 may take the form of a flexible bladder whose interior is cooled by an induced cold gas or liquid. The cold plates 1804 may take the form of a thermal-electric cooler ("TEC") to remove heat from the two glass surfaces 227, 228 and the reflowed solder 230 material during the heat-activation of the getter materials 1602. In the illustrated embodiments, the cold plates 1804 are separated from the metal band 205 by a gap 1808 to prevent direct cooling of the getter material 1602 (which is being heated from the other side by the heat sources 1802), however, in other embodiments, the cold plates 1804 may contact the interior flange parts 226 on either side of the cavity and the temperature of the heat sources will be adjusted accordingly to achieve the necessary getter activation temperature. In some embodiments, a secondary cold plate 1806 is also provided. The secondary cold plate 1806 is optional cold plate, bladder, TEC, etc. placed in contact with the central portion 220 of the metal band 205 during getter heat activation to further aid in preventing the solid solders 230 from reaching the solder's melting or liquidus temperature during heat activation of the getters.

Figure 19:
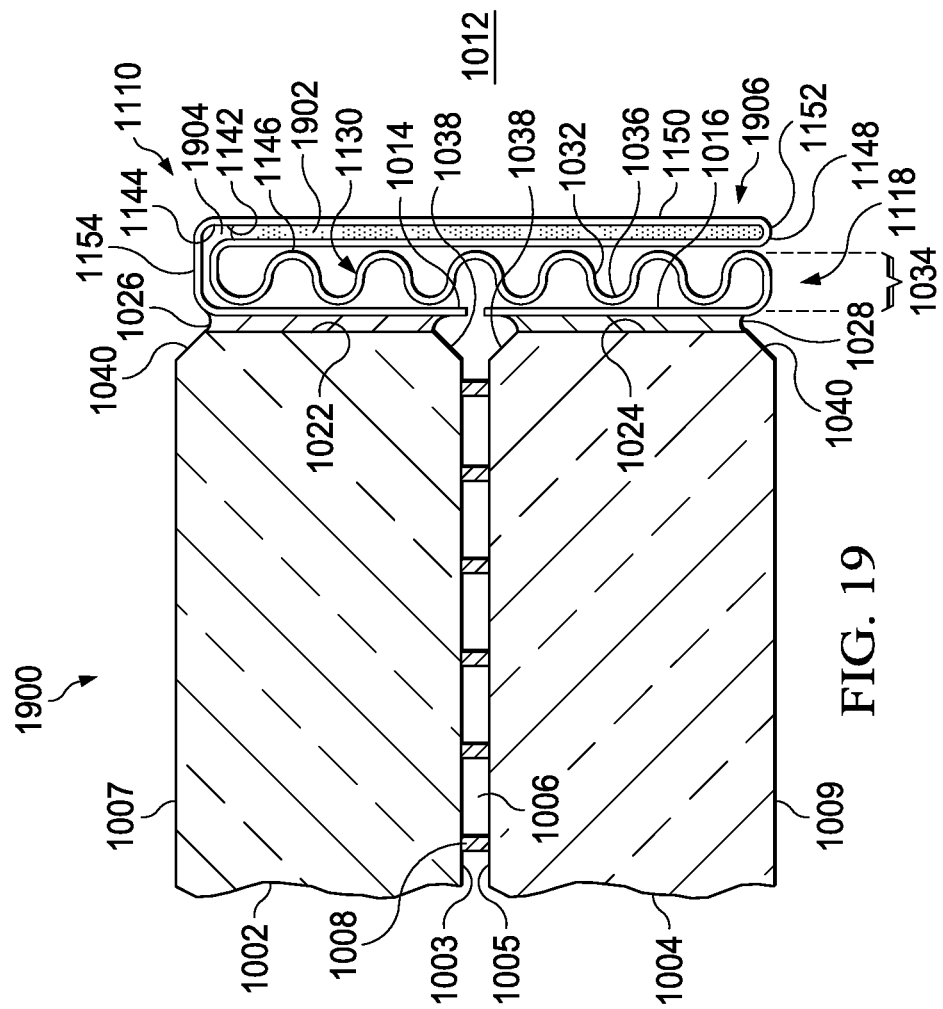
FIG. 19 is a partial cross-sectional view of an IGU or VIGU assembly including a one-piece, multi-layered hermetic edge seal with gettering material in accordance with another embodiment.

Referring now to FIG. 19, an IGU or VIGU having a flexible edge seal assembly in accordance with another aspect is shown. Again, this aspect will be described in terms of a VIGU, but it may also be an IGU. VIGU 1900 is substantially similar to VIGU 1100 described in connection with FIG. 11, however, VIGU 1900 further comprises a getter material 1902 placed between first flat portion 1142 and second flat portion 1150 of the edge seal 1110. In other words, the getter material 1902 is placed in a getter cavity 1904 defined by metal foil layers 1142, 1150 and their end-radius 1152. It will be appreciated that the getter cavity 1904 is open at one end (i.e., end 1154) to the interior cavity 1006 of the VIGU, however the getter cavity is hermetically isolated from the external atmosphere of the VIGU. In some embodiments, the getter material 1902 may be in a strip form inserted into the edge seal band 1110 during roll-forming, whereas in other embodiments, the getter material may be applied to the band's material prior to roll forming.

Figure 20:
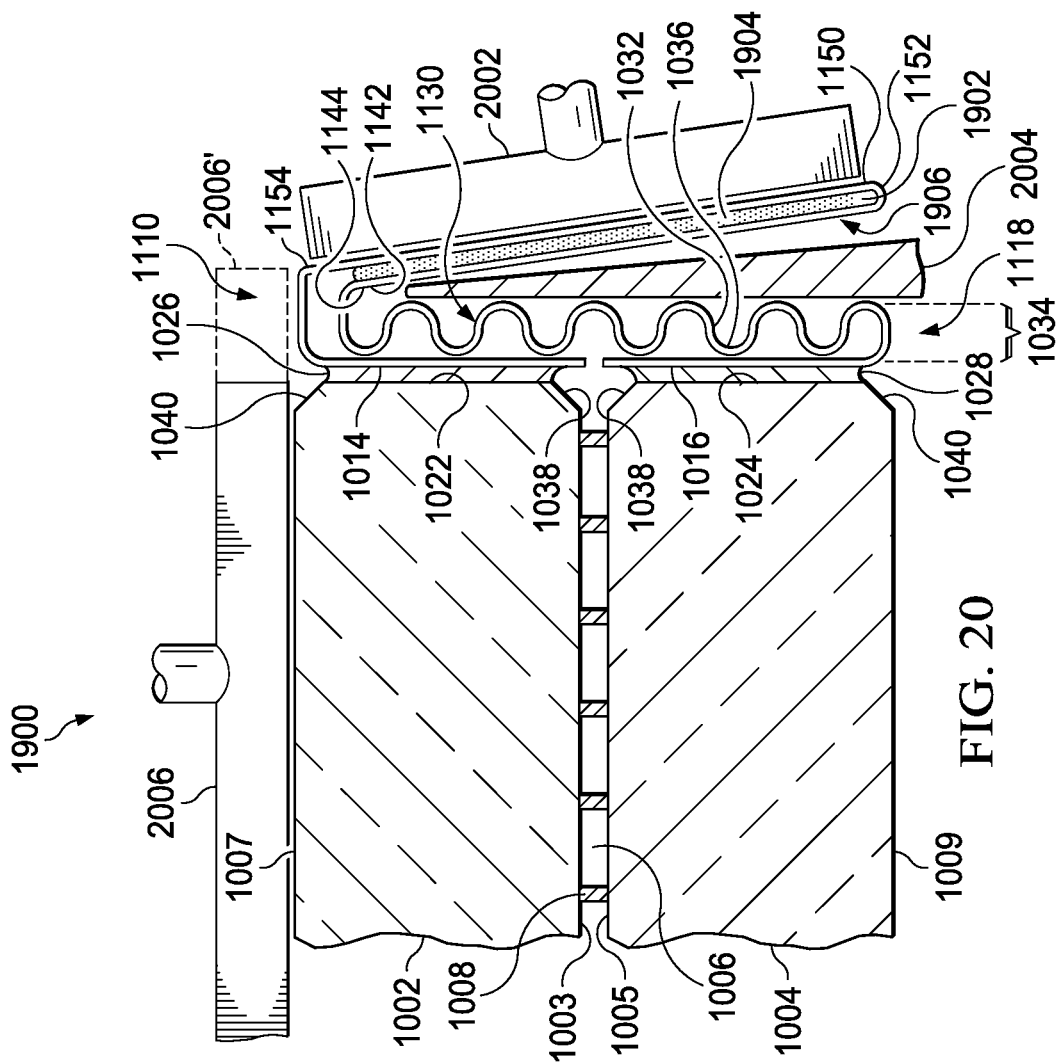
FIG. 20 shows the IGU or VIGU of FIG. 19 along with tooling for the getter activation process in accordance with another embodiment.

Referring now to FIG. 20, there is illustrated one method of heat-activating the getter material 1902 inside the VIGU 1900 of FIG. 19, along with associated fixture apparatus. The gettering material 1902 is placed inside the cavity 1904 of the metal band 1110. The cavity 1904 is defined by metal foil layer 1142, 1150 and the end 1152. To activate the getter material 1902, the portion 1906 of the end seal 1110 containing the cavity 1904 filled with the getter material is moved away from contact with corrugated foil section 1034 along most of the length of the straight sides of the VIGU 1900 to create a physical separation between most of the foil cavity portion and the corrugated foil section. A heat source 2002 may be placed on, or used on, one or both surfaces 1142 and 1150 of the foil cavity portion 1906 adjacent to the cavity 1904 to heat the getter material 1902 contained therein to the getter activation temperature. The getter activation heat source 2002 may include, but is not limited to, conduction heater devices, convection heater devices, electrical current (i.e., resistive) heater devices and electrical/magnetic induction heater devices. Prior to heat-activating the getter material 1902 inside the foil cavity portion 1906, an insulator or cold surface 2004 (also known as a cold plate, bladder, TEC, etc.) may be inserted between the foil cavity portion 1906 and the corrugated foil section 1034 to limit heat transfer toward the reflowed solder 1026 and 1028. This insulator 2004 prevents the reflowed solder 1026, 1028 from becoming hot enough to melt. Additional cooling of the glass lite 1002 and the solder 1026 may be needed because of the thermal conduction path formed by seal portions 1144 and 1154 towards the solder 1126. A secondary cold heat sink, cold pate or cold bladder 2006 may be placed against the surface 1007 of the lite 1002 and portions of the seal system 1110 near the solder 1026 to further reduce the maximum temperature of solder 1026 during the getter activation (i.e., heating) procedure. In the illustrated embodiment, the secondary cold heat sink 2006 does not extend past the region of solder 1026, however, in other embodiments (denoted by dotted line 2006' in FIG. 20) the secondary cold heat sink 2006' extends past the region of solder 1026 to be adjacent to the outside radius 1154 of the seal system 1110 adjacent to the getter containment cavity portion 1906.

Figure 21:
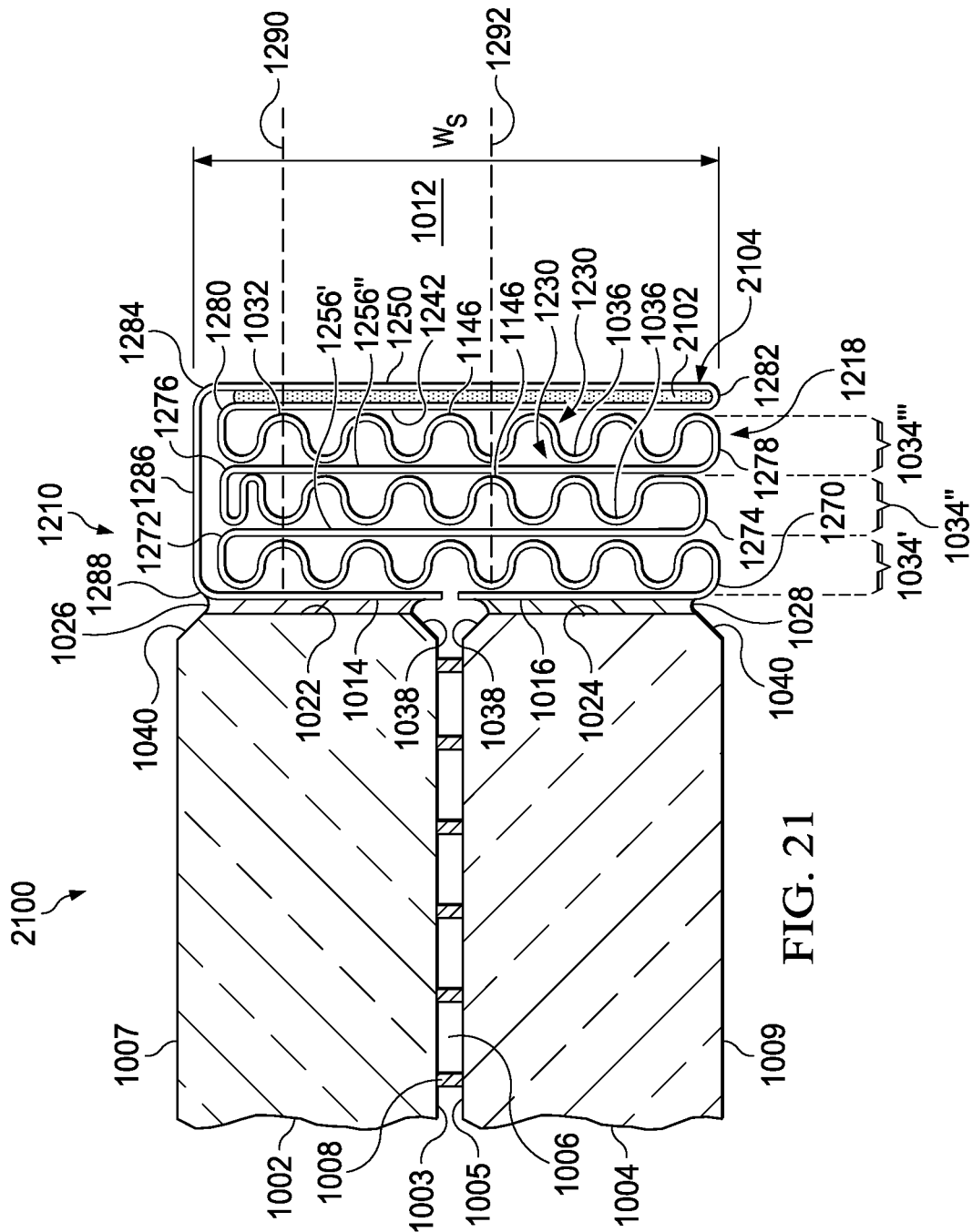
FIG. 21 is a partial cross-sectional view of an IGU or VIGU assembly including a one-piece, multi-layered hermetic edge seal with gettering material in accordance with another embodiment.

Referring now to FIG. 21, an IGU or VIGU having a flexible edge seal assembly in accordance with another aspect is shown. Again, this aspect will be described in terms of a VIGU, but it may also be an IGU. VIGU 2100 is substantially similar to VIGU 1200 described in connection with FIG. 12, however, VIGU 2100 further comprises a getter material 2102 placed between first flat portion 1242 and second flat portion 1250 of the edge seal 1210. In other words, the getter material 2102 is placed in a getter cavity 2104 defined by metal foil layers 1242, 1250 and their end-radius 1282. It will be appreciated that the getter cavity 2104 is open at one end (i.e., end 1284) to the interior cavity 1006 of the VIGU, however the getter cavity is hermetically isolated from the external atmosphere of the VIGU. In some embodiments, the getter material 2102 may be in a strip form inserted into the edge seal band 1210 during roll-forming, whereas in other embodiments, the getter material may be applied to the band's material prior to roll forming.

Figure 22:
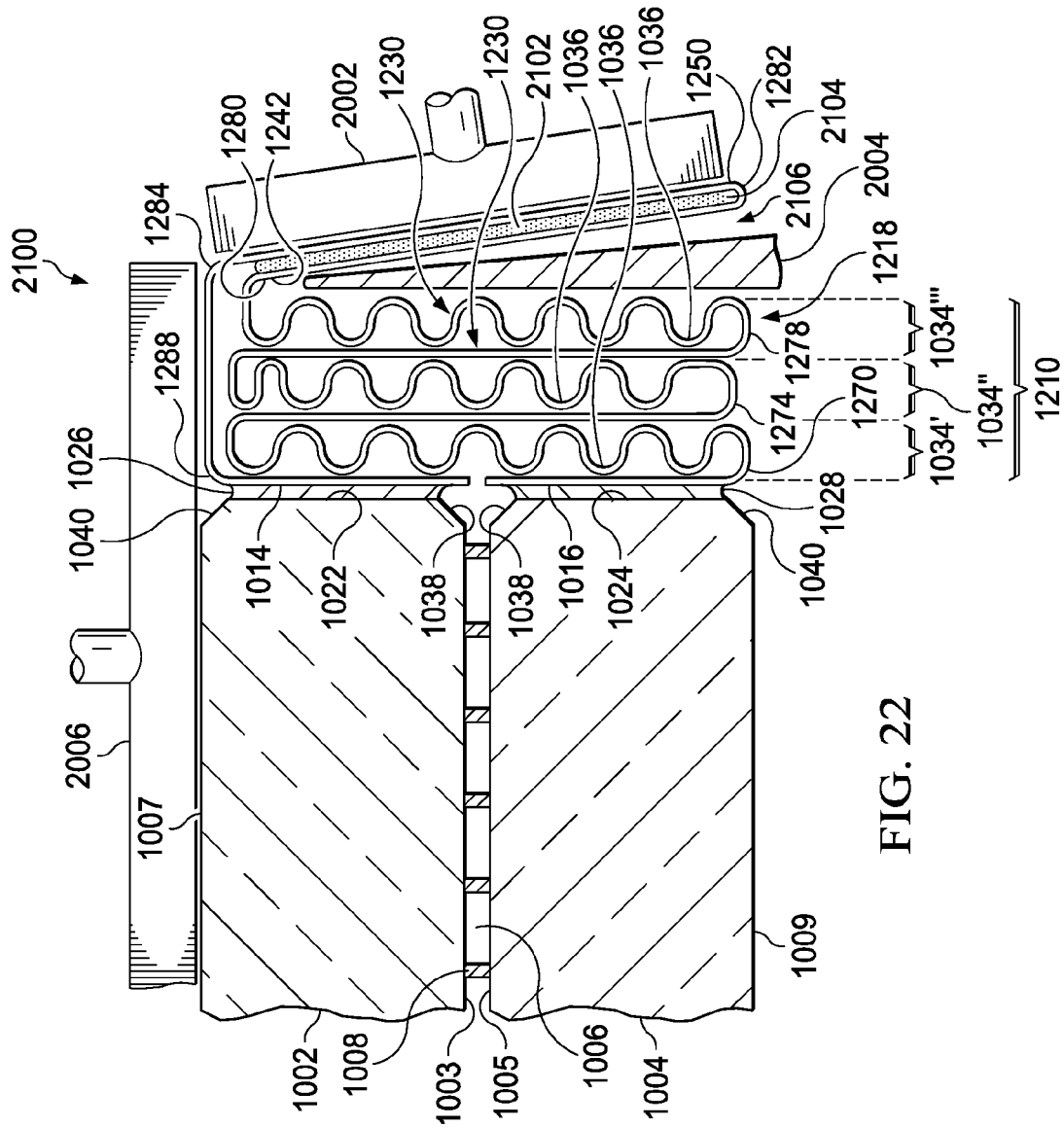
FIG. 22 shows the IGU or VIGU of FIG. 21 along with tooling for the getter activation process in accordance with another embodiment.

Referring now to FIG. 22, there is illustrated one method of heat-activating the getter material 2102 inside the VIGU 2100 of FIG. 21, along with associated fixture apparatus. The getter material 2102 is placed or applied to one or both cavity-side surfaces of the seal system 1210's outboard member 2106 defined by foil portions 1242, 1250 and connecting radius 1282. The foil cavity portion 2106 is moved away from contact with outermost corrugated foil section 1034' along most of the length of the straight sides of the VIGU to create a physical separation between most of the foil cavity portion 2106 and the outermost corrugated foil section 1034'''. A heat source 2002 is placed on, or used on one or both surfaces 1242, 1250 of foil cavity portion 2106. Any appropriate getter activation heat sources 2002 as previously described may be used. Prior to heat-activating the getter material inside the foil cavity 2104, an insulator or cold surface (cold plate, bladder, TEC, etc.) 2004 may be inserted between the foil cavity portion 2106 and the outermost corrugated foil section 1034'. This insulator 2004 prevents the reflowed solder 1026, 1028 from becoming hot enough to melt. Additional cooling of the glass lite 1002 and the solder 1026 may be needed because of the thermal conduction path through seal portions 1280 and 1284 towards the solder 1126. A secondary cold heat sink, cold pate or cold bladder 2006 may be placed against the surface 1007 of the lite 1002 near the solder 1026 and seal system 1210 to further reduce the maximum temperature of solder 1026 during the getter activation procedure.

Figure 23:
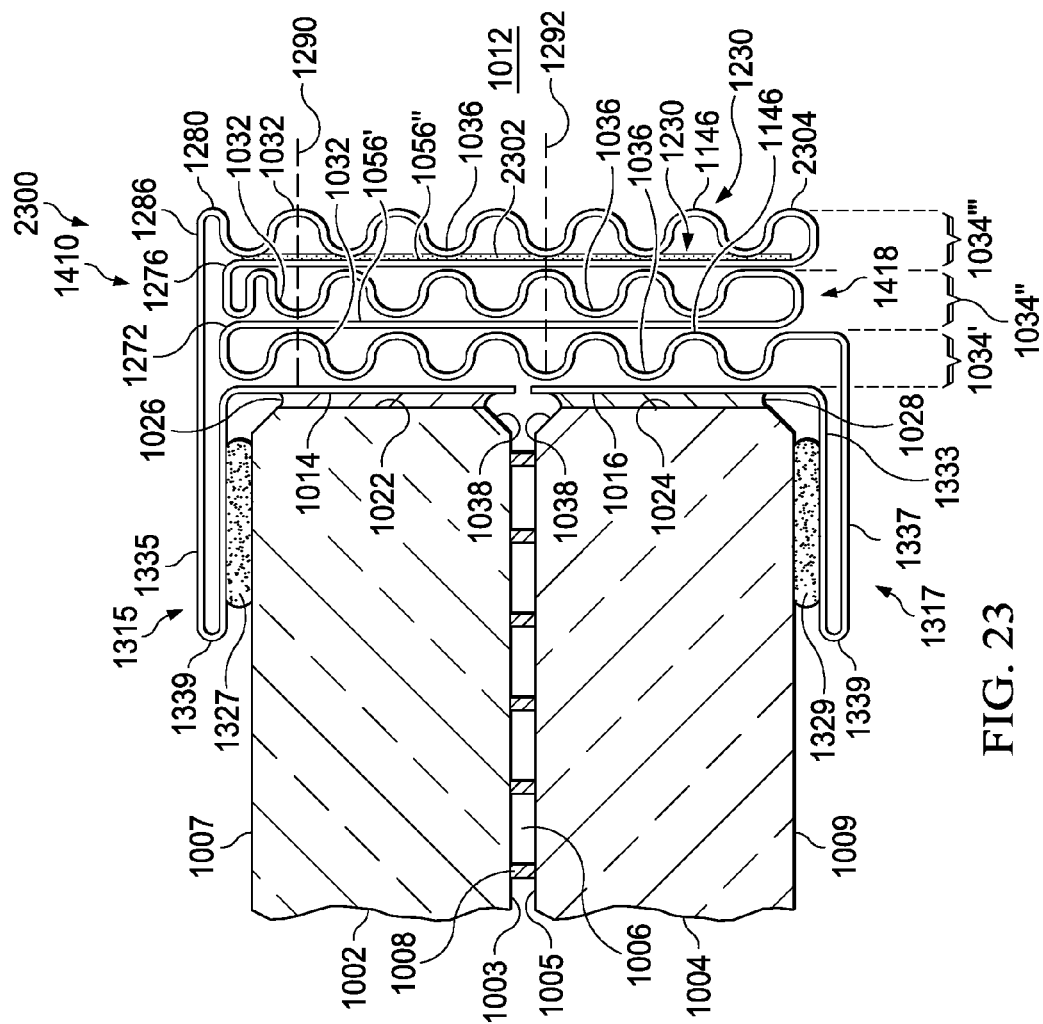
FIG. 23 is a partial cross-sectional view of an IGU or VIGU assembly including a one-piece, multi-layered hermetic edge seal with gettering material in accordance with another embodiment.

Referring now to FIG. 23, an IGU or VIGU having a flexible edge seal assembly in accordance with another aspect is shown. Again, this aspect will be described in terms of a VIGU, but it may also be an IGU. VIGU 2300 is substantially similar to VIGU 1400 described in connection with FIG. 14, however, VIGU 2300 further comprises a getter material 2302 placed between, or applied to one or both of, the following portions of the edge seal 1410: the cavity-side surface 1146 of the outboard corrugated member 1034' and/or the flat separator portion 1056''. In other words, the getter material 2302 is placed within a cavity portion 2306 bounded by the outboard corrugated surface 1146, the flat separator portion 1056'' and the connecting radius 2304. In some embodiments, the getter material 2302 may be in a strip form inserted into the edge seal band 1410 during roll-forming, whereas in other embodiments, the getter material may be applied to the band's material prior to roll forming.

Referring still to FIG. 23, for heat activation of the getter material 2302 in the VIGU 2300, the cavity portion 2306 within corrugated section 1034' is moved away from contact with the adjacent corrugated foil section 1034" and heated substantially as previously described in connection with FIGS. 20 and 22. In other words, the cavity portion 2306 is moved away from contact with the adjacent corrugated foil section 1034" along most of the length of the straight sides of the VIGU to create a physical separation between most of the foil cavity portion 2306 and the adjacent corrugated foil section 1034". A heat source 2002 (see FIGS. 20, 22) is placed on, or used on one or both surfaces 1056" and/or 1146 to heat the getter material to the activation temperature. Any appropriate getter activation heat sources 2002 may be used, including but not limited to conduction, convection, electrical current and induction. Prior to heat-activating the getter material 2302 inside the foil cavity 2306, an insulator or cold surface (cold plate, bladder, TEC, etc.) 2004 (see FIGS. 20, 22) is inserted between the foil cavity 2306 and the adjacent corrugated foil section 1034". This insulator 2004 prevents the reflowed solder 1026, 1028 from becoming hot enough to melt. Additional cooling of the glass lite 1002 and the solder 1026 may be needed because of the thermal conduction path along seal portion 1286 towards the solder 1026. A secondary cold heat sink, cold pate or cold bladder 2006 (see FIGS. 20, 22) may be placed against the lite 1002's surface 1007 near the solder 1026 and seal system 1410 to further reduce the maximum temperature of solder 1026 during the getter activation procedure. In some embodiments, for the secondary cold heat sink 2006, a conforming bladder (not shown) may be preferable to a cold plate because a bladder, while being in physical contact with lite 1002's surface 1007, would also be better able to remain in contact with most or all of the metal foil surface 1335.

Figure 24:
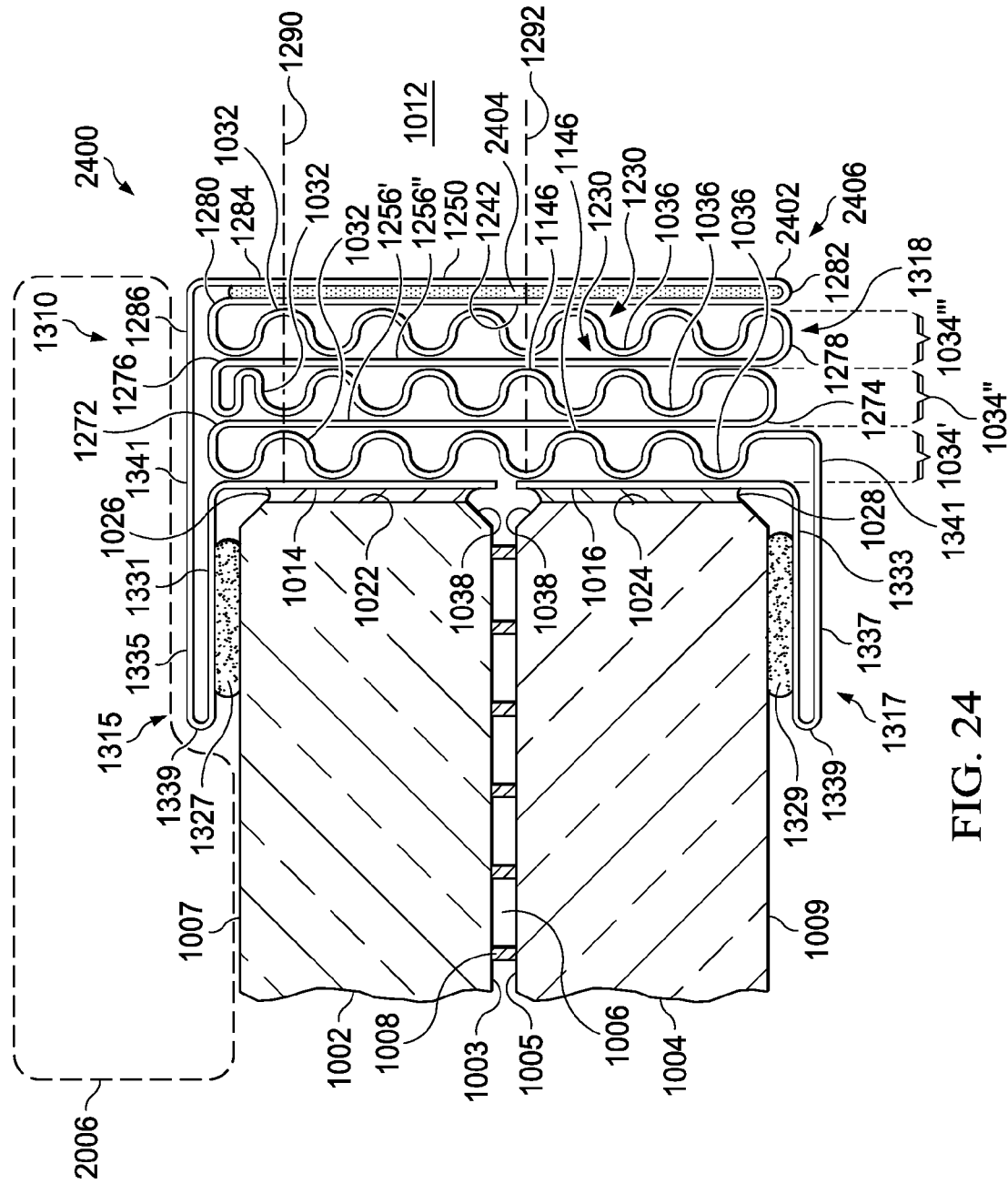
FIG. 24 is a partial cross-sectional view of an IGU or VIGU assembly including a one-piece, multi-layered hermetic edge seal with gettering material and tooling associated with same in accordance with another embodiment.

Referring now to FIG. 24, an IGU or VIGU having a flexible edge seal assembly in accordance with another aspect is shown. Again, this aspect will be described in terms of a VIGU, but it may also be an IGU. VIGU 2400 is substantially similar to VIGU 1300 described in connection with FIG. 13, however, VIGU 2400 further comprises a getter material 2402 disposed inside a cavity 2404 defined by the non-corrugated foil surfaces 1242, 1250 and the end radius 1282 joining surfaces 1242 and 1250. Activation of the getter material 2402 FIG. is similar to that described in connection with FIGS. 20 and 22. Namely, the foil cavity getter-containing portion 2406 is moved away (e.g., bent) from contact with adjacent corrugated foil section 1034'" along most of the length of the straight sides of the VIGU to create a physical separation between most of the foil cavity 2406 and the adjacent section of seal 1310. A heat source 2002 (see FIGS. 20, 22) is placed on, or used on one or both surfaces 1242, 1250 of foil cavity portion 2306. Any appropriate getter activation heat sources 2002 may be used, including but not limited to conduction, convection, electrical current and induction. Prior to heat-activating the getter material 2402 inside the cavity 2404, an insulator or cold surface (cold plate, bladder, TEC, etc.) 2004 may be inserted between the getter-containing portion 2406 and the adjacent corrugated foil section 1034'. This insulator 2004 prevents the reflowed solder 1026, 1028 from becoming hot enough to melt. Additional cooling of the glass lite 1002 and the solder 1026 may be needed because of the thermal conduction path along, e.g., seal portions 1331 and 1341, towards the solder 1126. A secondary cold heat sink, cold pate or cold bladder 2006 (shown in phantom line) can be placed against the lite 1002's surface 1007 near the solder 1026 and seal system 1310 to further reduce the maximum temperature of solder 1026 during the getter activation procedure.

In an alternative embodiment (not shown) of VIGU 2400, the getter material 2402 is disposed in the two flanges 1315, 1317 and thermally activated while extending laterally (i.e., as shown in FIG. 2e) before being folded down and structurally attached (e.g., with adhesive 1327, 1329) to lite surfaces 1007, 1009.

Some types of getters, including the SAES® Getters' St 707™ require heat activation in a vacuum or an inert atmosphere. Doing so prevents accumulation of sorbed gas molecules on the active surface of the getter. Otherwise, molecules can build up a passivation layer and stop the gettering action. Once activated in vacuum or an inert atmosphere, the getter must not be allowed to be contaminated by atmospheric air or other undesirable gas atmospheres, but rather, be transferred from the activation atmosphere to the end-use atmosphere. Thus, should a getter material be used inside the flexible metal foil band and activated in vacuum or an inert gas prior to the band's reflow soldering to the perimeter of the IG's or VIG's two lites, the getter must not be exposed to undesirable gas atmospheres before it is stretched and placed around the glass lites in the desired end-use atmosphere. One method to achieve these objectives is to activate the getter in a vacuum chamber at the appropriate level of vacuum specified by the getter material's manufacture, or in argon or another inert atmosphere chamber, and transfer the metal seal system with the activated getter inside it in a non-contaminating atmosphere a band-stretching mechanism and then place the stretched metal band around the perimeter of the lites of the IGU or VIGU.

One such getter activation and band placement system might consist of two chambers of a multi-chambered IGU or VIGU sealing system. For sealing an IGU, the band would have its internal getter material heat-activated by one of the means described herein, in argon or another intended end-use atmosphere as long as this atmosphere is an inert gas. Then the band would remain in the same chamber if this chamber contains the desired end-use atmosphere, or could be automatically moved to a second chamber containing the pre-positioned lites of the IGU. In either case, the band would be stretched so that it can be placed over and around the circumference of the two or more lites of the IGU. Then the band stretching and placement mechanism would remove itself from the interior circumference of the band, allowing the band to contract around the circumference of the lites of the IGU.

To activate a getter inside a flexible, hermetic metal band for use with a VIGU, the band would have its internal getter material heat-activated by one of the means described herein, in argon or another intended end-use atmosphere as long as this atmosphere is an inert gas. Then while still inside the activation chamber, an automated solder pre-tin system would apply solder to the appropriate inside surface or surfaces of the assembled metal band. The soldering would be performed with the band at an appropriate temperature for the solder or solders being used. If the band's internal getter was activated in a vacuum atmosphere and the band's temperature must be lowered from the activation temperature to the solder pretinning temperature, the band can be cooled by thermal conduction or by radiation with the band very close to a cold surface or surfaces. This second cooling method is sometimes referred to as "black body radiation." Then after solder pre-tinning the interior surface(s) of the metal band at the desired band temperature, the band would either remain in the same chamber or could be automatically moved to a second pre-evacuated chamber containing the pre-positioned lites of the IGU. In either case, the band would be stretched so that it can be placed over and around the circumference of the two or more lites of the VIGU. Then the band stretching and placement mechanism would remove itself from the interior circumference of the band, allowing the band to contract around the circumference of the lites of the IGU.

Figure 25:
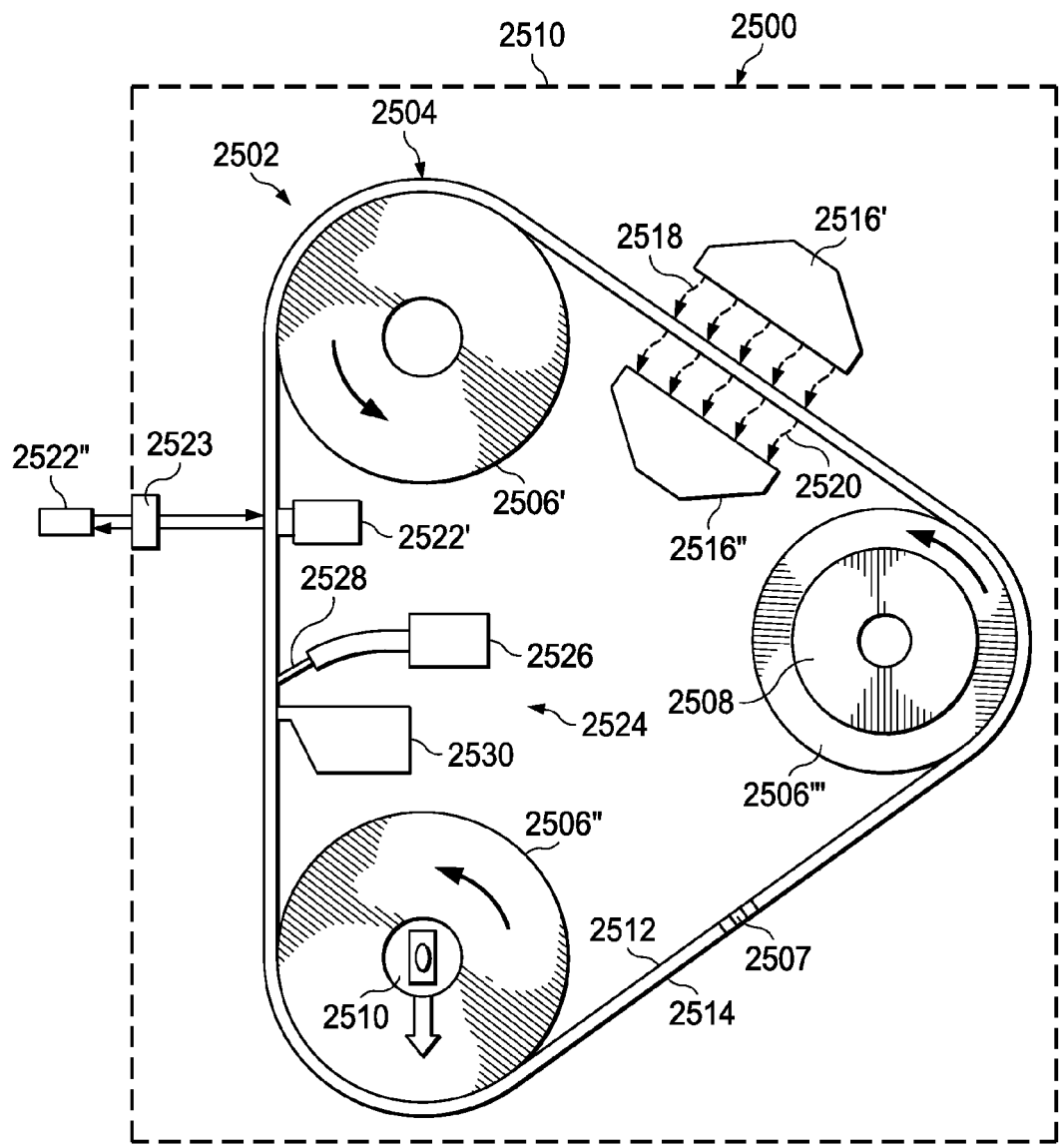
FIG. 25 is a schematic view of a processing apparatus for creating flexible metal bands suitable for use as the flexible hermetic seal of an IGU or VIGU in accordance with additional aspects

Referring now to FIG. 25, there are described and illustrated methods and processing apparatus for creating flexible metal bands suitable for use as the flexible hermetic seal of an IGU or VIGU in accordance with additional aspects. The processing apparatus 2500 comprises a band transport mechanism 2502 configured to support and move a flexible band 2504. The band transport mechanism 2502 may include two or more pulleys 2506 spaced apart to have a pulley path length (measured along the desired band path) approximately equal to the length (i.e., around its own perimeter) of the flexible band 2504. In the illustrated embodiment, three pulleys denoted 2506', 2506" and 2506''' are used, however, other embodiments may use different numbers of pulleys. The outside diameters of the pulleys 2506 should be sufficiently large to ensure that the band 2504 will not get creased, crushed, buckled or crinkled as it moves over the pulleys. A transport motor 2508 may be provided to rotate the pulleys or otherwise drive the band 2504 around the pulleys. In the illustrated embodiment, the transport motor rotates pulley 2506'''. A tensioning device 2510 may be provided to maintain a desired tension level in the belt 2504 and/or to adjust for slight variations in length. In the illustrated embodiment, the tensioning device 2510 biases the pulley 2506" downward to provide the desired tension.

Prior to being mounted on the band transport mechanism 2502, the band 2504 may be formed by roll-forming flat stock material to the desired cross section, for example one of the cross sections shown in FIG. 2a-2L, 7, 8 or 10-14. During the roll-forming operation, various folds, layers and/or three-dimensional patterns may be produced in the band 2504 as described herein. In addition, gettering material may be disposed in desired sections of the band 2504, e.g., by spraying or coating gettering materials to the stock surfaces, or by embedding strips, sticks, powder or pellets of gettering materials in folds of the band or between layers of the band, for example as shown in FIG. 15-17, 19, 21, 23 or 24. The formed band 2504 with gettering material (if desired) may be cut to a desired length and joined, for example by butt welding, to form a continuous band having a hermetic joint 2507.

Since the roll-forming operation of the band 2504 may be carried out in an uncontrolled atmosphere, the gettering material may need to be heat-activated in a controlled atmosphere to become effective. Accordingly, the band transport apparatus 2502 is disposed within an enclosed chamber 2510. The chamber 2510 contains, and is capable of maintaining, a desired atmosphere, e.g., vacuum or inert gas, during heat activation of the getter material and, optionally, during solder pre-tinning of the bonding surfaces 2512 of the metal band 2504. Typically, the inside-facing surface 2512 of the band 2504 is the surface to be solder pre-tinned and the outside-facing surface 2514 is the surface that will remaining the outside surface of the finished IGU/VIGU. In this way, the band 2504 need not be turned "inside out" after pre-tinning.

Referring still to FIG. 25, the processing apparatus 2500 further comprises one or more heat/cooling sources 2516 disposed within the chamber 2510 that heat and/or cool the flexible band 2504. In the illustrated embodiment one heat source 2516' is disposed adjacent the outside 2514 of the band 2504 and one cooling source 2516" is disposed adjacent the inside 2512 of the band. In other embodiments, the heat/cooling sources 2516 may be disposed on only one side of the band or at various places around the band. Further each heating/cooling source 2516 may be only a heat source, only a cooling source, or a combined heating/cooling source (e.g., switchable between heating and cooling modes). Heating/cooling sources, e.g., source 2516', that provide heating (denoted by outward arrows 2518) may include, but are not limited to, conduction heater devices, convection heater devices, electrical current (i.e., resistive) heater devices and electrical/magnetic induction heater devices. Heating/cooling sources, e.g., 2516", that provide cooling (denoted by inward arrows 2520) may include, but are not limited to, metal heat radiators, plates cooled internally by an appropriate circulating medium including, but not limited to air, liquid nitrogen ($LN_2$), carbon dioxide ($CO_2$) or other liquid or gas, flexible bladders whose interior are cooled by an induced cold gas or liquid or thermal-electric coolers. In the illustrated embodiment, the heating/cooling sources 2516 are separate components from the transport mechanism 2502; however, in other embodiments the heating/cooling sources may be an integral part of the transport mechanism, e.g., part of the pulleys 2506 that are heated or cooled, or spaced-apart electrical contacts that touch the metal band and supply current to produce electrical resistance heating.

The processing apparatus 2500 may further include one or more temperature probes/sensors 2522 configured to measure the temperature of the metal band 2504. The temperature probes/sensors 2522 may be disposed on either the inside 2512, outside 2514 or both sides of the band 2504. The temperature probes 2522 may include, but are not limited to, direct contact sensors 2522', e.g., thermocouples, and non-contact sensors 2522", e.g., infra-red temperature detectors. The temperature probes 2522 sense the temperature of the band 2504 to determine, e.g., when the getter activation temperature has been reached, when the solder pre-tinning temperature has been reached and/or when the solder solidification temperature has been reached. Direct contact temperature probes 2522' must be disposed within the sealed chamber 2510, however non-contact temperature probes 2522" may be disposed either inside the sealed chamber or outside, e.g., if a sensor-transparent but atmosphere sealed port 2523 is provided through the chamber wall.

The processing apparatus 2500 may further include a solder pre-tinning unit 2524 disposed within the sealed chamber 2510 for applying solder to the band 2504. The pre-tinning unit 2524 may include a solder wire feeder 2526 for dispensing solder 2528 and a solder iron 2530. The solder iron 2530 may be a conventional heating iron that supplies localized heat to the band 2504 to melt the solder 2528 or it may be an ultrasonic soldering iron that supplies ultrasonic vibration energy to the band 2504 to facilitate solder bonding to the band.

During operation of the processing apparatus 2500 to heat-activate the getter material within the band 2504 and pre-tin the band with solder, the operation requiring the higher temperature, typically the heat activation of the getter material, must be performed first. Therefore, in one embodiment, the band transport mechanism 2502 rotates the band 2504 while the heat source 2516' heats the nearby area of the band until the temperature probe 2522 senses that at least the getter-activation temperature has been reached along the entire band. Depending on the heat output of the heat source 2516', numerous revolutions of the band 2504 around the pulleys may be necessary to reach at least the getter-activation temperature. Further, the apparatus 2500 may continue to rotate the band 2504 at or above the getter activation temperature for a predetermined time period to allow a desired degree of activation of the getter material. After the getter material is sufficiently activated, the apparatus 2500 may utilize the cooling source 2516" to reduce the temperature of the band 2504 to a temperature suitable for solder pre-tinning. Depending on the cooling capacity of the cooling source 2516", numerous revolutions of the band 2504 around the pulleys may be necessary to reach the solder pre-tinning temperature. In some embodiments, the heat source 2516' must be used (e.g., at a different power setting) to maintain the band 2504 at the solder pre-tinning temperature. Once the solder pre-tinning temperature is reached, the solder unit 2524 applies solder to the inside surface 2512 of the band 2504. The solder applied as pre-tinning must be solidified prior to reaching the next interior transport pulley 2506, therefore coolers may be used to cool the solder.

In some embodiments where the solder unit 2524 includes an ultrasonic soldering iron 2530, the insider surfaces 2512 of the band 2504 may be brought to a temperature that is a few degrees C. below the temperature where the solder melts (i.e., phase changes from solid to liquid). The localized application of the ultrasonic energy from the ultrasonic soldering iron 2530 then causes the solder to melt and pre-tin the band 2504. As the pre-tin solder on the band 2504 moves away from the ultrasonic soldering iron 2530, it quickly re-solidifies before reaching the next transport pulley 2506.

Although the preferred embodiment has been described in detail, it should be understood that various changes, substitutions and alterations can be made therein without departing from the spirit and scope of the invention as defined by the appended claims.

What is claimed is:

1. A vacuum insulating glass unit ("VIGU") comprising:
a first lite;
a second lite spaced apart from the first lite to form a cavity therebetween;
wherein each of the first and second lites includes
a respective inward facing surface facing the cavity,
a respective outward facing surface facing away from the cavity and
a respective edge disposed around a periphery of the lite between the inward and outward facing surfaces and
one piece hermetic band encircling the first and second lites and hermetically bonded to the respective edges of the lites to hermetically seal the cavity from an environment, the cavity having a reduced-pressure atmosphere relative to the environment;
wherein the hermetic band, when viewed in cross section, includes
a first bonding region at a first end of the hermetic band, the first bonding region hermetically bonded to the respective edge of the first lite, the first bonding region having
an inward portion bonded to the respective edge of the first lite proximate to the respective inward facing surface of the first lite and
an outward portion bonded to the respective edge of the first lite proximate to the respective outward facing surface of the first lite;
a second bonding region at a second end of the hermetic band, the second bonding region hermetically bonded to the respective edge of the second lite, the second bonding region having
an inward portion bonded to the respective edge of the second lite proximate to the respective inward facing surface of the second lite and
an outward portion bonded to the respective edge of the second lite proximate to the respective outward facing surface of the second lite; and
a center region extending continuously from the outward portion of the first bonding region to the outward portion of the second bonding region without passing through the inward portions of the first and second bonding regions and including a first section of three-dimensional corrugations disposed in a line substantially parallel to the respective edges of the lites.

2. A VIGU in accordance with claim 1, wherein the center region further comprises:
a first flat section connected at a first end to the first section of three-dimensional corrugations and having a second end; and
a second flat section connected at a first end to the second end of the first flat section;
wherein both the first and second flat sections are disposed substantially parallel to the respective edges of the lites and spaced apart from one another and from the respective edges in a direction perpendicular to the respective edges such that the respective edges of the lites are disposed to a first side of the first section of corrugations and the first and second flat sections are disposed to a second side of the first section of corrugations relative to the respective edges.

3. A VIGU in accordance with claim 2, wherein the center region further comprises:
a first lateral section disposed between the first bonding region and the first section of three-dimensional corrugations and structurally bonded to the respective outward facing surface of the first lite; and
a second lateral section disposed between the second bonding region and the first section of three-dimensional corrugations that is structurally bonded to the respective outward facing surface of the second lite.

4. A VIGU in accordance with claim 2, wherein the center region further comprises:
at least a second section of three-dimensional corrugations disposed in a line substantially parallel to the respective edges of the lites and spaced apart from the first section of three-dimensional corrugations in a direction substantially perpendicular to the repective edges of the lites; and
at least a third flat section connected between the first and second sections of three dimensional corrugations and spaced apart from both the first and second sections of three-dimensional corrugations in directions substantially perpendicular to the repective edges of the lites.

5. A VIGU in accordance with claim 1, further comprising a gettering material disposed on a portion of the band in communication with the cavity.

6. A VIGU in accordance with claim 1, wherein an overall width of the hermetic band, $W_S$, measured in a direction perpendicular to the respective outward facing surfaces of the lites, is less than or equal to an overall width between the respective outward facing surfaces of the lites, $W_V$.

7. An insulating glass unit ("IGU") comprising:
a first lite;
a second lite spaced apart from the first lite to form a cavity therebetween;

wherein each of the first and second lites includes
- a respective inward facing surface facing the cavity,
- a respective outward facing surface facing away from the cavity and
- a respective edge disposed around a periphery of the lite between the inward and outward facing surfaces and a one piece hermetic band encircling the first and second lites and hermetically bonded to the respective edges of the lites to hermetically seal the cavity from an environment, the cavity having a modified-composition atmosphere relative to the environment;

wherein the hermetic band, when viewed in cross section, includes
- a first bonding region at a first end of the hermetic band, the first bonding region hermetically bonded to the respective edge of the first lite, the first bonding region having
  - an inward portion bonded to the respective edge of the first lite proximate to the respective inward facing surface of the first lite and
  - an outward portion bonded to the respective edge of the first lite proximate to the respective outward facing surface of the first lite;
- a second bonding region at a second end of the hermetic band, the second bonding region hermetically bonded to the respective edge of the second lite, the second bonding region having
  - an inward portion bonded to the respective edge of the second lite proximate to the respective inward facing surface of the second lite and
  - an outward portion bonded to the respective edge of the second lite proximate to the respective outward facing surface of the second lite; and
- a center region extending continuously from the outward portion of the first bonding region to the outward portion of the second bonding region without passing through the inward portions of the first and second bonding regions and including a first section of three-dimensional corrugations disposed in a line substantially parallel to the respective edges of the lites.

8. An IGU in accordance with claim 7, wherein the center region further comprises:
- a first flat section connected at a first end to the first section of three-dimensional corrugations and having a second end; and
- a second flat section connected at a first end to the second end of the first flat section;

wherein both the first and second flat sections are disposed substantially parallel to the respective edges of the lites and spaced apart from one another and from the respective edges in a direction perpendicular to the respective edges such that the respective edges of the lites are disposed to a first side of the first section of corrugations and the first and second flat sections are disposed to a second side of the first section of corrugations relative to the respective edges.

9. An IGU in accordance with claim 8, wherein the center region further comprises:
- a first lateral section disposed between the first bonding region and the first section of three-dimensional corrugations and structurally bonded to the respective outward facing surface of the first lite; and
- a second lateral section disposed between the second bonding region and the first section of three-dimensional corrugations that is structurally bonded to the respective outward facing surface of the second lite.

10. An IGU in accordance with claim 8, wherein the center region further comprises:
- at least a second section of three-dimensional corrugations disposed in a line substantially parallel to the respective edges of the lites and spaced apart from the first section of three-dimensional corrugations in a direction substantially perpendicular to the repective edges of the lites; and
- at least a third flat section connected between the first and second sections of three dimensional corrugations and spaced apart from both the first and second sections of three-dimensional corrugations in directions substantially perpendicular to the repective edges of the lites.

11. An IGU in accordance with claim 7, further comprising a gettering material disposed on a portion of the band in communication with the cavity.

12. An IGU in accordance with claim 7, wherein an overall width of the hermetic band, $W_S$, measured in a direction perpendicular to the respective outward facing surfaces of the lites, is less than or equal to an overall width between the respective outward facing surfaces of the lites, $W_V$.

* * * * *